United States Patent
Yamada et al.

(10) Patent No.: US 11,673,101 B2
(45) Date of Patent: Jun. 13, 2023

(54) ULTRAFINE BUBBLE-CONTAINING LIQUID PRODUCING APPARATUS AND ULTRAFINE BUBBLE-CONTAINING LIQUID PRODUCING METHOD

(71) Applicant: CANON KABUSHIKI KAISHA, Tokyo (JP)

(72) Inventors: Akitoshi Yamada, Kanagawa (JP); Masahiko Kubota, Tokyo (JP); Akira Yamamoto, Kanagawa (JP); Yoshiyuki Imanaka, Kanagawa (JP); Yumi Yanai, Kanagawa (JP); Hiroyuki Ishinaga, Tokyo (JP); Teruo Ozaki, Kanagawa (JP); Toshio Kashino, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 320 days.

(21) Appl. No.: 17/084,920

(22) Filed: Oct. 30, 2020

(65) Prior Publication Data

US 2021/0129091 A1    May 6, 2021

(30) Foreign Application Priority Data

Oct. 31, 2019    (JP) .............................. JP2019-199116

(51) Int. Cl.
*B01F 23/232*    (2022.01)
*B01F 33/81*     (2022.01)
(Continued)

(52) U.S. Cl.
CPC ........ *B01F 23/2323* (2022.01); *B01F 23/811* (2022.01); *B01F 25/51* (2022.01);
(Continued)

(58) Field of Classification Search
CPC .... B01F 23/2323; B01F 23/811; B01F 25/51; B01F 33/812; B01F 35/2209;
(Continued)

(56) References Cited

U.S. PATENT DOCUMENTS 10,124,338 B2    11/2018   Liu et al.
2009/0130025 A1   5/2009   Bohmer et al.
(Continued)

FOREIGN PATENT DOCUMENTS

CN     1840231 A     10/2006
CN   101048224 A     10/2007
(Continued)

OTHER PUBLICATIONS

Machine translation of CN-204395795 U (Year: 2022).*
(Continued)

*Primary Examiner* — Huy Tram Nguyen
(74) *Attorney, Agent, or Firm* — Venable LLP

(57) ABSTRACT

The present invention provides an ultrafine bubble-containing liquid producing apparatus capable of reducing the possibility of intermitting supply of a UFB-containing liquid. An ultrafine bubble-containing liquid producing apparatus includes producing units that produce an ultrafine bubble-containing liquid containing ultrafine bubbles by using a liquid supplied from a liquid introducing unit and deliver the produced ultrafine bubble-containing liquid to a liquid delivering unit. The producing units include a plurality of ultrafine bubble generating units capable of operating independently. Each of the plurality of ultrafine bubble generating units is provided to be capable of independently switching between communicating with and being disconnected from the liquid introducing unit and the liquid delivering unit.

15 Claims, 39 Drawing Sheets

(51) Int. Cl.
  *B01F 35/22* (2022.01)
  *B01F 23/80* (2022.01)
  *B01F 25/51* (2022.01)
  *B01F 35/221* (2022.01)
  *B01F 23/70* (2022.01)

(52) U.S. Cl.
  CPC ........ *B01F 33/812* (2022.01); *B01F 35/2209* (2022.01); *B01F 35/22161* (2022.01); *B01F 23/703* (2022.01)

(58) Field of Classification Search
  CPC .............. B01F 35/22161; B01F 23/703; B01F 2035/99; B01F 23/2373; B01F 23/238; B01F 33/3033; B01F 35/93; B01F 23/2319; B01F 23/235; B01F 23/80; B01F 23/807; B01F 23/808
  USPC ......................................................... 366/146
  See application file for complete search history.

(56) References Cited

U.S. PATENT DOCUMENTS

| 2020/0197963 | A1 | 6/2020 | Takahashi et al. |
| 2020/0254468 | A1 | 8/2020 | Kubota et al. |
| 2020/0276511 | A1 | 9/2020 | Ozaki et al. |
| 2020/0276512 | A1 | 9/2020 | Ozaki et al. |
| 2020/0276513 | A1 | 9/2020 | Yanai et al. |
| 2020/0276514 | A1 | 9/2020 | Ishinaga et al. |
| 2020/0276515 | A1 | 9/2020 | Kubota et al. |
| 2020/0276516 | A1 | 9/2020 | Imanaka et al. |
| 2020/0276550 | A1 | 9/2020 | Imanaka et al. |
| 2020/0276803 | A1 | 9/2020 | Arimizu et al. |
| 2020/0276804 | A1 | 9/2020 | Kubota et al. |
| 2020/0278111 | A1 | 9/2020 | Imanaka et al. |

FOREIGN PATENT DOCUMENTS

| CN | 201949826 | U |   | 8/2011 |
| CN | 204395795 | U | * | 6/2015 |
| CN | 106186474 | A |   | 12/2016 |
| CN | 106999933 | A |   | 8/2017 |
| CN | 206762381 | U | * | 12/2017 |
| CN | 107930422 | A |   | 4/2018 |
| CN | 209333368 | U |   | 9/2019 |
| JP | 2005-152763 | A |   | 6/2005 |
| JP | 2016-016353 | A |   | 2/2016 |
| JP | 2019-042664 | A |   | 3/2019 |
| JP | 2019-042732 | A |   | 3/2019 |
| TW | 201515693 | A |   | 5/2015 |
| WO | 2014/184585 | A2 |   | 11/2014 |

OTHER PUBLICATIONS

Machine translation of CN-206762381 U (Year: 2022).*
First Office Action in Chinese Application No. 202011197384.2 (Jan. 2023).

* cited by examiner

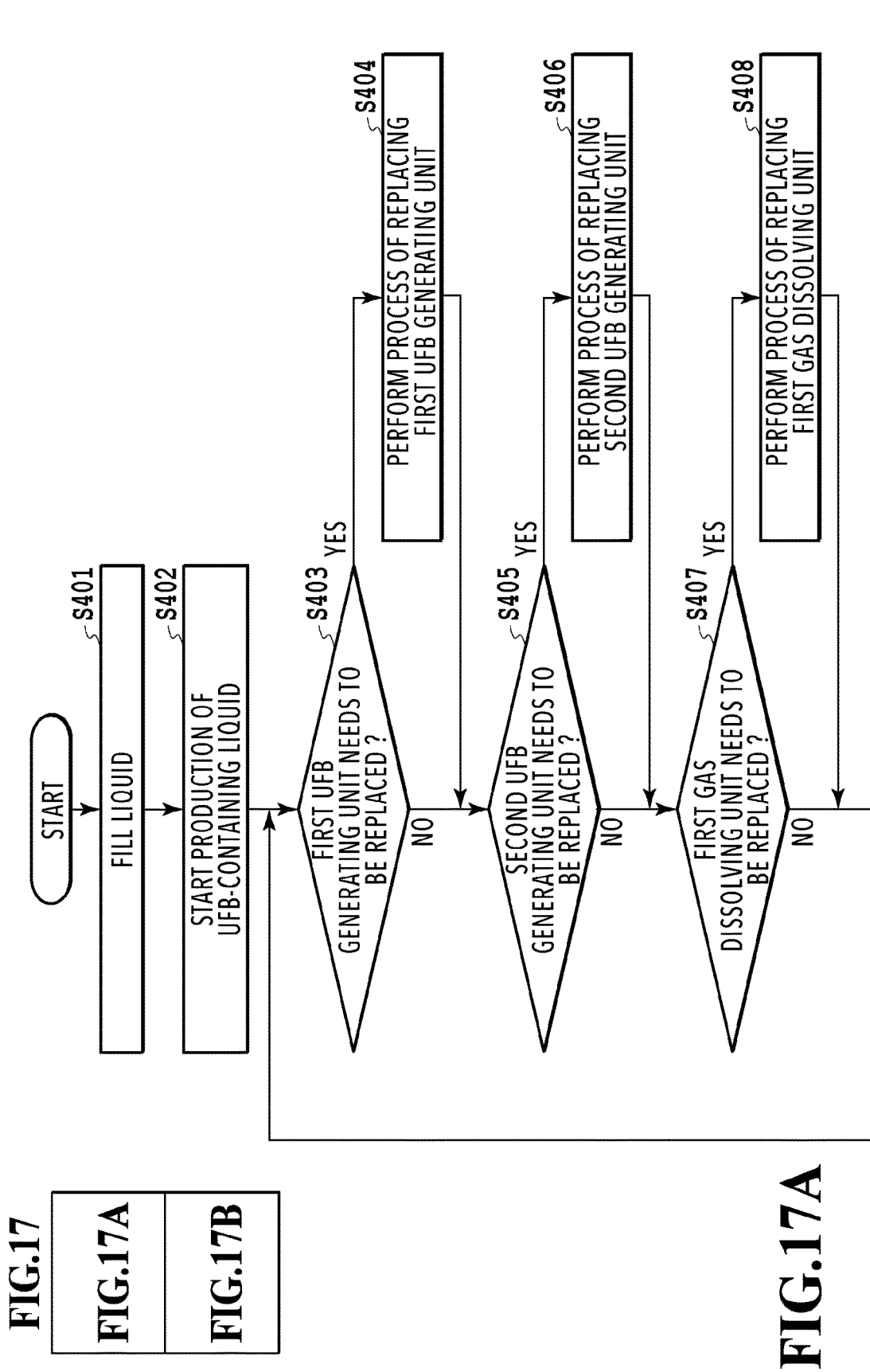

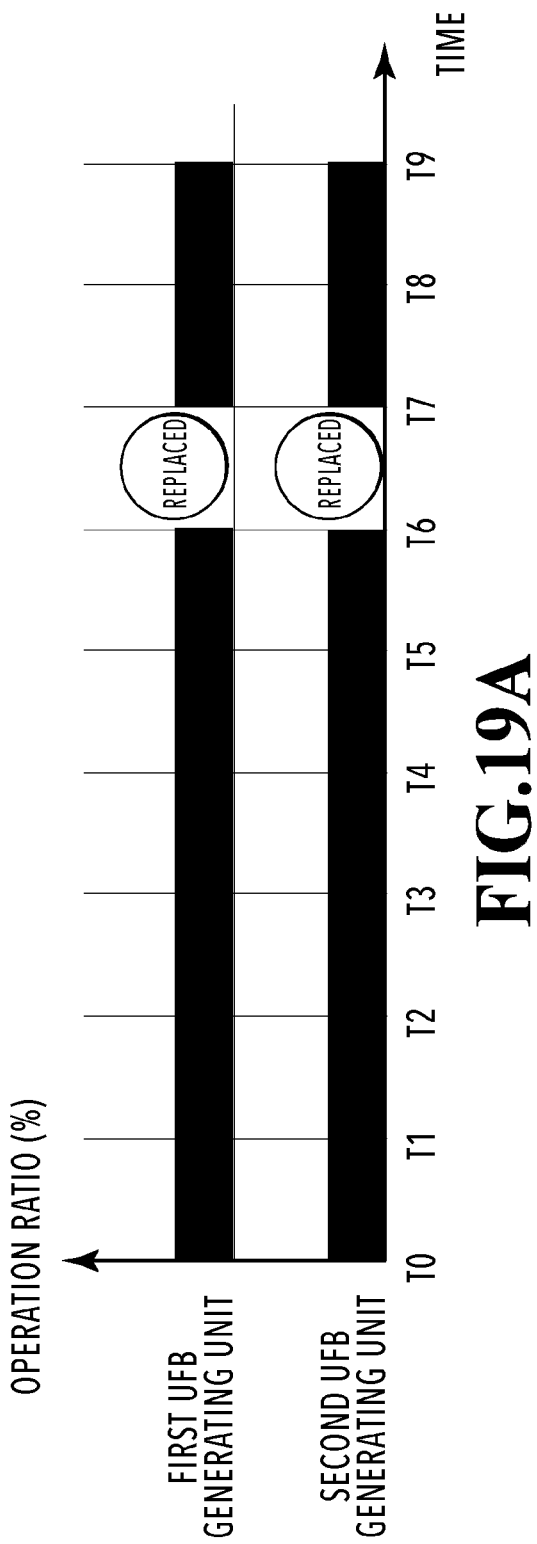
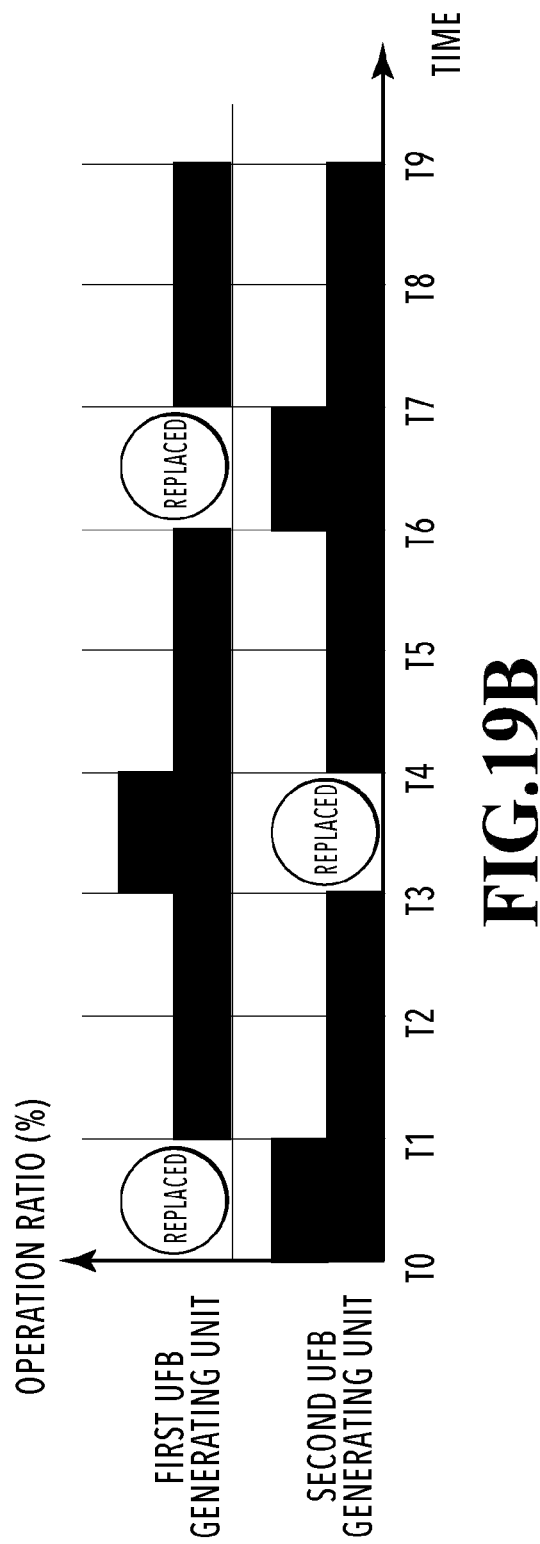

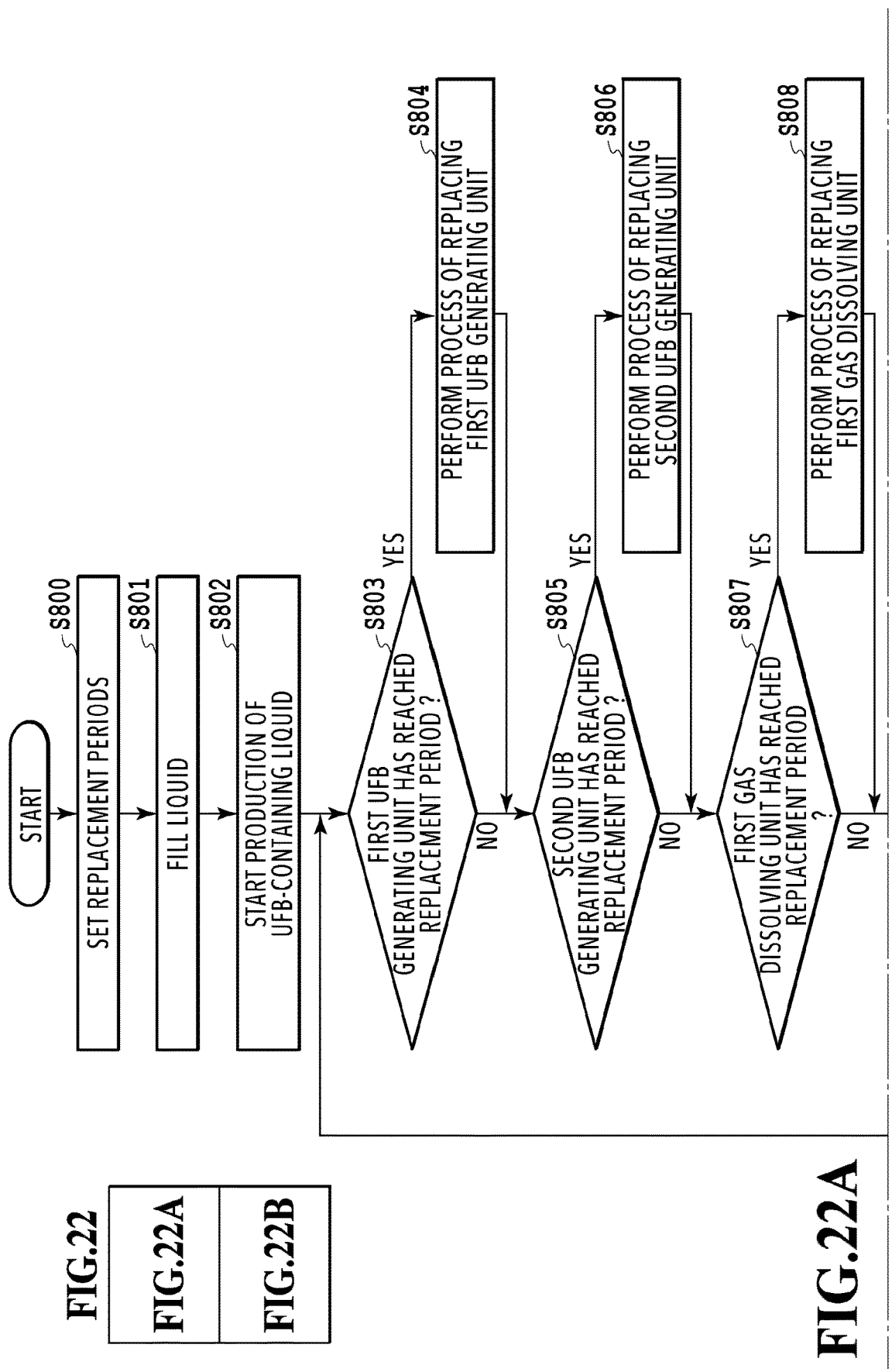

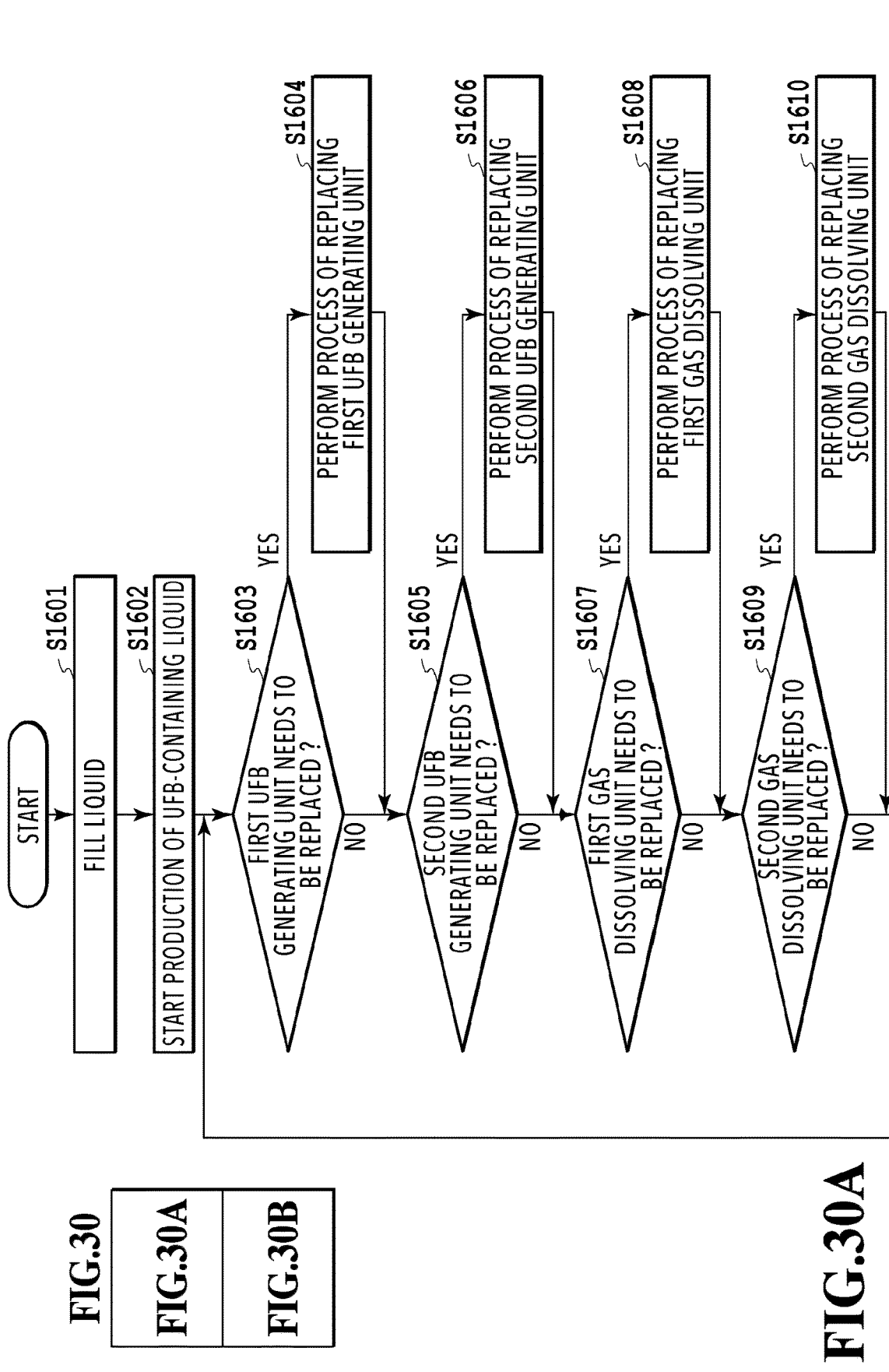

ULTRAFINE BUBBLE-CONTAINING LIQUID PRODUCING APPARATUS AND ULTRAFINE BUBBLE-CONTAINING LIQUID PRODUCING METHOD

BACKGROUND OF THE INVENTION

Field of the Invention

The present invention relates to an ultrafine bubble-containing liquid producing apparatus and an ultrafine bubble-containing liquid producing method for producing an ultrafine bubble-containing liquid containing ultrafine bubbles with a diameter of less than 1.0 μm.

Description of the Related Art

Recently, there have been developed techniques for applying the features of fine bubbles such as microbubbles in micrometer-size in diameter and nanobubbles in nanometer-size in diameter. Especially, the utility of ultrafine bubbles (hereinafter also referred to as "UFBs") smaller than 1.0 μm in diameter have been confirmed in various fields.

Japanese Patent Laid-Open No. 2019-042732 includes a route in which UFBs are generated by a UFB generator in a liquid supplied from a liquid introduction tank and then the UFB-containing liquid is delivered to a liquid delivery tank. Japanese Patent Laid-Open No. 2019-042732 further proposes raising the concentration of contained UFBs by forming a circulation route through which to return the liquid delivered to the liquid delivery tank back into the liquid introduction tank, and repetitively passing the UFB-containing liquid through the UFB generator.

SUMMARY OF THE INVENTION

However, with the apparatus disclosed in Japanese Patent Laid-Open No. 2019-042732, in a case where a constituent element such as the UFB generator or a pump breaks during the production of a UFB-containing liquid, the generation of UFBs may be intermitted during replacement, repair, or the like of the broken element, and the apparatus may thus fall into a state of not being able supply a UFB-containing liquid. Currently, UFB-containing liquids have been used to be supplied to various apparatuses. If the supply of UFBs is shut off, the functions of these apparatuses will have to be stopped. Continuous supply of a UFB-containing liquid is desired particularly for medical apparatuses, cleaning apparatuses, and so on that use a UFB-containing liquid.

Thus, an object of the present invention is to provide an ultrafine bubble-containing liquid producing apparatus and an ultrafine bubble-containing liquid producing method capable of reducing the possibility of stopping supply of a UFB-containing liquid.

The present invention is an ultrafine bubble-containing liquid producing apparatus including a producing unit that produces an ultrafine bubble-containing liquid containing ultrafine bubbles by using a liquid supplied from a liquid introducing unit and delivers the produced ultrafine bubble-containing liquid to a liquid delivering unit, in which the producing unit includes a plurality of ultrafine bubble generating units capable of operating independently, and each of the plurality of ultrafine bubble generating units is provided to be capable of independently switching between communicating with and being disconnected from the liquid introducing unit and the liquid delivering unit.

According to the present invention, it is possible to provide an ultrafine bubble-containing liquid producing apparatus and an ultrafine bubble-containing liquid producing method capable of reducing the possibility of stopping supply of a UFB-containing liquid.

Further features of the present invention will become apparent from the following description of exemplary embodiments with reference to the attached drawings.

BRIEF DESCRIPTION OF THE DRAWINGS

FIG. 17 is a diagram illustrating a relationship between FIG. 17A and FIG. 17B.

FIGS. 17A and 17B are flowcharts illustrating a control operation in the first embodiment, and illustrate a main flow;

FIGS. 19A and 19B are timing charts illustrating control executed in a second embodiment;

FIG. 22 is a diagram illustrating a relationship between FIG. 22A and FIG. 22B.

FIGS. 22A and 22B are flowcharts illustrating a control operation in the second embodiment;

FIG. 24 is a diagram illustrating a relationship between FIG. 24A and FIG. 24B.

FIG. 30 is a diagram illustrating a relationship between FIG. 30A and FIG. 30B.

FIGS. 30A and 30B are flowcharts illustrating a control operation in the sixth embodiment;

DESCRIPTION OF THE EMBODIMENTS

Embodiments of the present invention will be described below with reference to the drawings.

<<Configuration of UFB Generating Apparatus>>

Figure 1:
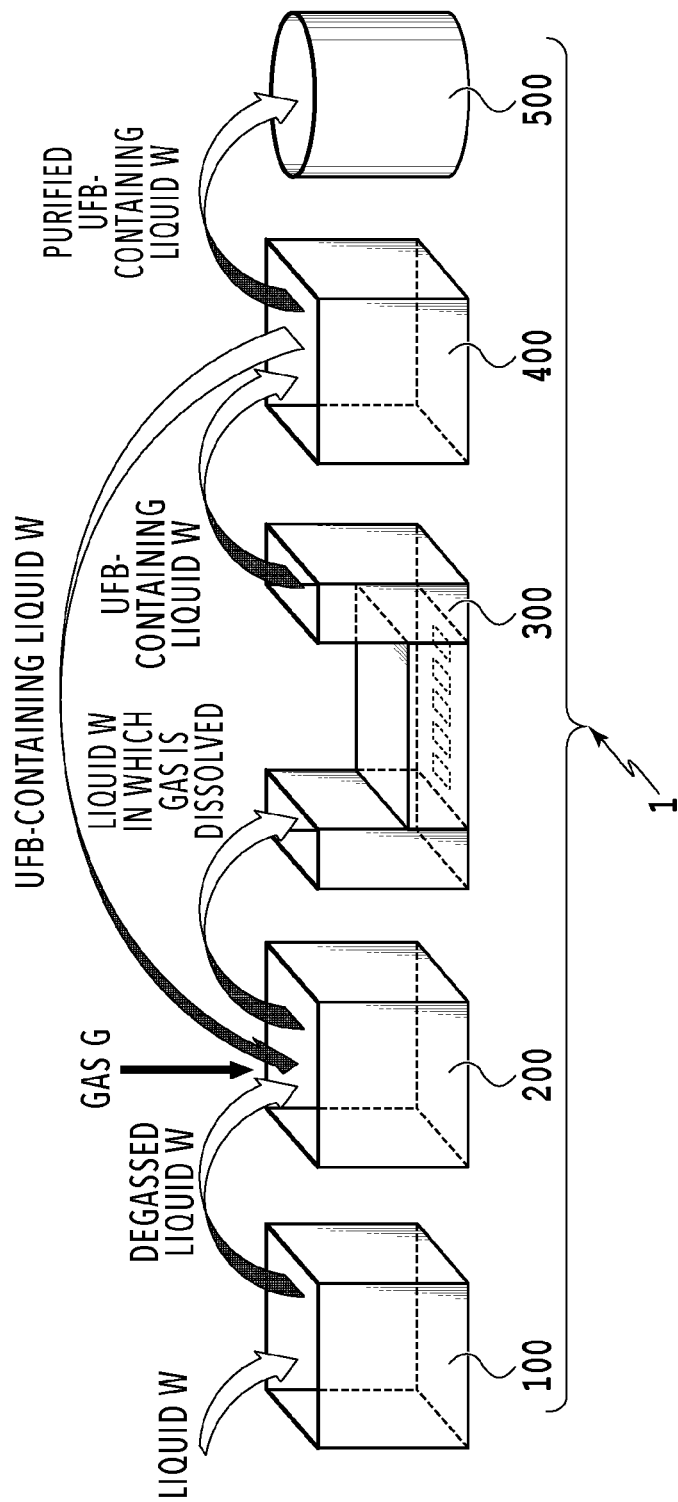
FIG. 1 is a diagram illustrating an example of a UFB generating apparatus.

FIG. 1 is a diagram illustrating an example of a UFB generating apparatus applicable to the present invention. A UFB generating apparatus 1 of this embodiment includes a pre-processing unit 100, dissolving unit 200, a T-UFB generating unit 300, a post-processing unit 400, and a collecting unit 500. Each unit performs unique processing on a liquid W such as tap water supplied to the pre-processing unit 100 in the above order, and the thus-processed liquid W is collected as a T-UFB-containing liquid by the collecting unit 500. Functions and configurations of the units are described below. Although details are described later, UFBs generated by utilizing the film boiling caused by rapid heating are referred to as thermal-ultrafine bubbles (T-UFBs) in this specification.

Figure 2:
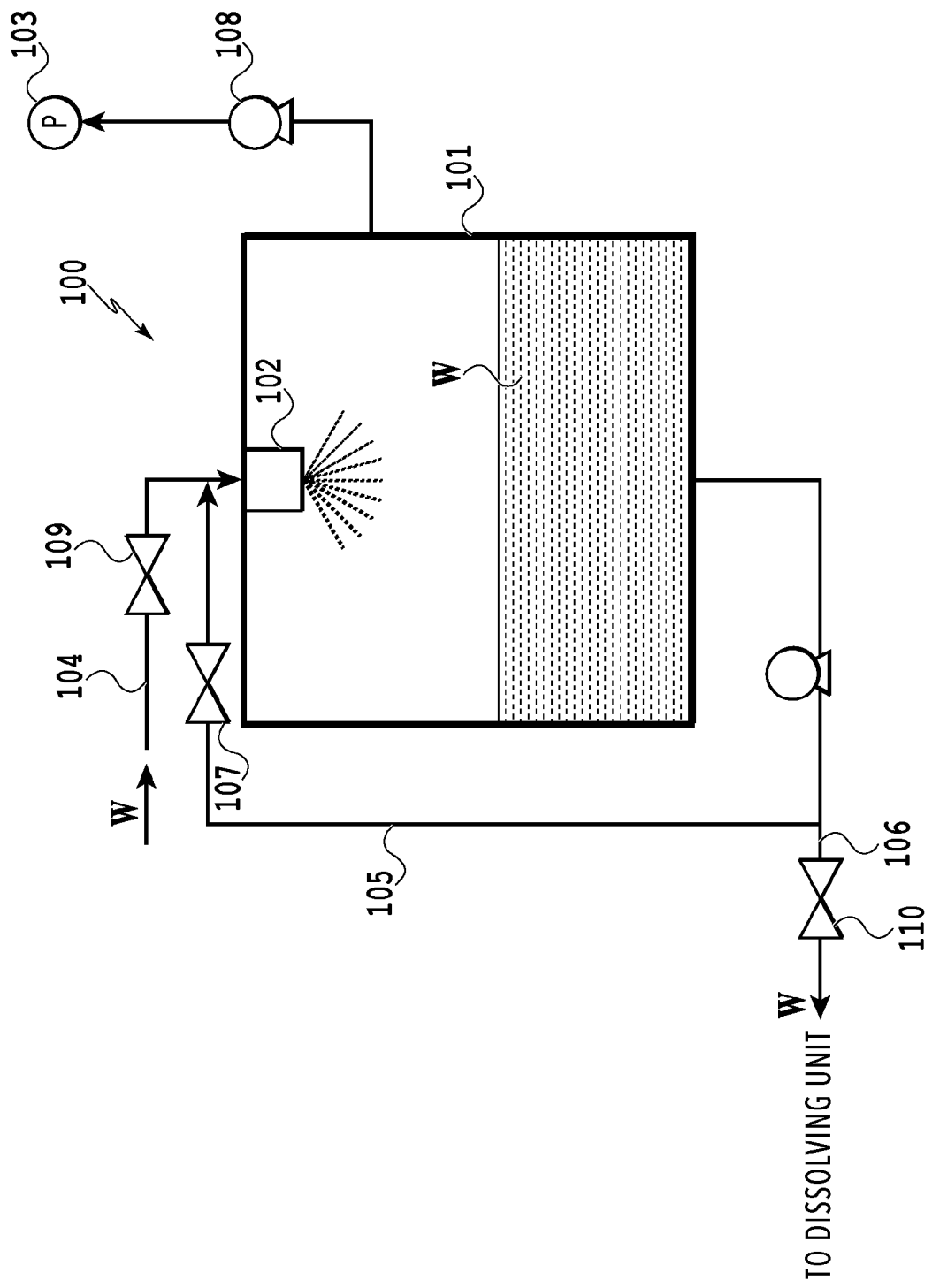
FIG. 2 is a schematic configuration diagram of a pre-processing unit.

FIG. 2 is a schematic configuration diagram of the pre-processing unit 100. The pre-processing unit 100 of this embodiment performs a degassing treatment on the supplied liquid W. The pre-processing unit 100 mainly includes a degassing container 101, a shower head 102, a depressurizing pump 103, a liquid introduction passage 104, a liquid circulation passage 105, and a liquid discharge passage 106. For example, the liquid W such as tap water is supplied to the degassing container 101 from the liquid introduction passage 104 through a valve 109. In this process, the shower head 102 provided in the degassing container 101 sprays a mist of the liquid W in the degassing container 101. The shower head 102 is for prompting the gasification of the liquid W; however, a centrifugal and the like may be used instead as the mechanism for producing the gasification prompt effect.

When a certain amount of the liquid W is reserved in the degassing container 101 and then the depressurizing pump 103 is activated with all the valves closed, already-gasified gas components are discharged, and gasification and discharge of gas components dissolved in the liquid W are also prompted. In this process, the internal pressure of the degassing container 101 may be depressurized to around several hundreds to thousands of Pa (1.0 Torr to 10.0 Torr) while checking a manometer 108. The gases to be removed by the pre-processing unit 100 includes nitrogen, oxygen, argon, carbon dioxide, and so on, for example.

The above-described degassing processing can be repeatedly performed on the same liquid W by utilizing the liquid circulation passage 105. Specifically, the shower head 102 is operated with the valve 109 of the liquid introduction passage 104 and a valve 110 of the liquid discharge passage 106 closed and a valve 107 of the liquid circulation passage 105 opened. This allows the liquid W reserved in the degassing container 101 and degassed once to be resprayed in the degassing container 101 from the shower head 102. In addition, with the depressurizing pump 103 operated, the gasification processing by the shower head 102 and the degassing processing by the depressurizing pump 103 are repeatedly performed on the same liquid W. Every time the above processing utilizing the liquid circulation passage 105 is performed repeatedly, it is possible to decrease the gas components contained in the liquid W in stages. Once the liquid W degassed to a desired purity is obtained, the liquid W is transferred to the dissolving unit 200 through the liquid discharge passage 106 with the valve 110 opened.

FIG. 2 illustrates the degassing unit 100 that depressurizes the gas part to gasify the solute; however, the method of degassing the solution is not limited thereto. For example, a heating and boiling method for boiling the liquid W to gasify the solute may be employed, or a film degassing method for increasing the interface between the liquid and the gas using hollow fibers. A SEPAREL series (produced by DIC corporation) is commercially supplied as the degassing module using the hollow fibers. The SEPAREL series uses poly (4-methylpentene-1) (PMP) for the raw material of the hollow fibers and is used for removing air bubbles from ink and the like mainly supplied for a piezo head. In addition, two or more of an evacuating method, the heating and boiling method, and the film degassing method may be used together.

Figure 3A:
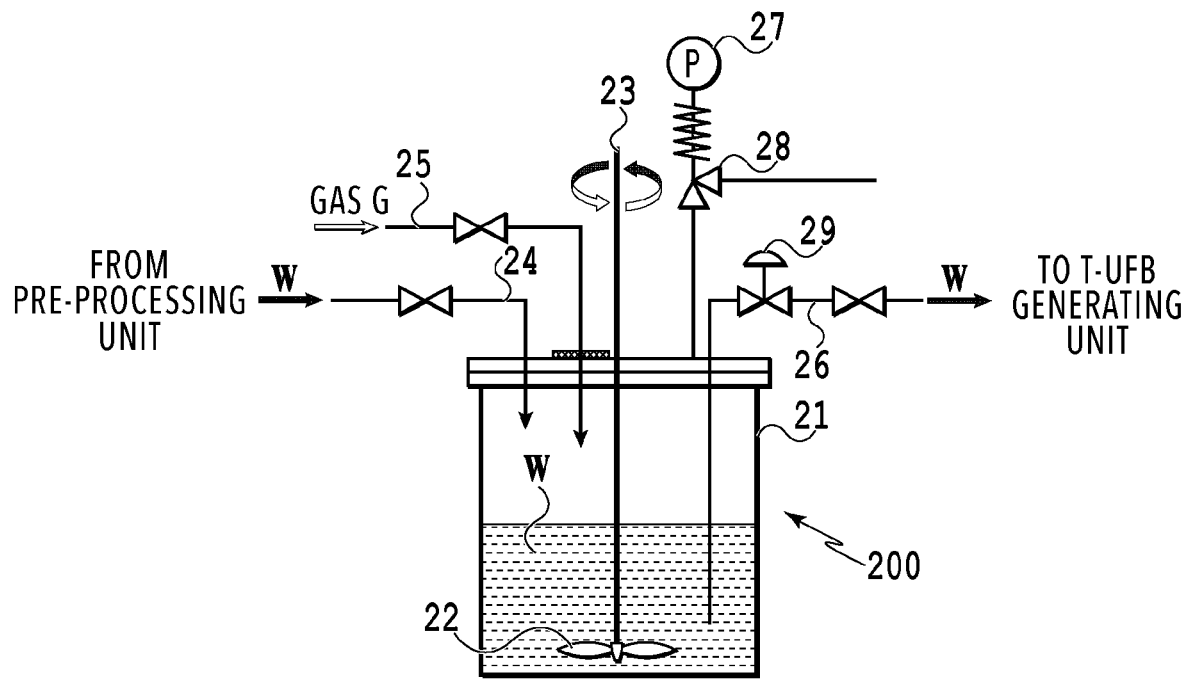
FIGS. 3A and 3B area schematic configuration diagram of a dissolving unit and a diagram for describing the dissolving states in a liquid.
Figure 3B:
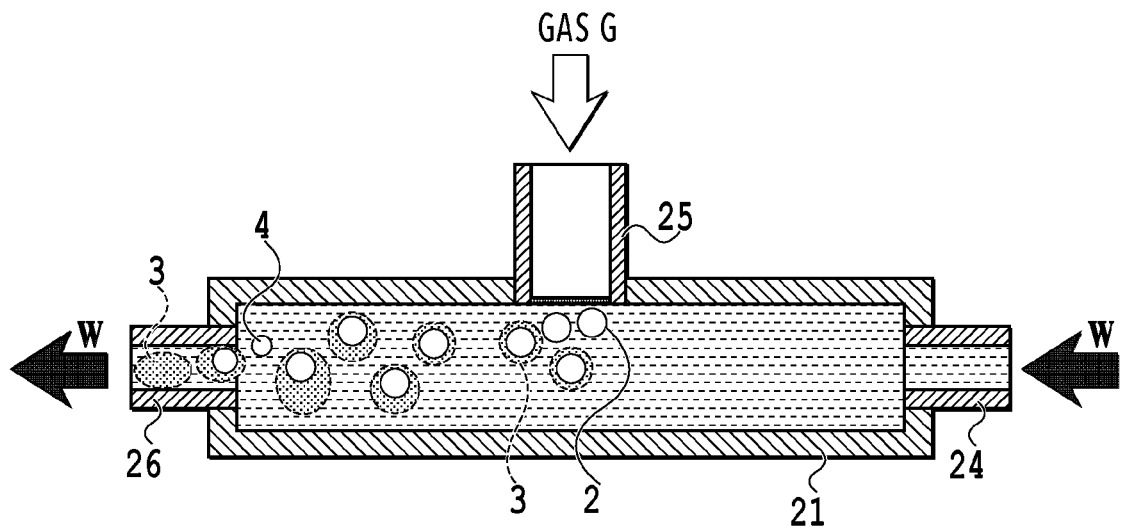

FIGS. 3A and 3B are a schematic configuration diagram of the dissolving unit 200 and a diagram for describing the dissolving states in the liquid. The dissolving unit 200 is a unit for dissolving a desired gas into the liquid W supplied from the pre-processing unit 100. The dissolving unit 200 of this embodiment mainly includes a dissolving container 21, a rotation shaft 23 provided with a rotation plate 22, a liquid introduction passage 24, a gas introduction passage 25, a liquid discharge passage 26, and a pressurizing pump 27.

The liquid W supplied from the pre-processing unit 100 is supplied into the dissolving container 21 from the liquid introduction passage 24 through a liquid introduction opening-closing valve and stored in the dissolving container 21. On the other hand, a gas G is supplied into the dissolving container 21 from the gas introduction passage 25 through a gas introduction opening-closing valve.

Once predetermined amounts of the liquid W and the gas G are reserved in the dissolving container 21, the pressurizing pump 27 is activated to increase the internal pressure of the dissolving container 21 to about 0.5 MPa. A safety valve 28 is arranged between the pressurizing pump 27 and the dissolving container 21. With the rotation plate 22 in the liquid rotated via the rotation shaft 23, the gas G supplied to the dissolving container 21 is transformed into air bubbles, and the contact area between the gas G and the liquid W is increased to prompt the dissolution into the liquid W. This operation is continued until the solubility of the gas G reaches almost the maximum saturation solubility. In this case, a unit for decreasing the temperature of the liquid may be provided to dissolve the gas as much as possible. When the gas is with low solubility, it is also possible to increase the internal pressure of the dissolving container 21 to 0.5 MPa or higher. In this case, the material and the like of the container need to be the optimum for safety sake.

Once the liquid W in which the components of the gas G are dissolved at a desired concentration is obtained, the liquid W is discharged through the liquid discharge passage 206 and supplied to the T-UFB generating unit 300. In this process, a back-pressure valve 209 adjusts the flow pressure of the liquid W to prevent excessive increase of the pressure during the supplying.

FIG. 3B is a diagram schematically illustrating the dissolving states of the gas G put in the dissolving container 201. An air bubble 2 containing the components of the gas G put in the liquid W is dissolved from a portion in contact with the liquid W. The air bubble 2 thus shrinks gradually, and a gas-dissolved liquid 3 then appears around the air bubble 2. Since the air bubble 2 is affected by the buoyancy, the air bubble 2 may be moved to a position away from the center of the gas-dissolved liquid 3 or be separated out from the gas-dissolved liquid 3 to become a residual air bubble 4. Specifically, in the liquid W to be supplied to the T-UFB generating unit 300 through the liquid discharge passage 206, there is a mix of the air bubbles 2 surrounded by the gas-dissolved liquids 3 and the air bubbles 2 and the gas-dissolved liquids 3 separated from each other.

The gas-dissolved liquid 3 in the drawings means "a region of the liquid W in which the dissolution concentration of the gas G mixed therein is relatively high." In the gas components actually dissolved in the liquid W, the concentration of the gas components in the gas-dissolved liquid 3 is the highest at a portion surrounding the air bubble 2. In a case where the gas-dissolved liquid 3 is separated from the air bubble 2 the concentration of the gas components of the gas-dissolved liquid 3 is the highest at the center of the region, and the concentration is continuously decreased as away from the center. That is, although the region of the gas-dissolved liquid 3 is surrounded by a broken line in FIG. 3 for the sake of explanation, such a clear boundary does not actually exist. In addition, in the present invention, a gas that cannot be dissolved completely may be accepted to exist in the form of an air bubble in the liquid.

Figure 4:
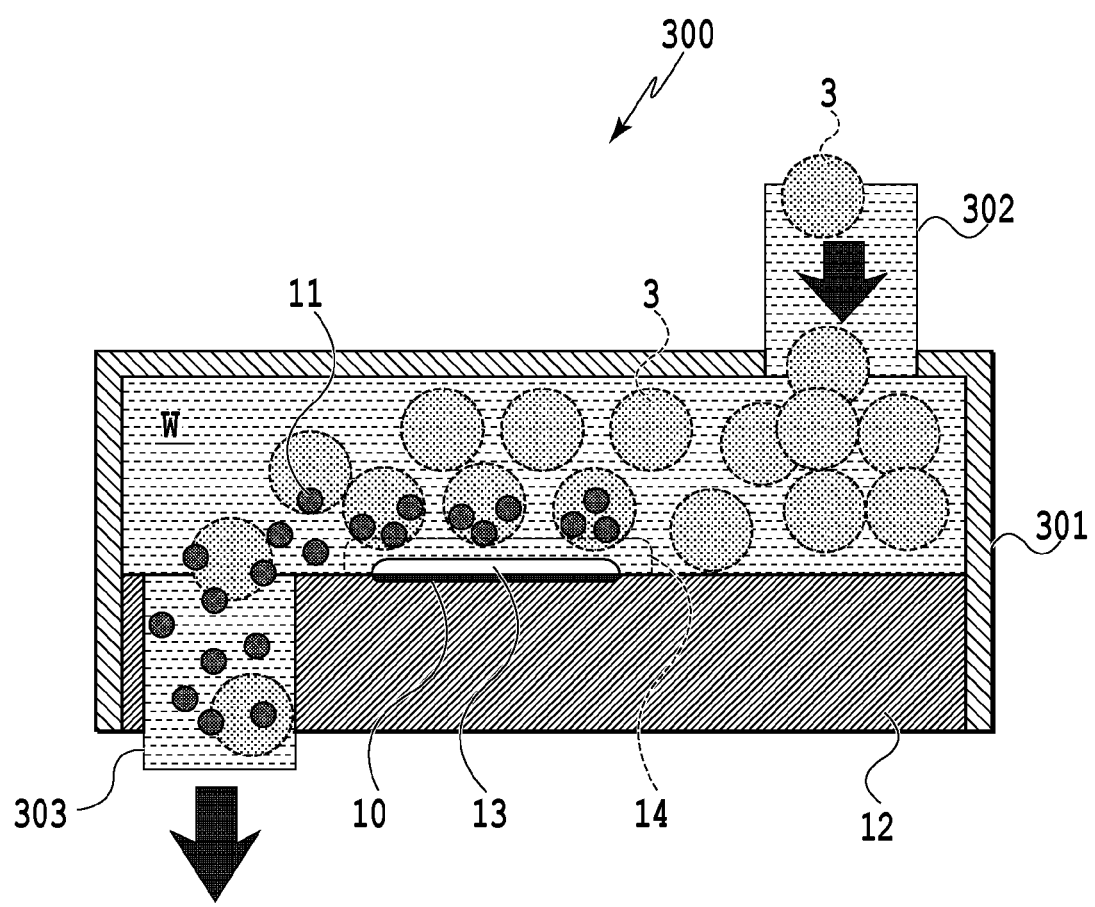
FIG. 4 is a schematic configuration diagram of a T-UFB generating unit.

FIG. 4 is a schematic configuration diagram of the T-UFB generating unit 300. The T-UFB generating unit 300 mainly includes a chamber 301, a liquid introduction passage 302, and a liquid discharge passage 303. The flow from the liquid introduction passage 302 to the liquid discharge passage 303 through the chamber 301 is formed by a not-illustrated flow pump. Various pumps including a diaphragm pump, a gear pump, and a screw pump may be employed as the flow pump. In in the liquid W introduced from the liquid introduction passage 302, the gas-dissolved liquid 3 of the gas G put by the dissolving unit 200 is mixed.

An element substrate 12 provided with a heating element 10 is arranged on a bottom section of the chamber 301. With a predetermined voltage pulse applied to the heating element 10, a bubble 13 generated by the film boiling (hereinafter, also referred to as a film boiling bubble 13) is generated in a region in contact with the heating element 10. Then, an ultrafine bubble (UFB) 11 containing the gas G is generated caused by expansion and shrinkage of the film boiling bubble 13. As a result, a UFB-containing liquid W containing many UFBs 11 is discharged from the liquid discharge passage 303.

Figure 5A:
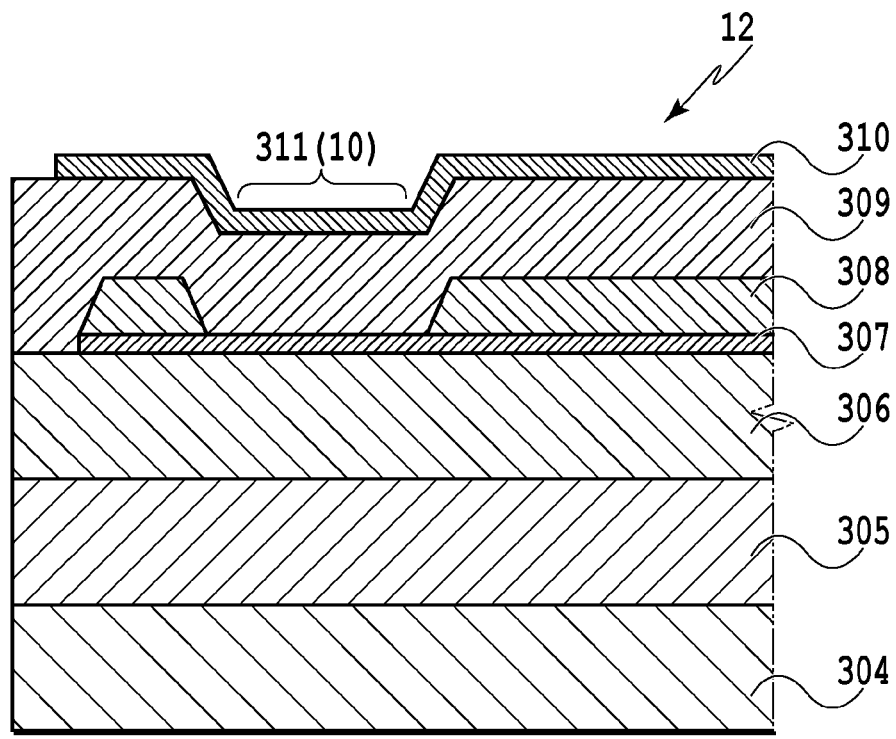
FIGS. 5A and 5B are diagrams for describing details of a heating element.
Figure 5B:
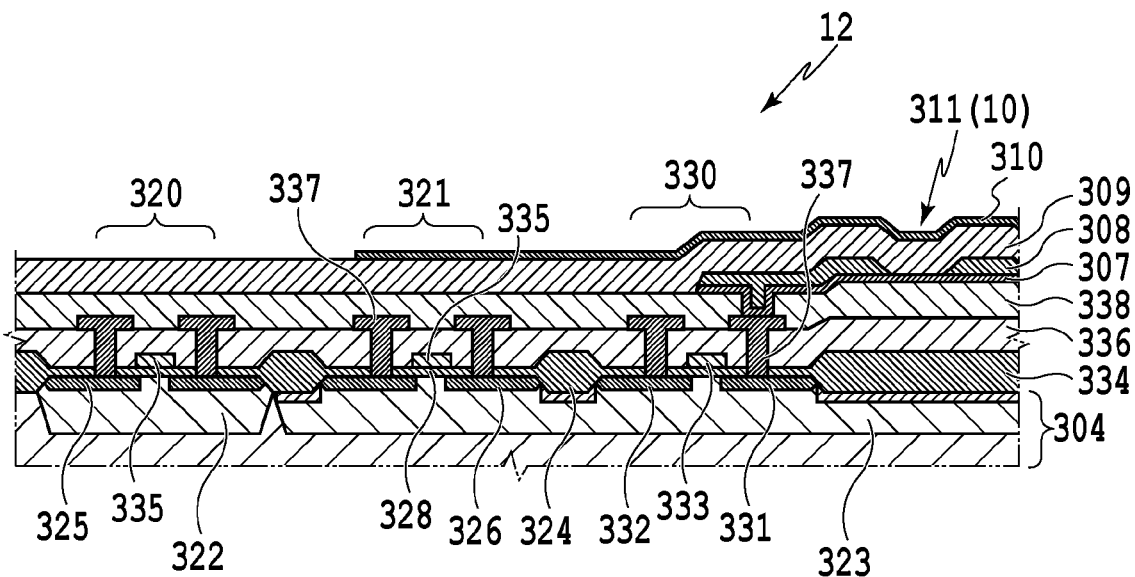

FIGS. 5A and 5B are diagrams for illustrating a detailed configuration of the heating element 10. FIG. 5A illustrates a closeup view of the heating element 10, and FIG. 5B illustrates a cross-sectional view of a wider region of the element substrate 12 including the heating element 10.

As illustrated in FIG. 5A, in the element substrate 12 of this embodiment, a thermal oxide film 305 as a heat-accumulating layer and an interlaminar film 306 also served as a heat-accumulating layer are laminated on a surface of a silicon substrate 304. An $SiO_2$ film or an SiN film may be used as the interlaminar film 306. A resistive layer 307 is formed on a surface of the interlaminar film 306, and a wiring 308 is partially formed on a surface of the resistive layer 307. An Al-alloy wiring of Al, Al—Si, Al—Cu, or the like may be used as the wiring 308. A protective layer 309 made of an $SiO_2$ film or an $Si_3N_4$ film is formed on surfaces of the wiring 308, the resistive layer 307, and the interlaminar film 306.

A cavitation-resistant film 310 for protecting the protective layer 309 from chemical and physical impacts due to the heat evolved by the resistive layer 307 is formed on a portion and around the portion on the surface of the protective layer 309, the portion corresponding to a heat-acting portion 311 that eventually becomes the heating element 10. A region on the surface of the resistive layer 307 in which the wiring 308 is not formed is the heat-acting portion 311 in which the resistive layer 307 evolves heat. The heating portion of the resistive layer 307 on which the wiring 308 is not formed functions as the heating element (heater) 10. As described above, the layers in the element substrate 12 are sequentially formed on the surface of the silicon substrate 304 by a semiconductor production technique, and the heat-acting portion 311 is thus provided on the silicon substrate 304.

The configuration illustrated in the drawings is an example, and various other configurations are applicable. For example, a configuration in which the laminating order of the resistive layer 307 and the wiring 308 is opposite, and a configuration in which an electrode is connected to a lower surface of the resistive layer 307 (so-called a plug electrode configuration) are applicable. In other words, as described later, any configuration may be applied as long as the configuration allows the heat-acting portion 311 to heat the liquid for generating the film boiling in the liquid.

FIG. 5B is an example of a cross-sectional view of a region including a circuit connected to the wiring 308 in the element substrate 12. An N-type well region 322 and a P-type well region 323 are partially provided in a top layer of the silicon substrate 304, which is a P-type conductor. A P-MOS 320 is formed in the N-type well region 322 and an N-MOS 321 is formed in the P-type well region 323 by introduction and diffusion of impurities by the ion implantation and the like in the general MOS process.

The P-MOS 320 includes a source region 325 and a drain region 326 formed by partial introduction of N-type or P-type impurities in a top layer of the N-type well region 322, a gate wiring 335, and so on. The gate wiring 335 is deposited on a part of a top surface of the N-type well region 322 excluding the source region 325 and the drain region 326, with a gate insulation film 328 of several hundreds of Å in thickness interposed between the gate wiring 335 and the top surface of the N-type well region 322.

The N-MOS 321 includes the source region 325 and the drain region 326 formed by partial introduction of N-type or P-type impurities in a top layer of the P-type well region 323, the gate wiring 335, and so on. The gate wiring 335 is deposited on a part of a top surface of the P-type well region 323 excluding the source region 325 and the drain region 326, with the gate insulation film 328 of several hundreds of Å in thickness interposed between the gate wiring 335 and the top surface of the P-type well region 323. The gate wiring 335 is made of polysilicon of 3000 Å to 5000 Å in thickness deposited by the CVD method. A C-MOS logic is constructed with the P-MOS 320 and the N-MOS 321.

In the P-type well region 323, an N-MOS transistor 330 for driving an electrothermal conversion element (heating resistance element) is formed on a portion different from the portion including the N-MOS 321. The N-MOS transistor 330 includes a source region 332 and a drain region 331 partially provided in the top layer of the P-type well region 323 by the steps of introduction and diffusion of impurities, a gate wiring 333, and so on. The gate wiring 333 is deposited on a part of the top surface of the P-type well region 323 excluding the source region 332 and the drain region 331, with the gate insulation film 328 interposed between the gate wiring 333 and the top surface of the P-type well region 323.

In this example, the N-MOS transistor 330 is used as the transistor for driving the electrothermal conversion element. However, the transistor for driving is not limited to the N-MOS transistor 330, and any transistor may be used as long as the transistor has a capability of driving multiple electrothermal conversion elements individually and can implement the above-described fine configuration. Although the electrothermal conversion element and the transistor for driving the electrothermal conversion element are formed on the same substrate in this example, those may be formed on different substrates separately.

An oxide film separation region 324 is formed by field oxidation of 5000 Å to 10000 Å in thickness between the elements, such as between the P-MOS 320 and the N-MOS 321 and between the N-MOS 321 and the N-MOS transistor 330. The oxide film separation region 324 separates the elements. A portion of the oxide film separation region 324 corresponding to the heat-acting portion 311 functions as a heat-accumulating layer 334, which is the first layer on the silicon substrate 304.

An interlayer insulation film 336 including a PSG film, a BPSG film, or the like of about 7000 Å in thickness is formed by the CVD method on each surface of the elements such as the P-MOS 320, the N-MOS 321, and the N-MOS transistor 330. After the interlayer insulation film 336 is made flat by heat treatment, an Al electrode 337 as a first wiring layer is formed in a contact hole penetrating through the interlayer insulation film 336 and the gate insulation film 328. On surfaces of the interlayer insulation film 336 and the Al electrode 337, an interlayer insulation film 338 including an $SiO_2$ film of 10000 Å to 15000 Å in thickness is formed by a plasma CVD method. On the surface of the interlayer insulation film 338, a resistive layer 307 including a TaSiN film of about 500 Å in thickness is formed by a co-sputter method on portions corresponding to the heat-acting portion 311 and the N-MOS transistor 330. The resistive layer 307 is electrically connected with the Al electrode 337 near the drain region 331 via a through-hole formed in the interlayer insulation film 338. On the surface of the resistive layer 307, the wiring 308 of Al as a second wiring layer for a wiring to each electrothermal conversion element is formed. The protective layer 309 on the surfaces of the wiring 308, the resistive layer 307, and the interlayer insulation film 338 includes an SiN film of 3000 Å in thickness formed by the plasma CVD method. The cavitation-resistant film 310 deposited on the surface of the protective layer 309 includes a thin film of about 2000 Å in thickness, which is at least one metal selected from the group consisting of Ta, Fe, Ni, Cr, Ge, Ru, Zr, Ir, and the like. Various materials other than the above-described TaSiN such as $TaN_{0.8}$, CrSiN, TaA, WSiN, and the like can be applied as long as the material can generate the film boiling in the liquid.

Figure 6A:
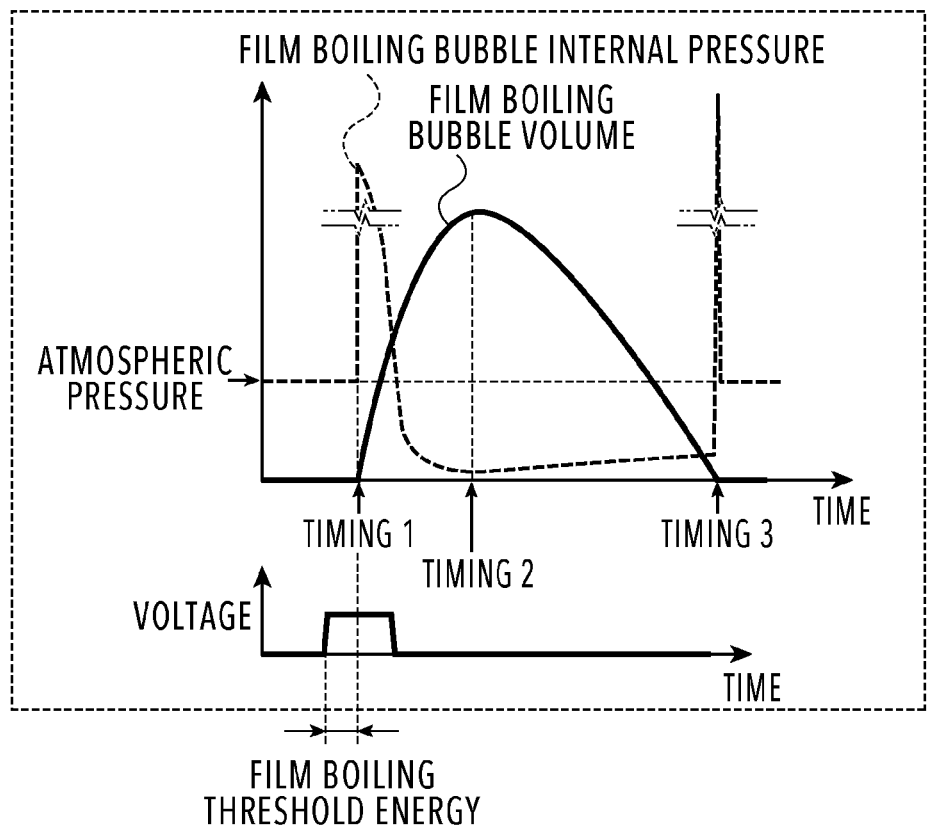
FIGS. 6A and 6B are diagrams for describing the states of film boiling on the heating element.
Figure 6B:
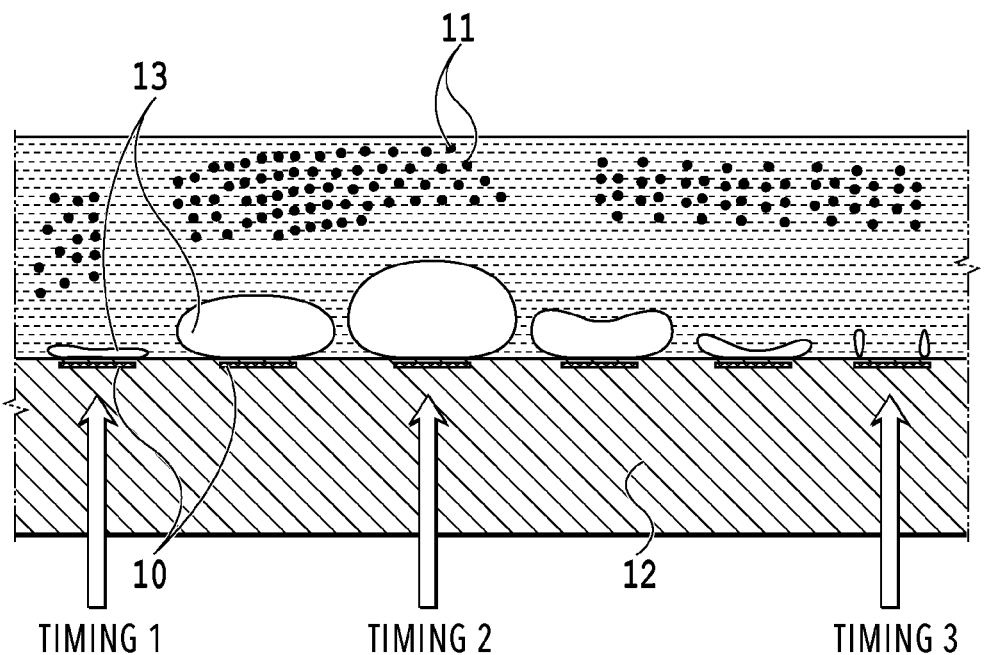

FIGS. 6A and 6B are diagrams illustrating the states of the film boiling when a predetermined voltage pulse is applied to the heating element 10. In this case, the case of generating the film boiling under atmospheric pressure is described. In FIG. 6A, the horizontal axis represents time. The vertical axis in the lower graph represents a voltage applied to the heating element 10, and the vertical axis in the upper graph represents the volume and the internal pressure of the film boiling bubble 13 generated by the film boiling. On the other hand, FIG. 6B illustrates the states of the film boiling bubble 13 in association with timings 1 to 3 shown in FIG. 6A. Each of the states is described below in chronological order. The UFBs 11 generated by the film boiling as described later are mainly generated near a surface of the film boiling bubble 13. The states illustrated in FIG. 6B are the states where the UFBs 11 generated by the generating unit 300 are resupplied to the dissolving unit 200 through the circulation route, and the liquid containing the UFBs 11 is resupplied to the liquid passage of the generating unit 300, as illustrated in FIG. 1.

Before a voltage is applied to the heating element 10, the atmospheric pressure is substantially maintained in the chamber 301. Once a voltage is applied to the heating element 10, the film boiling is generated in the liquid in contact with the heating element 10, and a thus-generated air bubble (hereinafter, referred to as the film boiling bubble 13) is expanded by a high pressure acting from inside (timing 1). A bubbling pressure in this process is expected to be around 8 to 10 MPa, which is a value close to a saturation vapor pressure of water.

The time for applying a voltage (pulse width) is around 0.5 μsec to 10.0 μsec, and the film boiling bubble 13 is expanded by the inertia of the pressure obtained in timing 1 even after the voltage application. However, a negative pressure generated with the expansion is gradually increased inside the film boiling bubble 13, and the negative pressure acts in a direction to shrink the film boiling bubble 13. After a while, the volume of the film boiling bubble 13 becomes the maximum in timing 2 when the inertial force and the negative pressure are balanced, and thereafter the film boiling bubble 13 shrinks rapidly by the negative pressure.

In the disappearance of the film boiling bubble 13, the film boiling bubble 13 disappears not in the entire surface of the heating element 10 but in one or more extremely small regions. For this reason, on the heating element 10, further greater force than that in the bubbling in timing 1 is generated in the extremely small region in which the film boiling bubble 13 disappears (timing 3).

The generation, expansion, shrinkage, and disappearance of the film boiling bubble 13 as described above are repeated every time a voltage pulse is applied to the heating element 10, and new UFBs 11 are generated each time.

The states of generation of the UFBs 11 in each process of the generation, expansion, shrinkage, and disappearance of the film boiling bubble 13 are further described in detail with reference to FIGS. 7A to 10B.

Figure 7A:
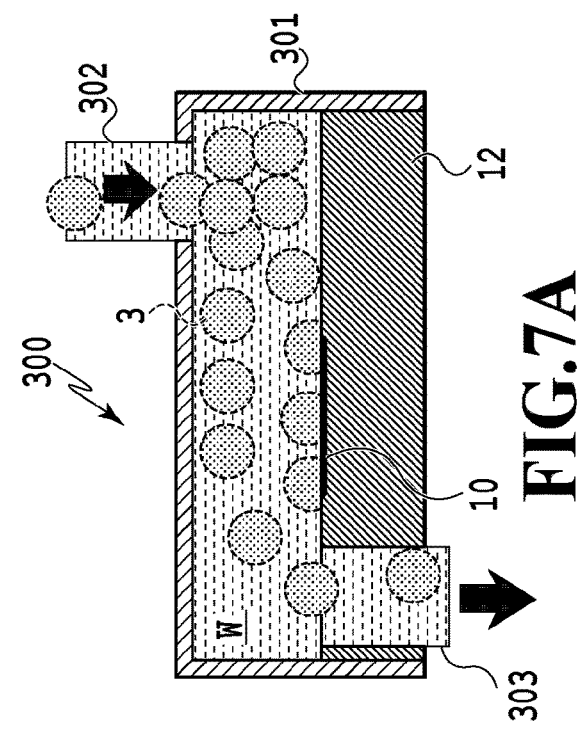
FIGS. 7A to 7D are diagrams illustrating the states of generation of UFBs caused by expansion of a film boiling bubble.

FIGS. 7A to 7D are diagrams schematically illustrating the states of generation of the UFBs 11 caused by the generation and the expansion of the film boiling bubble 13. FIG. 7A illustrates the state before the application of a voltage pulse to the heating element 10. The liquid W in which the gas-dissolved liquids 3 are mixed flows inside the chamber 301.

Figure 7B:
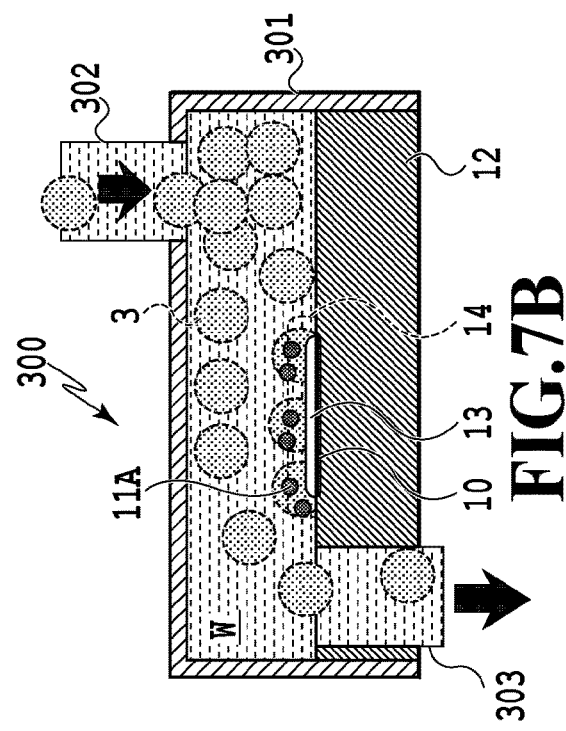

FIG. 7B illustrates the state where a voltage is applied to the heating element 10, and the film boiling bubble 13 is evenly generated in almost all over the region of the heating element 10 in contact with the liquid W. When a voltage is applied, the surface temperature of the heating element 10 rapidly increases at a speed of 10° C./μsec. The film boiling occurs at a time point when the temperature reaches almost 300° C., and the film boiling bubble 13 is thus generated.

Thereafter, the surface temperature of the heating element 10 keeps increasing to around 600 to 800° C. during the pulse application, and the liquid around the film boiling bubble 13 is rapidly heated as well. In FIG. 7B, a region of the liquid that is around the film boiling bubble 13 and to be rapidly heated is indicated as a not-yet-bubbling high temperature region 14. The gas-dissolved liquid 3 within the not-yet-bubbling high temperature region 14 exceeds the thermal dissolution limit and is vaporized to become the UFB. The thus-vaporized air bubbles have diameters of around 10 nm to 100 nm and large gas-liquid interface energy. Thus, the air bubbles float independently in the liquid W without disappearing in a short time. In this embodiment, the air bubbles generated by the thermal action from the generation to the expansion of the film boiling bubble 13 are called first UFBs 11A.

Figure 7C:
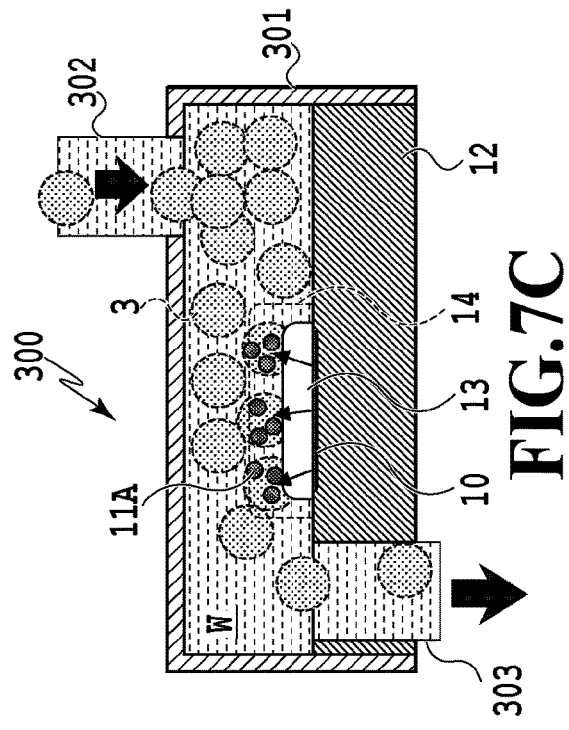

FIG. 7C illustrates the state where the film boiling bubble 13 is expanded. Even after the voltage pulse application to the heating element 10, the film boiling bubble 13 continues expansion by the inertia of the force obtained from the generation thereof, and the not-yet-bubbling high temperature region 14 is also moved and spread by the inertia. Specifically, in the process of the expansion of the film boiling bubble 13, the gas-dissolved liquid 3 within the not-yet-bubbling high temperature region 14 is vaporized as a new air bubble and becomes the first UFB 11A.

Figure 7D:
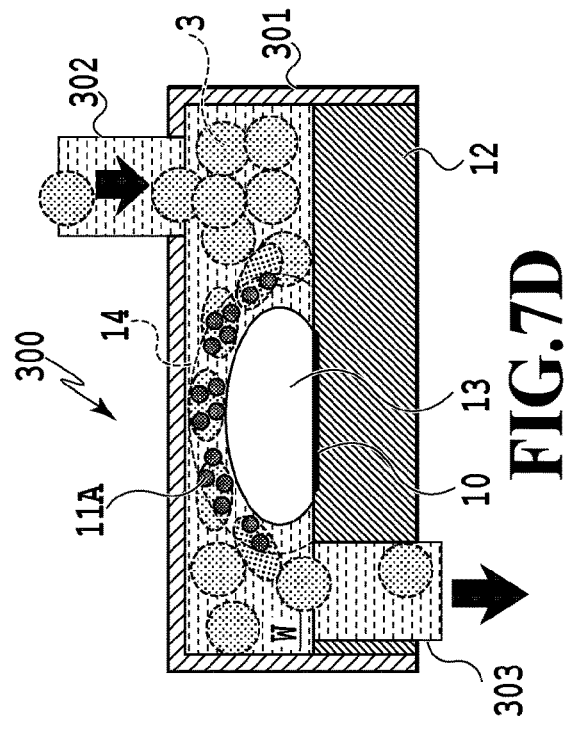

FIG. 7D illustrates the state where the film boiling bubble 13 has the maximum volume. As the film boiling bubble 13 is expanded by the inertia, the negative pressure inside the film boiling bubble 13 is gradually increased along with the expansion, and the negative pressure acts to shrink the film boiling bubble 13. At a time point when the negative pressure and the inertial force are balanced, the volume of the film boiling bubble 13 becomes the maximum, and then the shrinkage is started.

Figure 8A:
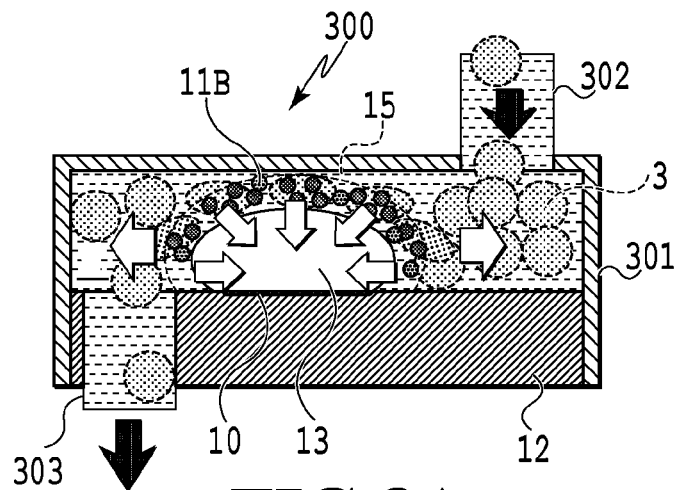
FIGS. 8A to 8C are diagrams illustrating the states of generation of UFBs caused by shrinkage of the film boiling bubble.
Figure 8B:
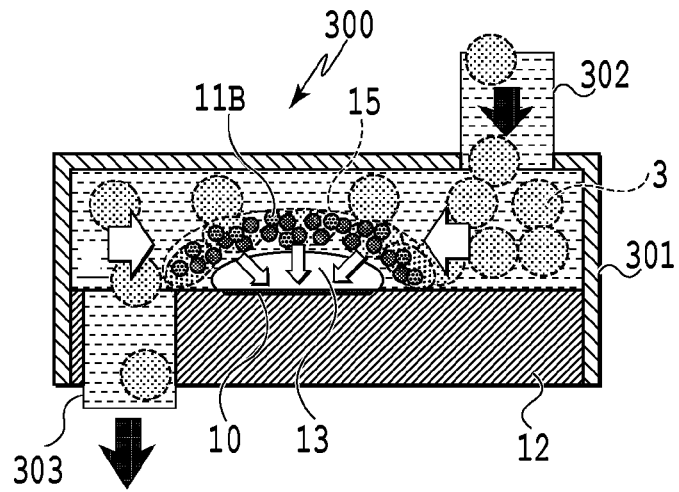
Figure 8C:
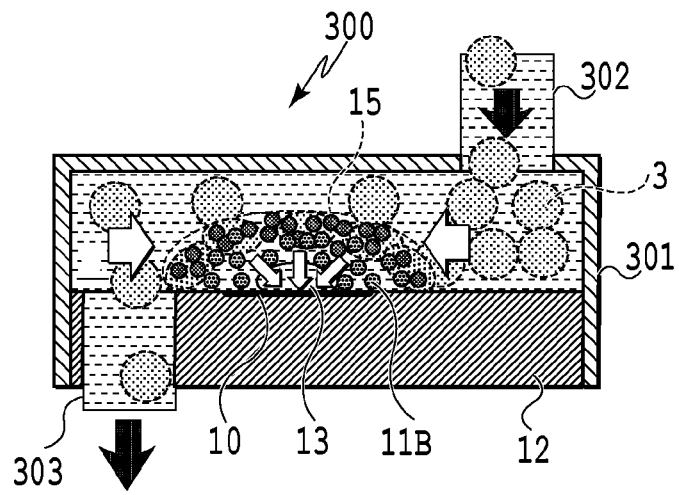
Figure 9A:
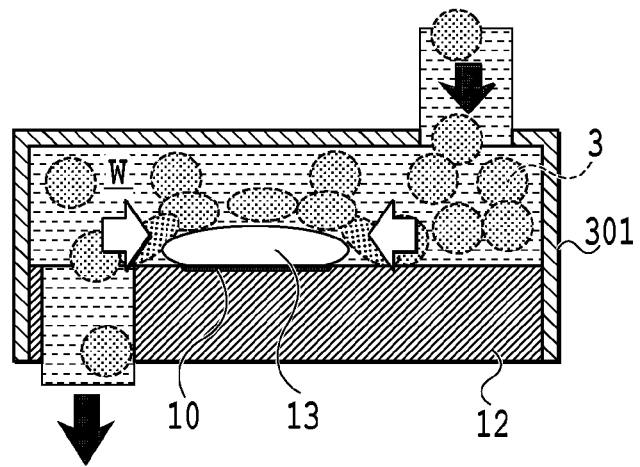
FIGS. 9A to 9C are diagrams illustrating the states of generation of UFBs caused by reheating of the liquid.
Figure 9B:
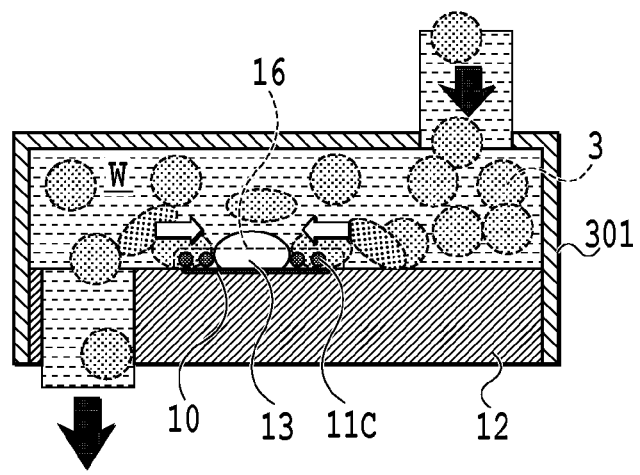
Figure 9C:
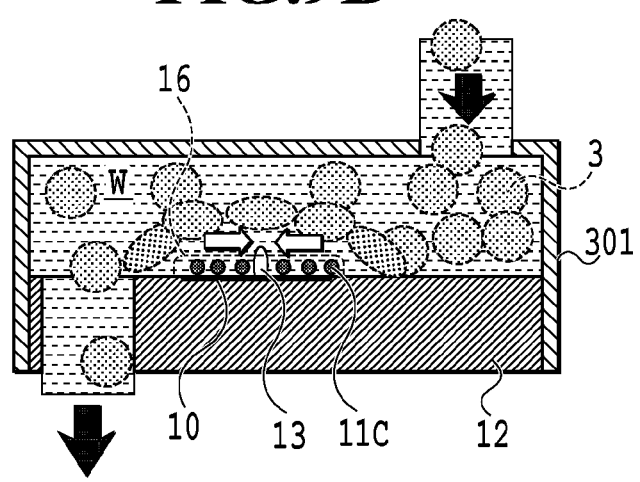

In the shrinking stage of the film boiling bubble 13, there are UFBs generated by the processes illustrated in FIGS. 8A to 8C (second UFBs 11B) and UFBs generated by the processes illustrated in FIGS. 9A to 9C (third UFBs 11C). It is considered that these two processes are made simultaneously.

FIGS. 8A to 8C are diagrams illustrating the states of generation of the UFBs 11 caused by the shrinkage of the film boiling bubble 13. FIG. 8A illustrates the state where the film boiling bubble 13 starts shrinking. Although the film boiling bubble 13 starts shrinking, the surrounding liquid W still has the inertial force in the expansion direction. Because of this, the inertial force acting in the direction of going away from the heating element 10 and the force going toward the heating element 10 caused by the shrinkage of the film boiling bubble 13 act in a surrounding region extremely close to the film boiling bubble 13, and the region is depressurized. The region is indicated in the drawings as a not-yet-bubbling negative pressure region 15.

The gas-dissolved liquid 3 within the not-yet-bubbling negative pressure region 15 exceeds the pressure dissolution limit and is vaporized to become an air bubble. The thus-vaporized air bubbles have diameters of about 100 nm and thereafter float independently in the liquid W without disappearing in a short time. In this embodiment, the air bubbles vaporized by the pressure action during the shrinkage of the film boiling bubble 13 are called the second UFBs 11B.

FIG. 8B illustrates a process of the shrinkage of the film boiling bubble 13. The shrinking speed of the film boiling bubble 13 is accelerated by the negative pressure, and the not-yet-bubbling negative pressure region 15 is also moved along with the shrinkage of the film boiling bubble 13. Specifically, in the process of the shrinkage of the film boiling bubble 13, the gas-dissolved liquids 3 within a part over the not-yet-bubbling negative pressure region 15 are precipitated one after another and become the second UFBs 11B.

FIG. 8C illustrates the state immediately before the disappearance of the film boiling bubble 13. Although the moving speed of the surrounding liquid W is also increased by the accelerated shrinkage of the film boiling bubble 13, a pressure loss occurs due to a flow passage resistance in the chamber 301. As a result, the region occupied by the not-yet-bubbling negative pressure region 15 is further increased, and a number of the second UFBs 11B are generated.

FIGS. 9A to 9C are diagrams illustrating the states of generation of the UFBs by reheating of the liquid W during the shrinkage of the film boiling bubble 13. FIG. 9A illustrates the state where the surface of the heating element 10 is covered with the shrinking film boiling bubble 13.

FIG. 9B illustrates the state where the shrinkage of the film boiling bubble 13 has progressed, and a part of the surface of the heating element 10 comes in contact with the liquid W. In this state, there is heat left on the surface of the heating element 10, but the heat is not high enough to cause the film boiling even if the liquid W comes in contact with the surface. A region of the liquid to be heated by coming in contact with the surface of the heating element 10 is indicated in the drawings as a not-yet-bubbling reheated region 16. Although the film boiling is not made, the gas-dissolved liquid 3 within the not-yet-bubbling reheated region 16 exceeds the thermal dissolution limit and is vaporized. In this embodiment, the air bubbles generated by the reheating of the liquid W during the shrinkage of the film boiling bubble 13 are called the third UFBs 11C.

FIG. 9C illustrates the state where the shrinkage of the film boiling bubble 13 has further progressed. The smaller the film boiling bubble 13, the greater the region of the heating element 10 in contact with the liquid W, and the third UFBs 11C are generated until the film boiling bubble 13 disappears.

Figure 10A:
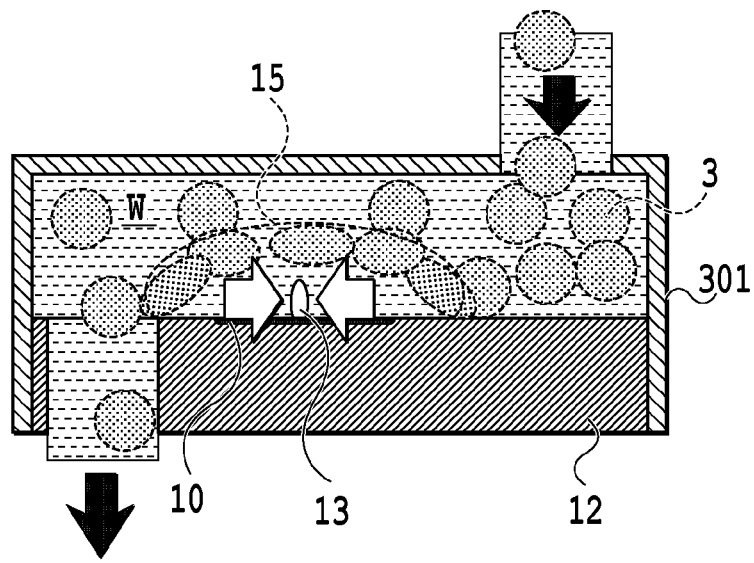
FIGS. 10A and 10B are diagrams illustrating the states of generation of UFBs caused by shock waves made by disappearance of the bubble generated by the film boiling.
Figure 10B:
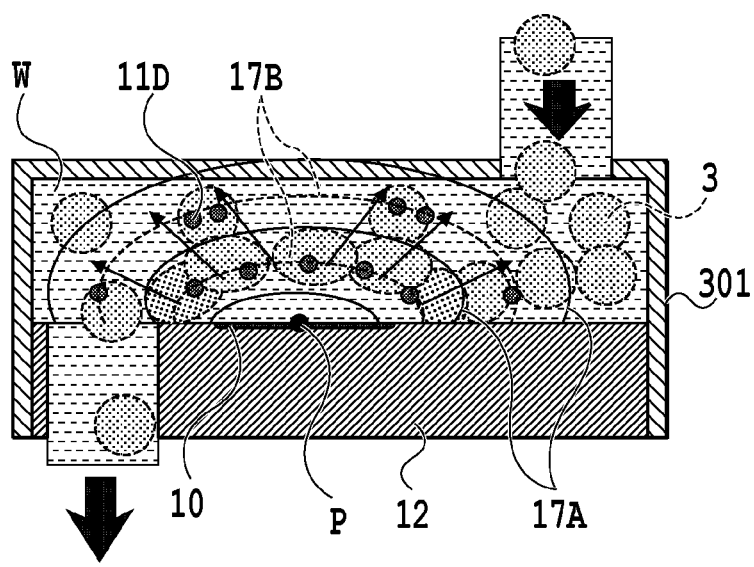

FIGS. 10A and 10B are diagrams illustrating the states of generation of the UFBs caused by an impact from the disappearance of the film boiling bubble 13 generated by the film boiling (that is, a type of cavitation). FIG. 10A illustrates the state immediately before the disappearance of the film boiling bubble 13. In this state, the film boiling bubble 13 shrinks rapidly by the internal negative pressure, and the not-yet-bubbling negative pressure region 15 surrounds the film boiling bubble 13.

FIG. 10B illustrates the state immediately after the film boiling bubble 13 disappears at a point P. When the film boiling bubble 13 disappears, acoustic waves ripple concentrically from the point P as a starting point due to the impact of the disappearance. The acoustic wave is a collective term of an elastic wave that is propagated through anything regardless of gas, liquid, and solid. In this embodiment, compression waves of the liquid W, which are a high pressure surface 17A and a low pressure surface 17B of the liquid W, are propagated alternately.

In this case, the gas-dissolved liquid 3 within the not-yet-bubbling negative pressure region 15 is resonated by the shock waves made by the disappearance of the film boiling bubble 13, and the gas-dissolved liquid 3 exceeds the pressure dissolution limit and the phase transition is made in timing when the low pressure surface 17B passes therethrough. Specifically, a number of air bubbles are vaporized in the not-yet-bubbling negative pressure region 15 simultaneously with the disappearance of the film boiling bubble 13. In this embodiment, the air bubbles generated by the shock waves made by the disappearance of the film boiling bubble 13 are called fourth UFBs 11D.

The fourth UFBs 11D generated by the shock waves made by the disappearance of the film boiling bubble 13 suddenly appear in an extremely short time (1 µS or less) in an extremely narrow thin film-shaped region. The diameter is sufficiently smaller than that of the first to third UFBs, and the gas-liquid interface energy is higher than that of the first to third UFBs. For this reason, it is considered that the fourth UFBs 11D have different characteristics from the first to third UFBs 11A to 11C and generate different effects.

Additionally, the fourth UFBs 11D are evenly generated in many parts of the region of the concentric sphere in which the shock waves are propagated, and the fourth UFBs 11D evenly exist in the chamber 301 from the generation thereof. Although many first to third UFBs already exist in the timing of the generation of the fourth UFBs 11D, the presence of the first to third UFBs does not affect the generation of the fourth UFBs 11D greatly. It is also considered that the first to third UFBs do not disappear due to the generation of the fourth UFBs 11D.

As described above, it is expected that the UFBs 11 are generated in the multiple stages from the generation to the disappearance of the film boiling bubble 13 by the heat generation of the heating element 10. The first UFBs 11A, the second UFBs 11B, and the third UFBs 11C are generated near the surface of the film boiling bubble generated by the film boiling. In this case, near means a region within about 20 µm from the surface of the film boiling bubble. The fourth UFBs 11D are generated in a region through which the shock waves are propagated when the air bubble disappears. Although the above example illustrates the stages to the disappearance of the film boiling bubble 13, the way of generating the UFBs is not limited thereto. For example, with the generated film boiling bubble 13 communicating with the atmospheric air before the bubble disappearance, the UFBs can be generated also if the film boiling bubble 13 does not reach the disappearance.

Next, remaining properties of the UFBs are described. The higher the temperature of the liquid, the lower the dissolution properties of the gas components, and the lower the temperature, the higher the dissolution properties of the gas components. In other words, the phase transition of the dissolved gas components is prompted and the generation of the UFBs becomes easier as the temperature of the liquid is higher. The temperature of the liquid and the solubility of the gas are in the inverse relationship, and the gas exceeding the saturation solubility is transformed into air bubbles and appeared in the liquid as the liquid temperature increases.

Therefore, when the temperature of the liquid rapidly increases from normal temperature, the dissolution properties are decreased without stopping, and the generation of the UFBs starts. The thermal dissolution properties are decreased as the temperature increases, and a number of the UFBs are generated.

Conversely, when the temperature of the liquid decreases from normal temperature, the dissolution properties of the gas are increased, and the generated UFBs are more likely to be liquefied. However, such temperature is sufficiently lower than normal temperature. Additionally, since the once generated UFBs have a high internal pressure and large gas-liquid interface energy even when the temperature of the liquid decreases, it is highly unlikely that there is exerted a sufficiently high pressure to break such a gas-liquid interface. In other words, the once generated UFBs do not disappear easily as long as the liquid is stored at normal temperature and normal pressure.

In this embodiment, the first UFBs 11A described with FIGS. 7A to 7C and the third UFBs 11C described with FIGS. 9A to 9C can be described as UFBs that are generated by utilizing such thermal dissolution properties of gas.

On the other hand, in the relationship between the pressure and the dissolution properties of liquid, the higher the pressure of the liquid, the higher the dissolution properties of the gas, and the lower the pressure, the lower the dissolution properties. In other words, the phase transition to the gas of the gas-dissolved liquid dissolved in the liquid is prompted and the generation of the UFBs becomes easier as the pressure of the liquid is lower. Once the pressure of the liquid becomes lower than normal pressure, the dissolution properties are decreased instantly, and the generation of the UFBs starts. The pressure dissolution properties are decreased as the pressure decreases, and a number of the UFBs are generated.

Conversely, when the pressure of the liquid increases to be higher than normal pressure, the dissolution properties of the gas are increased, and the generated UFBs are more likely to be liquefied. However, such pressure is sufficiently higher than the atmospheric pressure. Additionally, since the once generated UFBs have a high internal pressure and large gas-liquid interface energy even when the pressure of the liquid increases, it is highly unlikely that there is exerted a sufficiently high pressure to break such a gas-liquid interface. In other words, the once generated UFBs do not disappear easily as long as the liquid is stored at normal temperature and normal pressure.

In this embodiment, the second UFBs 11B described with FIGS. 8A to 8C and the fourth UFBs 11D described with FIGS. 10A to 10B can be described as UFBs that are generated by utilizing such pressure dissolution properties of gas.

Those first to fourth UFBs generated by different causes are described individually above; however, the above-described generation causes occur simultaneously with the event of the film boiling. Thus, at least two types of the first to the fourth UFBs may be generated at the same time, and these generation causes may cooperate to generate the UFBs. It should be noted that it is common for all the generation causes to be induced by the volume change of the film boiling bubble generated by the film boiling phenomenon. In this specification, the method of generating the UFBs by utilizing the film boiling caused by the rapid heating as described above is referred to as a thermal-ultrafine bubble (T-UFB) generating method. Additionally, the UFBs generated by the T-UFB generating method are referred to as T-UFBs, and the liquid containing the T-UFBs generated by the T-UFB generating method is referred to as a T-UFB-containing liquid.

Almost all the air bubbles generated by the T-UFB generating method are 1.0 μm or less, and milli-bubbles and microbubbles are unlikely to be generated. That is, the T-UFB generating method allows dominant and efficient generation of the UFBs. Additionally, the T-UFBs generated by the T-UFB generating method have larger gas-liquid interface energy than that of the UFBs generated by a conventional method, and the T-UFBs do not disappear easily as long as being stored at normal temperature and normal pressure. Moreover, even if new T-UFBs are generated by new film boiling, it is possible to prevent disappearance of the already generated T-UFBs due to the impact from the new generation. That is, it can be said that the number and the concentration of the T-UFBs contained in the T-UFB-containing liquid have the hysteresis properties depending on the number of times the film boiling is made in the T-UFB-containing liquid. In other words, it is possible to adjust the concentration of the T-UFBs contained in the T-UFB-containing liquid by controlling the number of the heating elements provided in the T-UFB generating unit 300 and the number of the voltage pulse application to the heating elements.

Reference to FIG. 1 is made again. Once the T-UFB-containing liquid W with a desired UFB concentration is generated in the T-UFB generating unit 300, the UFB-containing liquid W is supplied to the post-processing unit 400.

Figure 11A:
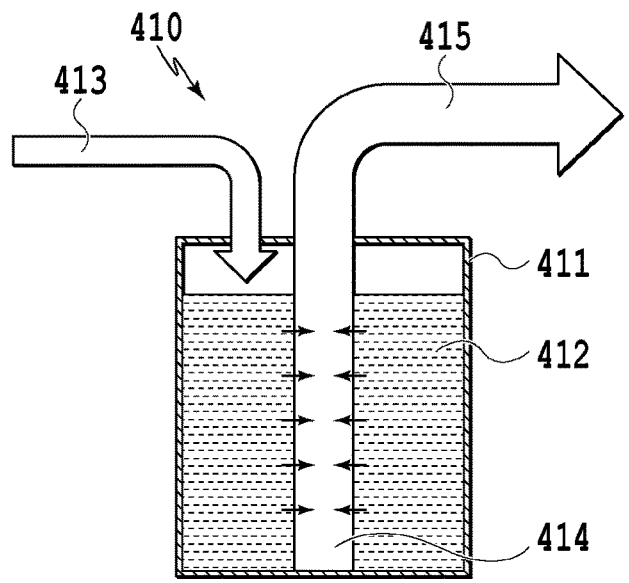
FIGS. 11A to 11C are diagrams illustrating a configuration example of a post-processing unit.
Figure 11B:
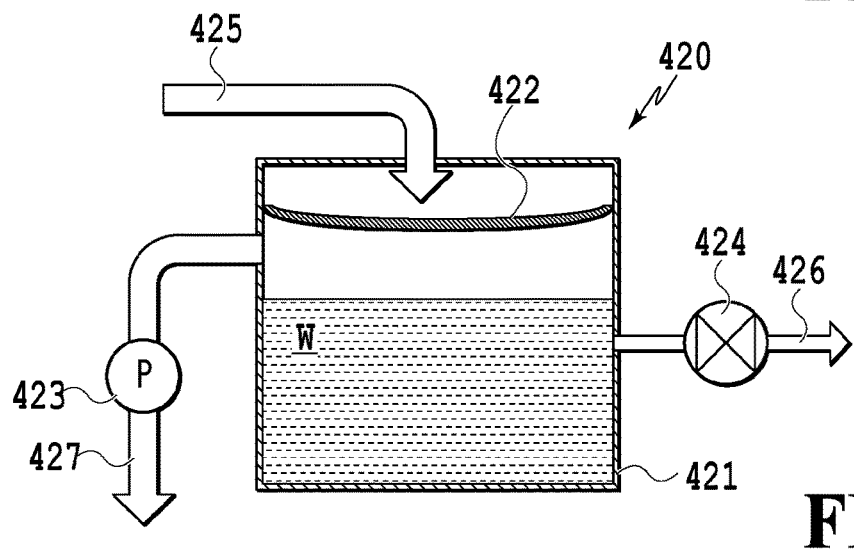
Figure 11C:
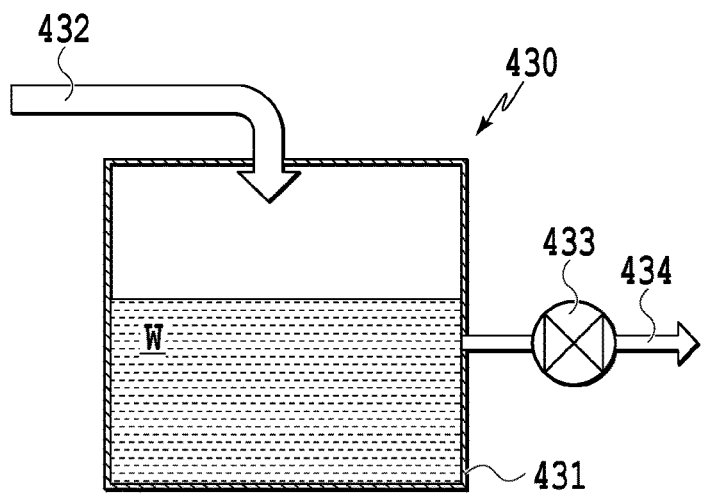

FIGS. 11A to 11C are diagrams illustrating configuration examples of the post-processing unit 400 of this embodiment. The post-processing unit 400 of this embodiment removes impurities in the UFB-containing liquid W in stages in the order from inorganic ions, organic substances, and insoluble solid substances.

FIG. 11A illustrates a first post-processing mechanism 410 that removes the inorganic ions. The first post-processing mechanism 410 includes an exchange container 411, cation exchange resins 412, a liquid introduction passage 413, a collecting pipe 414, and a liquid discharge passage 415. The exchange container 411 stores the cation exchange resins 412. The UFB-containing liquid W generated by the T-UFB generating unit 300 is injected to the exchange container 411 through the liquid introduction passage 413 and absorbed into the cation exchange resins 412 such that the cations as the impurities are removed. Such impurities include metal materials peeled off from the element substrate 12 of the T-UFB generating unit 300, such as $SiO_2$, SiN, SiC, Ta, $Al_2O_3$, $Ta_2O_5$, and Ir.

The cation exchange resins 412 are synthetic resins in which a functional group (ion exchange group) is introduced in a high polymer matrix having a three-dimensional network, and the appearance of the synthetic resins are spherical particles of around 0.4 to 0.7 mm. A general high polymer matrix is the styrene-divinylbenzene copolymer, and the functional group may be that of methacrylic acid series and acrylic acid series, for example. However, the above material is an example. As long as the material can remove desired inorganic ions effectively, the above material can be changed to various materials. The UFB-containing liquid W absorbed in the cation exchange resins 412 to remove the inorganic ions is collected by the collecting pipe 414 and transferred to the next step through the liquid discharge passage 415. In this process in the present embodiment, not all the inorganic ions contained in the UFB-containing liquid W supplied from the liquid introduction passage 413 need to be removed as long as at least a part of the inorganic ions are removed.

FIG. 11B illustrates a second post-processing mechanism 420 that removes the organic substances. The second post-processing mechanism 420 includes a storage container 421, a filtration filter 422, a vacuum pump 423, a valve 424, a liquid introduction passage 425, a liquid discharge passage 426, and an air suction passage 427. Inside of the storage container 421 is divided into upper and lower two regions by the filtration filter 422. The liquid introduction passage 425 is connected to the upper region of the upper and lower two regions, and the air suction passage 427 and the liquid discharge passage 426 are connected to the lower region thereof. Once the vacuum pump 423 is driven with the valve 424 closed, the air in the storage container 421 is discharged through the air suction passage 427 to make the pressure inside the storage container 421 negative pressure, and the UFB-containing liquid W is thereafter introduced from the liquid introduction passage 425. Then, the UFB-containing liquid W from which the impurities are removed by the filtration filter 422 is reserved into the storage container 421.

The impurities removed by the filtration filter 422 include organic materials that may be mixed at a tube or each unit, such as organic compounds including silicon, siloxane, and epoxy, for example. A filter film usable for the filtration filter 422 includes a filter of a sub-μm-mesh (a filter of 1 μm or smaller in mesh diameter) that can remove bacteria, and a filter of a nm-mesh that can remove virus. The filtration filter having such a fine opening diameter may remove air bubbles larger than the opening diameter of the filter. Particularly, there may be the case where the filter is clogged by the fine air bubbles adsorbed to the openings (mesh) of the filter, which may slowdown the filtering speed. However, as described above, most of the air bubbles generated by the T-UFB generating method described in the present embodiment of the invention are in the size of 1 μm or smaller in diameter, and milli-bubbles and microbubbles are not likely to be generated. That is, since the probability of generating milli-bubbles and microbubbles is extremely low, it is possible to suppress the slowdown in the filtering speed due to the adsorption of the air bubbles to the filter. For this reason, it is favorable to apply the filtration filter 422 provided with the filter of 1 μm or smaller in mesh diameter to the system having the T-UFB generating method.

Examples of the filtration applicable to this embodiment may be a so-called dead-end filtration and cross-flow filtration. In the dead-end filtration, the direction of the flow of the supplied liquid and the direction of the flow of the filtration liquid passing through the filter openings are the same, and specifically, the directions of the flows are made along with each other. In contrast, in the cross-flow filtration, the supplied liquid flows in a direction along a filter surface, and specifically, the direction of the flow of the supplied liquid and the direction of the flow of the filtration liquid passing through the filter openings are crossed with each other. It is preferable to apply the cross-flow filtration to suppress the adsorption of the air bubbles to the filter openings.

After a certain amount of the UFB-containing liquid W is reserved in the storage container 421, the vacuum pump 423 is stopped and the valve 424 is opened to transfer the T-UFB-containing liquid in the storage container 421 to the next step through the liquid discharge passage 426. Although the vacuum filtration method is employed as the method of removing the organic impurities herein, a gravity filtration method and a pressurized filtration can also be employed as the filtration method using a filter, for example.

FIG. 11C illustrates a third post-processing mechanism 430 that removes the insoluble solid substances. The third post-processing mechanism 430 includes a precipitation container 431, a liquid introduction passage 432, a valve 433, and a liquid discharge passage 434.

First, a predetermined amount of the UFB-containing liquid W is reserved into the precipitation container 431 through the liquid introduction passage 432 with the valve 433 closed, and leaving it for a while. Meanwhile, the solid substances in the UFB-containing liquid W are precipitated onto the bottom of the precipitation container 431 by gravity. Among the bubbles in the UFB-containing liquid, relatively large bubbles such as microbubbles are raised to the liquid surface by the buoyancy and also removed from the UFB-containing liquid. After a lapse of sufficient time, the valve 433 is opened, and the UFB-containing liquid W from which the solid substances and large bubbles are removed is transferred to the collecting unit 500 through the liquid discharge passage 434. The example of applying the three post-processing mechanisms in sequence is shown in this embodiment; however, it is not limited thereto, and the order of the three post-processing mechanisms may be changed, or at least one needed post-processing mechanism may be employed.

Reference to FIG. 1 is made again. The T-UFB-containing liquid W from which the impurities are removed by the post-processing unit 400 may be directly transferred to the collecting unit 500 or may be put back to the dissolving unit 200 again. In the latter case, the gas dissolution concentration of the T-UFB-containing liquid W that is decreased due to the generation of the T-UFBs can be compensated to the saturated state again by the dissolving unit 200. If new T-UFBs are generated by the T-UFB generating unit 300 after the compensation, it is possible to further increase the concentration of the UFBs contained in the T-UFB-containing liquid with the above-described properties. That is, it is possible to increase the concentration of the contained UFBs by the number of circulations through the dissolving unit 200, the T-UFB generating unit 300, and the post-processing unit 400, and it is possible to transfer the UFB-containing liquid W to the collecting unit 500 after a predetermined concentration of the contained UFBs is obtained. This embodiment shows a form in which the UFB-containing liquid processed by the post-processing unit 400 is put back to the dissolving unit 200 and circulated; however, it is not limited thereto, and the UFB-containing liquid after passing through the T-UFB generating unit may be put back again to the dissolving unit 200 before being supplied to the post-processing unit 400 such that the post-processing is performed by the post-processing unit 400 after the T-UFB concentration is increased through multiple times of circulation, for example.

The collecting unit 500 collects and preserves the UFB-containing liquid W transferred from the post-processing unit 400. The T-UFB-containing liquid collected by the collecting unit 500 is a UFB-containing liquid with high purity from which various impurities are removed.

In the collecting unit 500, the UFB-containing liquid W may be classified by the size of the T-UFBs by performing some stages of filtration processing. Since it is expected that the temperature of the T-UFB-containing liquid W obtained by the T-UFB method is higher than normal temperature, the collecting unit 500 may be provided with a cooling unit. The cooling unit may be provided to a part of the post-processing unit 400.

The schematic description of the UFB generating apparatus 1 is given above; however, it is needless to say that the illustrated multiple units can be changed, and not all of them need to be prepared. Depending on the type of the liquid W and the gas G to be used and the intended use of the T-UFB-containing liquid to be generated, a part of the above-described units may be omitted, or another unit other than the above-described units may be added.

For example, when the gas to be contained by the UFBs is the atmospheric air, the degassing unit as the pre-processing unit 100 and the dissolving unit 200 can be omitted. On the other hand, when multiple kinds of gases are desired to be contained by the UFBs, another dissolving unit 200 may be added.

The units for removing the impurities as described in FIGS. 11A to 11C may be provided upstream of the T-UFB generating unit 300 or may be provided both upstream and downstream thereof. When the liquid to be supplied to the UFB generating apparatus is tap water, rain water, contaminated water, or the like, there may be included organic and inorganic impurities in the liquid. If such a liquid W including the impurities is supplied to the T-UFB generating unit 300, there is a risk of deteriorating the heating element 10 and inducing the salting-out phenomenon. With the mechanisms as illustrated in FIGS. 11A to 11C provided upstream of the T-UFB generating unit 300, it is possible to remove the above-described impurities previously.

Note that in the above description, a control apparatus is included which controls actuator parts of the above-described units, including their opening-closing valves and pumps, and the control apparatus is used to perform UFB generation control according to the user's settings. The UFB generation control by this control apparatus will be described in the embodiments to be discussed later.

Now, the liquid W usable for generating the T-UFB-containing liquid is described. The liquid W usable in this embodiment is, for example, pure water, ion exchange water, distilled water, bioactive water, magnetic active water, lotion, tap water, sea water, river water, clean and sewage water, lake water, underground water, rain water, and so on. A mixed liquid containing the above liquid and the like is also usable. A mixed solvent containing water and soluble organic solvent can be also used. The soluble organic solvent to be used by being mixed with water is not particularly limited; however, the followings can be a specific example thereof. An alkyl alcohol group of the carbon number of 1 to 4 including methyl alcohol, ethyl alcohol, n-propyl alcohol, isopropyl alcohol, n-butyl alcohol, sec-butyl alcohol, and tert-butyl alcohol. An amide group including N-methyl-2-pyrrolidone, 2-pyrrolidone, 1,3-dimethyl-2-imidazolidinone, N,N-dimethylformamide, and N,N-dimethylacetamide. A keton group or a ketoalcohol group including acetone and diacetone alcohol. A cyclic ether group including tetrahydrofuran and dioxane. A glycol group including ethylene glycol, 1,2-propylene glycol, 1,3-propylene glycol, 1,2-butanediol, 1,3-butanediol, 1,4-butanediol, 1,5-pentanediol, 1,2-hexanediol, 1,6-hexanediol, 3-methyl-1,5-pentanediol, diethylene glycol, triethylene glycol, and thiodiglycol. A group of lower alkyl ether of polyhydric alcohol including ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether. A polyalkylene glycol group including polyethylene glycol and polypropylene glycol. A triol group including glycerin, 1,2,6-hexanetriol, and trimethylolpropane. These soluble organic solvents can be used individually, or two or more of them can be used together.

A gas component that can be introduced into the dissolving unit 200 is, for example, hydrogen, helium, oxygen, nitrogen, methane, fluorine, neon, carbon dioxide, ozone, argon, chlorine, ethane, propane, air, and so on. The gas component may be a mixed gas containing some of the above. Additionally, it is not necessary for the dissolving unit 200 to dissolve a substance in a gas state, and the dissolving unit 200 may fuse a liquid or a solid containing desired components into the liquid W. The dissolution in this case may be spontaneous dissolution, dissolution caused by pressure application, or dissolution caused by hydration, ionization, and chemical reaction due to electrolytic dissociation.

<<Effects of T-UFB Generating Method>>

Next, the characteristics and the effects of the above-described T-UFB generating method are described by comparing with a conventional UFB generating method. For example, in a conventional air bubble generating apparatus as represented by the Venturi method, a mechanical depressurizing structure such as a depressurizing nozzle is provided in a part of a flow passage. A liquid flows at a predetermined pressure to pass through the depressurizing structure, and air bubbles of various sizes are generated in a downstream region of the depressurizing structure.

In this case, among the generated air bubbles, since the relatively large bubbles such as milli-bubbles and microbubbles are affected by the buoyancy, such bubbles rise to the liquid surface and disappear. Even the UFBs that are not affected by the buoyancy may also disappear with the milli-bubbles and microbubbles since the gas-liquid interface energy of the UFBs is not very large. Additionally, even if the above-described depressurizing structures are arranged in series, and the same liquid flows through the depressurizing structures repeatedly, it is impossible to store for a long time the UFBs of the number corresponding to the number of repetitions. In other words, it has been difficult for the UFB-containing liquid generated by the conventional UFB generating method to maintain the concentration of the contained UFBs at a predetermined value for a long time.

In contrast, in the T-UFB generating method of this embodiment utilizing the film boiling, a rapid temperature change from normal temperature to about 300° C. and a rapid pressure change from normal pressure to around a several megapascal occur locally in a part extremely close to the heating element. The heating element is a rectangular shape having one side of around several tens to hundreds of μm. It is around $1/10$ to $1/1000$ of the size of a conventional UFB generating unit. Additionally, with the gas-dissolved liquid within the extremely thin film region of the film boiling bubble surface exceeding the thermal dissolution limit or the pressure dissolution limit instantaneously (in an extremely short time under microseconds), the phase transition occurs and the gas-dissolved liquid is precipitated as the UFBs. In this case, the relatively large bubbles such as milli-bubbles and microbubbles are hardly generated, and the liquid contains the UFBs of about 100 nm in diameter with extremely high purity. Moreover, since the T-UFBs generated in this way have sufficiently large gas-liquid interface energy, the T-UFBs are not broken easily under the normal environment and can be stored for a long time.

Particularly, the present invention using the film boiling phenomenon that enables local formation of a gas interface in the liquid can form an interface in a part of the liquid close to the heating element without affecting the entire liquid region, and a region on which the thermal and pressure actions performed can be extremely local. As a result, it is possible to stably generate desired UFBs. With further more conditions for generating the UFBs applied to the generation liquid through the liquid circulation, it is possible to additionally generate new UFBs with small effects on the already-made UFBs. As a result, it is possible to produce a UFB-containing liquid of a desired size and concentration relatively easily.

Moreover, since the T-UFB generating method has the above-described hysteresis properties, it is possible to increase the concentration to a desired concentration while keeping the high purity. In other words, according to the T-UFB generating method, it is possible to efficiently generate a long-time storable UFB-containing liquid with high purity and high concentration.

<<Specific Usage of T-UFB-Containing Liquid>>

In general, applications of the ultrafine bubble-containing liquids are distinguished by the type of the containing gas. Any type of gas can make the UFBs as long as an amount of around PPM to BPM of the gas can be dissolved in the liquid. For example, the ultrafine bubble-containing liquids can be applied to the following applications.

A UFB-containing liquid containing air can be preferably applied to cleansing in the industrial, agricultural and fishery, and medical scenes and the like, and to cultivation of plants and agricultural and fishery products.

A UFB-containing liquid containing ozone can be preferably applied to not only cleansing application in the industrial, agricultural and fishery, and medical scenes and the like, but to also applications intended to disinfection, sterilization, and decontamination, and environmental cleanup of drainage and contaminated soil, for example.

A UFB-containing liquid containing nitrogen can be preferably applied to not only cleansing application in the industrial, agricultural and fishery, and medical scenes and the like, but to also applications intended to disinfection, sterilization, and decontamination, and environmental cleanup of drainage and contaminated soil, for example.

A UFB-containing liquid containing oxygen can be preferably applied to cleansing application in the industrial, agricultural and fishery, and medical scenes and the like, and to cultivation of plants and agricultural and fishery products.

A UFB-containing liquid containing carbon dioxide can be preferably applied to not only cleansing application in the industrial, agricultural and fishery, and medical scenes and the like, but to also applications intended to disinfection, sterilization, and decontamination, for example.

A UFB-containing liquid containing perfluorocarbons as a medical gas can be preferably applied to ultrasonic diagnosis and treatment. As described above, the UFB-containing liquids can exert the effects in various fields of medical, chemical, dental, food, industrial, agricultural and fishery, and so on.

In each of the applications, the purity and the concentration of the UFBs contained in the UFB-containing liquid are important for quickly and reliably exert the effect of the UFB-containing liquid. In other words, unprecedented effects can be expected in various fields by utilizing the T-UFB generating method of this embodiment that enables generation of the UFB-containing liquid with high purity and desired concentration. Here is below a list of the applications in which the T-UFB generating method and the T-UFB-containing liquid are expected to be preferably applicable.

(A) Liquid Purification Application

With the T-UFB generating unit provided to a water clarification unit, enhancement of an effect of water clarification and an effect of purification of PH adjustment liquid is expected. The T-UFB generating unit may also be provided to a carbonated water server.

With the T-UFB generating unit provided to a humidifier, aroma diffuser, coffee maker, and the like, enhancement of a humidifying effect, a deodorant effect, and a scent spreading effect in a room is expected.

If the UFB-containing liquid in which an ozone gas is dissolved by the dissolving unit is generated and is used for dental treatment, burn treatment, and wound treatment using an endoscope, enhancement of a medical cleansing effect and an antiseptic effect is expected.

With the T-UFB generating unit provided to a water storage tank of a condominium, enhancement of a water clarification effect and chlorine removing effect of drinking water to be stored for a long time is expected.

If the T-UFB-containing liquid containing ozone or carbon dioxide is used for brewing process of Japanese sake, shochu, wine, and so on in which the high-temperature pasteurization processing cannot be performed, more efficient pasteurization processing than that with the conventional liquid is expected.

If the UFB-containing liquid is mixed into the ingredient in a production process of the foods for specified health use and the foods with functional claims, the pasteurization processing is possible, and thus it is possible to provide safe and functional foods without a loss of flavor.

With the T-UFB generating unit provided to a supplying route of sea water and fresh water for cultivation in a cultivation place of fishery products such as fish and pearl, prompting of spawning and growing of the fishery products is expected.

With the T-UFB generating unit provided in a purification process of water for food preservation, enhancement of the preservation state of the food is expected.

With the T-UFB generating unit provided in a bleaching unit for bleaching pool water or underground water, a higher bleaching effect is expected.

With the T-UFB-containing liquid used for repairing a crack of a concrete member, enhancement of the effect of crack repairment is expected.

With the T-UFBs contained in liquid fuel for a machine using liquid fuel (such as automobile, vessel, and airplane), enhancement of energy efficiency of the fuel is expected.

(B) Cleansing Application

Recently, the UFB-containing liquids have been receiving attention as cleansing water for removing soils and the like attached to clothing. If the T-UFB generating unit described in the above embodiment is provided to a washing machine, and the UFB-containing liquid with higher purity and better permeability than the conventional liquid is supplied to the washing tub, further enhancement of detergency is expected.

With the T-UFB generating unit provided to a bath shower and a bedpan washer, not only a cleansing effect on all kinds of animals including human body but also an effect of prompting contamination removal of a water stain and a mold on a bathroom and a bedpan are expected.

With the T-UFB generating unit provided to a window washer for automobiles, a high-pressure washer for cleansing wall members and the like, a car washer, a dishwasher, a food washer, and the like, further enhancement of the cleansing effects thereof is expected.

With the T-UFB-containing liquid used for cleansing and maintenance of parts produced in a factory including a burring step after pressing, enhancement of the cleansing effect is expected.

In production of semiconductor elements, if the T-UFB-containing liquid is used as polishing water for a wafer, enhancement of the polishing effect is expected. Additionally, if the T-UFB-containing liquid is used in a resist removal step, prompting of peeling of resist that is not peeled off easily is enhanced.

With the T-UFB generating unit is provided to machines for cleansing and decontaminating medical machines such as a medical robot, a dental treatment unit, an organ preservation container, and the like, enhancement of the cleansing effect and the decontamination effect of the machines is expected. The T-UFB generating unit is also applicable to treatment of animals.

(C) Pharmaceutical Application

If the T-UFB-containing liquid is contained in cosmetics and the like, permeation into subcutaneous cells is prompted, and additives that give bad effects to skin such as preservative and surfactant can be reduced greatly. As a result, it is possible to provide safer and more functional cosmetics.

If a high concentration nanobubble preparation containing the T-UFBs is used for contrasts for medical examination apparatuses such as a CT and an MRI, reflected light of X-rays and ultrasonic waves can be efficiently used. This makes it possible to capture a more detailed image that is usable for initial diagnosis of a cancer and the like.

If a high concentration nanobubble water containing the T-UFBs is used for a ultrasonic wave treatment machine called high-intensity focused ultrasound (HIFU), the irradiation power of ultrasonic waves can be reduced, and thus the treatment can be made more non-invasive. Particularly, it is possible to reduce the damage to normal tissues.

It is possible to create a nanobubble preparation by using high concentration nanobubbles containing the T-UFBs as a source, modifying a phospholipid forming a liposome in a negative electric charge region around the air bubble, and applying various medical substances (such as DNA and RNA) through the phospholipid.

If a drug containing high concentration nanobubble water made by the T-UFB generation is transferred into a dental canal for regenerative treatment of pulp and dentine, the drug enters deeply a dentinal tubule by the permeation effect of the nanobubble water, and the decontamination effect is prompted. This makes it possible to treat the infected root canal of the pulp safely in a short time.

First Embodiment

Next, a first embodiment of the present invention will be described. A UFB-containing liquid producing apparatus in the present embodiment has a configuration capable of continuing supplying a UFB-containing liquid even in a case where one of its constituent elements falls into a malfunctioning state. It is therefore possible to solve the problem with conventional apparatuses in that the supply of a UFB-containing liquid is intermitted due to a process of replacing a broken element or the like. In the following, in order to clarify the effectiveness of the present embodiment, a schematic configuration of a conventional apparatus will be described first, and a configuration and operation of the present embodiment will be described thereafter.

Figure 34:
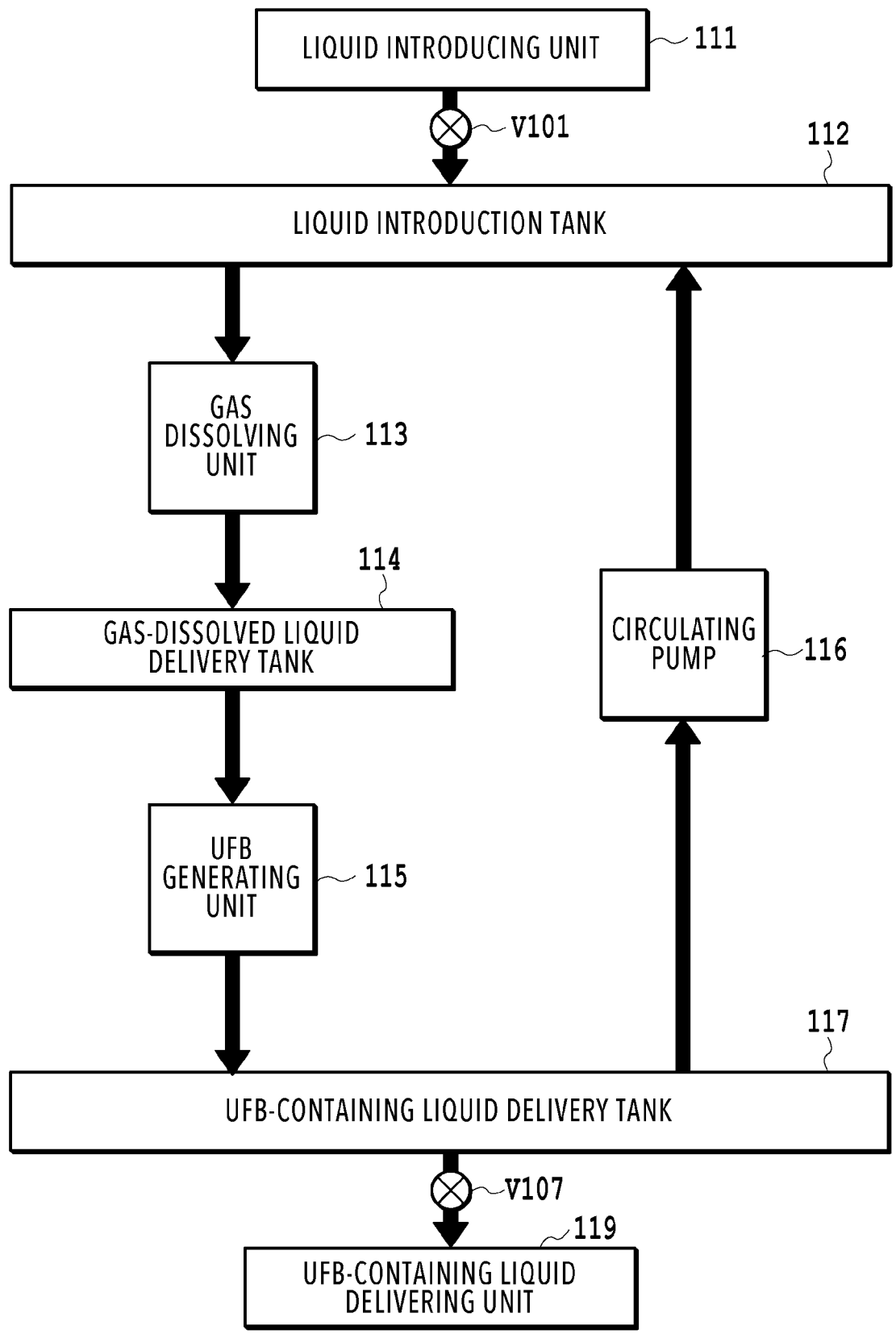
FIG. 34 is a block diagram illustrating a configuration of a conventional UFB-containing liquid producing apparatus.

FIG. 34 is a diagram illustrating a schematic configuration of a conventional UFB-containing liquid producing apparatus. A liquid introducing unit 111 supplies a liquid (e.g., water) in which to generate UFBs into a liquid introduction tank 112 through an opening-closing valve V101. The liquid introduction tank 112 is supplied with the liquid supplied from the liquid introducing unit 101, in which UFBs are yet to be generated, and a UFB-containing liquid supplied from a circulating pump 116, in which UFBs have been generated, and supplies a liquid in which both of these liquids are mixed to a gas dissolving unit 113.

The gas dissolving unit 113 dissolves a gas into the liquid supplied from the liquid introduction tank 112 to produce a gas-dissolved liquid and supplies it to a gas-dissolved liquid delivery tank 114. A method such as a pressurized dissolution method or bubbling is used as a method of dissolving the gas. The gas-dissolved liquid delivery tank 114 serves to receive the gas-dissolved liquid supplied from the gas dissolving unit 113 and supply it to a UFB generating unit 115.

The UFB generating unit 115 generates UFBs in the gas-dissolved liquid supplied from the gas-dissolved liquid delivery tank 114 to produce a UFB-containing liquid, and supplies the produced UFB-containing liquid to a UFB-containing liquid delivery tank 117. The UFB-containing liquid delivery tank 117 serves to receive the UFB-containing liquid supplied from the UFB generating unit 115, and supply the UFB-containing liquid to the circulating pump 116 or a UFB-containing liquid delivering unit 119.

The circulating pump 116 serves to suck the UFB-containing liquid from the UFB-containing liquid delivery tank 117 and supply it to the liquid introduction tank 112. This circulating pump 116 enables liquid circulation through a circulation route of the liquid introduction tank 112→the gas dissolving unit 113→the gas-dissolved liquid delivery tank 114→the UFB generating unit 115→the UFB-containing liquid delivery tank 117→the circulating pump 116→the liquid introduction tank 112. By performing liquid circulation in this manner, it is possible to produce a UFB-containing liquid in which UFBs are present at a desired density. The produced UFB-containing liquid is delivered to the UFB-containing liquid delivering unit 119 through an opening-closing valve V117. The UFB-containing liquid delivering unit 119 supplies the UFB-containing liquid to any of various UFB using apparatuses such as a cleaning apparatus or a medical apparatus.

The liquid changes as below while circulating through the circulation route.

As the gas dissolved at the gas dissolving unit 113 is turned into UFBs at the UFB generating unit 115, the amount of the dissolved gas in the liquid decreases (note that the total gas amount, or the amount of the dissolved gas+the amount of the gas in the UFBs, remains substantially unchanged).

The liquid in which the amount of the dissolved gas has decreased passes through the circulation route to flow into the gas dissolving unit 113 again, so that the amount of the dissolved gas increases. Accordingly, the total gas amount (the amount of the dissolved gas+the amount of the gas in the UFBs) increases.

The amount of the dissolved gas saturates at a certain value determined by temperature and gas type, but a stable gas-containing liquid is produced in which the total gas amount (the amount of the dissolved gas+the amount of the gas in the UFBs) is greater than the saturated dissolved gas amount.

Meanwhile, an opening-closing valve V101 is provided between the liquid introducing unit 111 and the liquid introduction tank 112, and the opening-closing valve V107 is provided between the UFB-containing liquid delivery tank 117 and the UFB-containing liquid delivering unit 119. Both of the opening-closing valves V101 and V107 are in an open state (communicating state) during production of a UFB-containing. In a case of replacing any of the gas dissolving unit 113, the UFB generating unit 115, and the circulating pump 106, the replacement process is performed with the opening-closing valves V101 and V107 set in a closed state (shut-off state). After the replacement process is completed, the opening-closing valves V101 and V107 are set into an open state, and the production of a UFB-containing liquid is resumed.

As described above, a single circulation route is formed in the conventional UFB-containing liquid producing apparatus. The circulation route includes constituent elements such as the gas dissolving unit 113, the UFB generating unit 115, and the circulating pump 116, and there is a possibility that they malfunction. In a case where one of the constituent elements in the circulation route malfunctions, it will be necessary to perform a process such as replacement or repair of the constituent element. In this case, the production of a UFB-containing liquid will be stopped and the supply of a UFB-containing liquid to the UFB-containing liquid delivering unit 119 will be shut off until the process is completed.

For this reason, in a case where a UFB using apparatus (not illustrated) connected to the UFB-containing liquid delivering unit 119 requires a constant supply of a UFB-containing liquid at all times, there is a possibility of falling into a situation where the operation of the UFB using apparatus has to be stopped if the UFB-containing liquid producing apparatus stops. Thus, in the case of a UFB using apparatus used in a situation where it is required to operate continuously, such as a medical apparatus or a plant, stoppage of the UFB-containing liquid producing apparatus has a tremendous impact on the UFB using apparatus. The present embodiment can solve the problem with a conventional apparatus as above, and has a configuration capable of continuing supplying a UFB-containing liquid even in a case where an element in the apparatus malfunctions.

Figure 12:
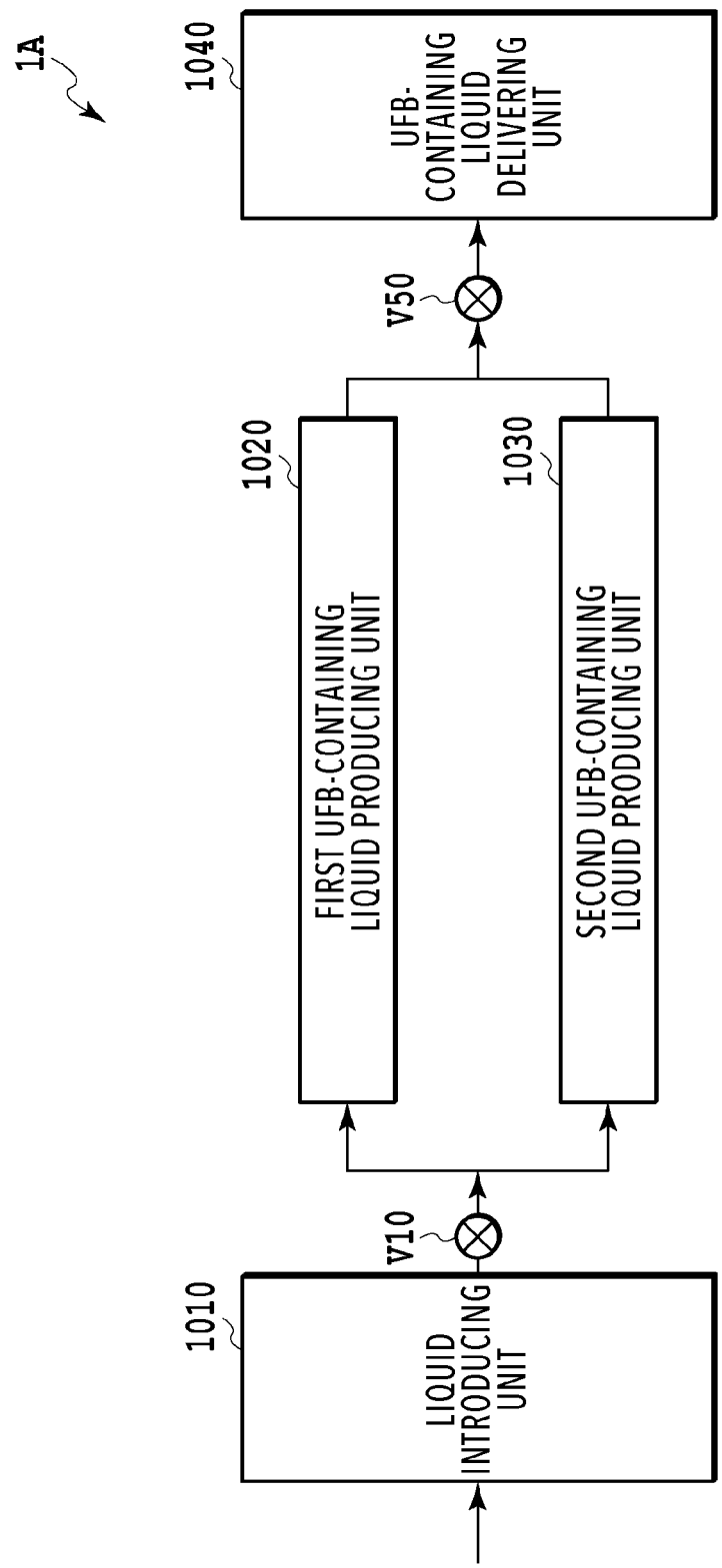
FIG. 12 is a block diagram schematically illustrating a configuration of a UFB-containing liquid producing apparatus in a first embodiment.

FIG. 12 is a block diagram schematically illustrating the configuration of the present embodiment. A UFB-containing liquid producing apparatus 1A illustrated in FIG. 12 has a liquid introducing unit 1010, a first UFB-containing liquid producing unit 1020, a second UFB-containing liquid producing unit 1030, and a UFB-containing liquid delivering unit (liquid delivering unit) 1040.

The first UFB-containing liquid producing unit 1020 and the second UFB-containing liquid producing unit 1030 has the same configuration and are each connected to the liquid introducing unit 1010 via an opening-closing valve V10. Further, the first UFB-containing liquid producing unit 1020 and the second UFB-containing liquid producing unit 1030 are connected to the UFB-containing liquid delivering unit 1040 via an opening-closing valve V50.

Both the first UFB-containing liquid producing unit 1020 and the second UFB-containing liquid producing unit 1030 have a configuration capable of circulating a liquid supplied from the liquid introducing unit 1010 and producing a UFB-containing liquid of a desired concentration. The UFB-containing liquids produced by the first UFB-containing liquid producing unit 1020 and the second UFB-containing liquid producing unit 1030 are supplied to the UFB-containing liquid delivering unit 1040 through the opening-closing valve V50, and the UFB-containing liquids supplied to the UFB-containing liquid delivering unit 1040 are supplied to a UFB using apparatus (not illustrated). Examples of the UFB using apparatus may include various apparatuses including a cleaning apparatus, a medical apparatus, and so on, as mentioned in the above description of the basic configuration. Note that the first UFB-containing liquid producing unit 1020 and the second UFB-containing liquid producing unit 1030 constitute a producing unit in the present invention.

Figure 13:
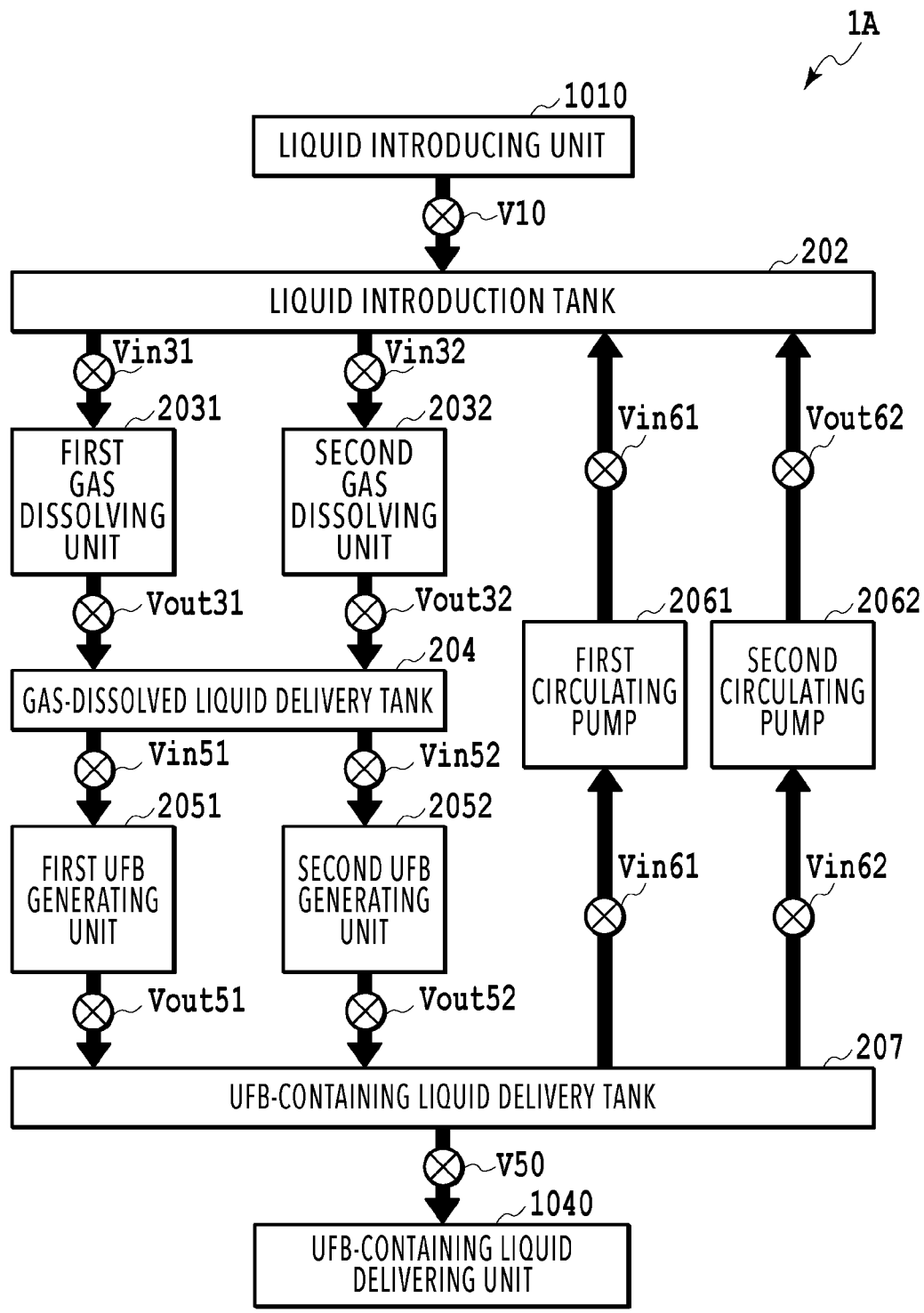
FIG. 13 is a block diagram illustrating the configuration of the UFB-containing liquid producing apparatus illustrated in FIG. 12 in more detail.

FIG. 13 is a block diagram illustrating the configuration of the UFB-containing liquid producing apparatus 1A illustrated in FIG. 12 in more detail. The UFB-containing liquid producing apparatus 1A is provided with the liquid introducing unit 1010, the UFB-containing liquid delivering unit 1040, the first UFB-containing liquid producing unit 1020, and the second UFB-containing liquid producing unit 1030, as mentioned above.

The first UFB-containing liquid producing unit 1020 is configured of constituent elements such as a liquid introduction tank 202, a first gas dissolving unit 2031, a gas-dissolved liquid delivery tank 204, a first UFB generating unit (first ultrafine bubble generating unit) 2051, a UFB-containing liquid delivery tank 207, and a first circulating pump 2061. Further, opening-closing valves Vin31, Vout31, Vin51, Vout51, Vin61, and Vout62 are provided between the constituent elements of the first UFB-containing liquid producing unit 1020.

Also, the second UFB-containing liquid producing unit 1030 is configured of constituent elements such as the liquid introduction tank 202, a second gas dissolving unit 2032, the gas-dissolved liquid delivery tank 204, a second UFB generating unit (second ultrafine bubble generating unit) 2052, the UFB-containing liquid delivery tank 207, and a second circulating pump 2062. Further, opening-closing valves Vin32, Vout32, Vin52, Vout52, Vin62, and Vout62 are provided between the constituent elements of the second UFB-containing liquid producing unit 1020.

The configurations of the units illustrated in the above-described basic configuration can be employed for the constituent elements of the first and second UFB-containing liquid producing units 1020 and 1030. Specifically, the configuration of the pre-processing unit 100 illustrated in the basic configuration can be employed for the liquid introduction tank 202. The configuration of the dissolving unit 200 illustrated in the basic configuration can be employed for the first and second gas dissolving units 2031 and 2032 and the gas-dissolved liquid delivery tank 204. The configuration of the T-UFB generating unit 300 illustrated in the basic configuration can be employed for the first and second UFB generating units 2051 and 2052. The post-processing unit 400 illustrated in the basic configuration can be employed as the UFB-containing liquid delivery tank 207. Further, the configuration of the collecting unit 500 illustrated in the basic configuration can be employed for the UFB-containing liquid delivering unit 1040.

As described above, in the present embodiment, the first and second UFB-containing liquid producing units 1020 and 1030 provided between the liquid introducing unit 1010 and the UFB-containing liquid delivering unit 1040 constitute two liquid supplying units for producing a UFB-containing liquid. Note that the liquid introduction tank 202, the gas-dissolved liquid delivery tank 204, and the UFB-containing liquid delivery tank 207 are constituent elements shared by the first UFB-containing liquid producing unit 1020 and the second UFB-containing liquid producing unit 1030. The other constituent elements, on the other hand, have configurations independent of each other.

The functions of the above constituent elements will now be described. The liquid introducing unit 1010 supplies a liquid (e.g., water) in which to generate UFBs through the opening-closing valve V10 to the liquid introduction tank 202, which is a constituent element shared by the first UFB-containing liquid producing unit 1020 and the second UFB-containing liquid producing unit 1030.

The liquid introduction tank 202 receives the liquid supplied from the liquid introducing unit 1010 and UFB-containing liquids supplied from the first and second circulating pumps 2061 and 2062. Also, the liquid introduction tank 202 serves to supply a mixed liquid of the liquid supplied from the liquid introducing unit 1010 and the UFB-containing liquids supplied from the first and second circulating pumps 2061 and 2062 to the first and second gas dissolving units 2031 and 2032 through the opening-closing valves Vin31 and Vin32.

The first gas dissolving unit 2031 and the second gas dissolving unit 2032 have configurations capable of operating independently. The gas dissolving units 2031 and 2032 dissolve a gas into the liquid supplied from the liquid introduction tank 202 to produce a gas-dissolved liquid, and supply the produced gas-dissolved liquid to the gas-dissolved liquid delivery tank 204 through the opening-closing valves Vout31 and Vout32. A method such as a pressurized dissolution method or bubbling is used as a method of dissolving the gas into the liquid.

The gas-dissolved liquid delivery tank 204, which is a constituent element shared by the first UFB-containing liquid producing unit 1020 and the second UFB-containing liquid producing unit 1030, receives the gas-dissolved liquid supplied from each of the first and second gas dissolving units 2031 and 2032. Then, the gas-dissolved liquid delivery tank 204 supplies the received gas-dissolved liquid to the first UFB generating unit 2051 and the second UFB generating unit 2052 through the opening-closing valves Vin51 and Vin52.

The first UFB generating unit 2051 and the second UFB generating unit 2052 each have a configuration capable of operating independently. The UFB generating units 2051 and 2052 each generate UFBs in the gas-dissolved liquid supplied from the gas-dissolved liquid delivery tank 204. In the present embodiment, UFBs are generated in the supplied gas-dissolved liquid by a T-UFB method using a heater, like the above-described basic configuration. The UFB-containing liquids produced by the two UFB generating units 2051 and 2052 are transferred to the UFB-containing liquid delivery tank 207, which is a constituent element shared by the first UFB-containing liquid producing unit 1020 and the second UFB-containing liquid producing unit 1030.

The UFB-containing liquid delivery tank 207 serves to receive the UFB-containing liquids supplied from the first UFB generating unit 2051 and the second UFB generating unit 2052, and supply them to the first circulating pump 2061, the second circulating pump 2062, and the UFB-containing liquid delivering unit 1040.

The first circulating pump 2061 and the second circulating pump 2062 serve to receive the UFB-containing liquid supplied from the UFB-containing liquid delivery tank 207 and supply it to the liquid introduction tank 202. The first circulating pump 2061 and the second circulating pump 2062 can be operated independently of each other by a control unit 1000 to be described later.

Meanwhile, during the production of a UFB-containing liquid, the opening-closing valve V10 provided between the liquid introducing unit 1010 and the liquid introduction tank 202 and the opening-closing valve V50 provided between the UFB-containing liquid delivery tank 207 and the UFB-containing liquid delivering unit 1040 are each set in an open state, i.e., a state in which a liquid can flow through the opening-closing valve. Also, in a case of installing the first and second gas dissolving units 2031 and 2032, the first and second UFB generating units 2051 and 2052, and the first and second circulating pumps 2061 and 2062 at the time of arrival or the like, the opening-closing valves V10 and V50 are closed to be in a state of shutting off a liquid flow. Then, in a state where the installation process after the arrival is completed, the opening-closing valve V10 and the opening-closing valve V50 are set into an open state, and production of a UFB-containing liquid is started.

The opening-closing valve Vin31 provided between the liquid introduction tank 202 and the first gas dissolving unit 2031 and the opening-closing valve Vout31 provided between the first gas dissolving unit 2031 and the gas-dissolved liquid delivery tank 204 are in a connecting state while the first gas dissolving unit 2031 is caused to operate. In a case of replacing the first gas dissolving unit 2031, the replacement process is performed with the opening-closing valve Vin31 set in a closed state. After the replacement process is finished, the opening-closing valve Vin31 and the opening-closing valve Vout31 are set in an open state, and the gas dissolving unit is caused to operate again. Similarly, the opening-closing valve Vin32 provided between the liquid introduction tank 202 and the second gas dissolving unit 2032 and the opening-closing valve Vout32 provided between the second gas dissolving unit 2032 and the gas-dissolved liquid delivery tank 204 are switched between an open state and a closed state according to whether the second gas dissolving unit 2032 is caused to operate or replaced.

In a case of replacing the first gas dissolving unit 2031, it is possible to continue producing a gas-dissolved liquid with the second gas dissolving unit 2032 by switching the opening-closing valves in the above-described manner. It is therefore possible to perform production of a UFB-containing liquid and replacement of a gas dissolving unit in parallel without intermitting the production of the UFB-containing liquid.

Also, the opening-closing valve Vin51 is provided between the gas-dissolved liquid delivery tank 204 and the first UFB generating unit 2051, and the opening-closing valve Vout51 is provided between the first UFB generating unit 2051 and the UFB-containing liquid delivery tank 207. Similarly, the opening-closing valve Vin52 is provided between the gas-dissolved liquid delivery tank 204 and the second UFB generating unit 2052, and the opening-closing valve Vout52 is provided between the second UFB generating unit 2052 and the UFB-containing liquid delivery tank 207. Thus, by switching these opening-closing valves as appropriate, it is possible to perform production of a UFB-containing liquid and replacement of a UFB generating unit in parallel, as in the case of replacing a gas dissolving unit described above.

Further, the opening-closing valve Vin61 is provided between the UFB-containing liquid delivery tank 207 and the first circulating pump 2061, and the opening-closing valve Vout61 is provided between the first circulating pump 2061 and the liquid introduction tank 202. Also, the opening-closing valve Vin62 is provided between the UFB-containing liquid delivery tank 207 and the second circulating pump 2062, and the opening-closing valve Vout62 is provided between the second circulating pump 2062 and the liquid introduction tank 202. Thus, by switching these opening-closing valves as appropriate, it is possible to perform production of a UFB-containing liquid and replacement of a circulating pump in parallel, as in the case of replacing a gas dissolving unit described above.

Figure 14:
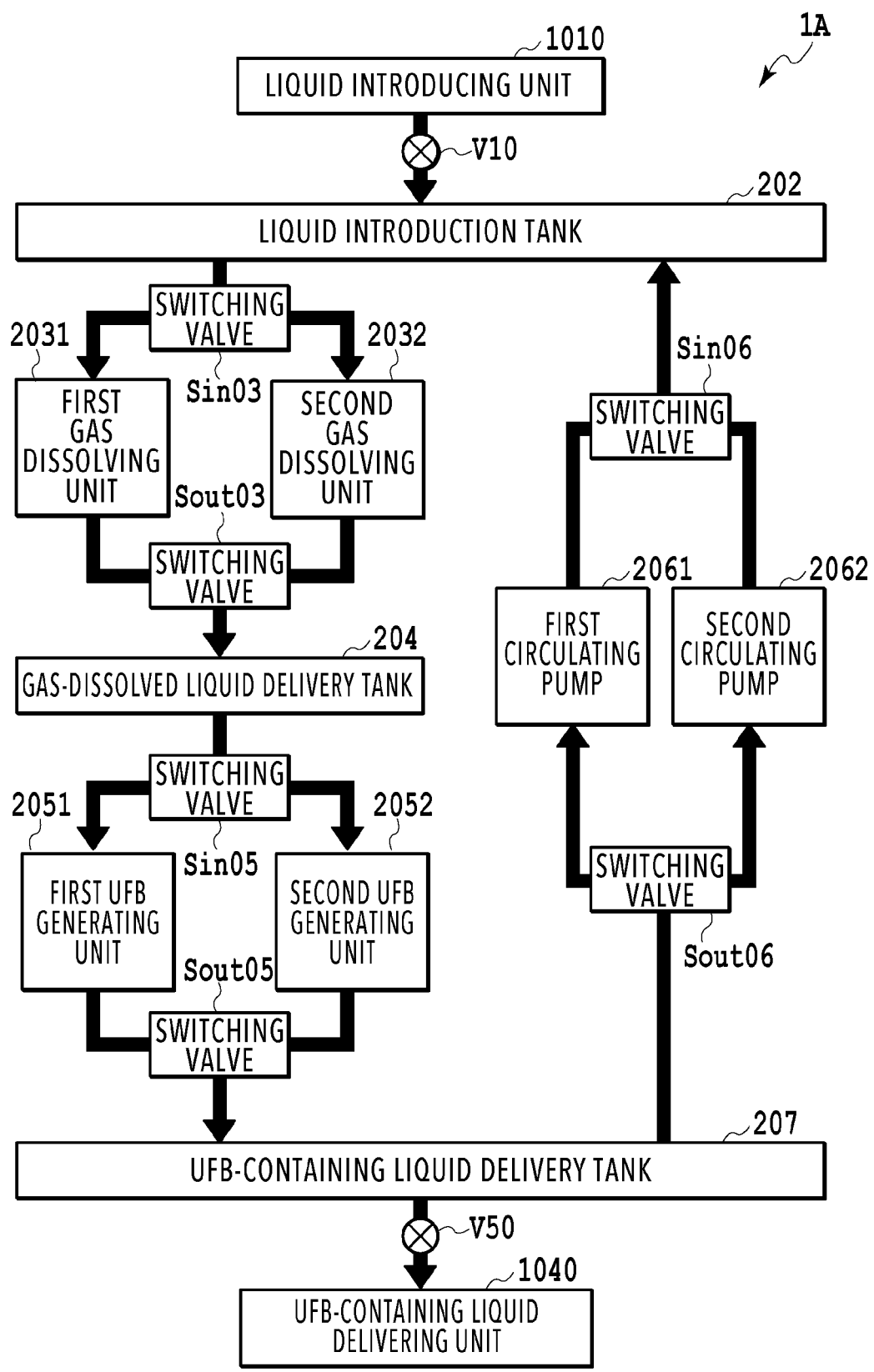
FIG. 14 is a block diagram illustrating a configuration in a modification of the first embodiment.

FIG. 14 is a block diagram illustrating a modification of the present embodiment capable of performing production of a UFB-containing liquid and replacement of a UFB generating unit in parallel. Note that in FIG. 14, the same parts as those in FIG. 13 are denoted by the same reference numerals, and detailed description thereof is omitted.

In FIG. 14, a switching valve Sin03 is capable of selecting one of the first gas dissolving unit 2031 and the second gas dissolving unit 2032. A switching valve Sout03 delivers a gas-dissolved liquid supplied from the gas dissolving unit selected by the switching valve Sin03 (first gas dissolving unit 2031 or second gas dissolving unit 2032) to the gas-dissolved liquid delivery tank 204.

Also, a switching valve Sin05 is capable of selecting which one of the first UFB generating unit 2051 and the second UFB generating unit 2052 is to be caused to operate. A switching valve Sout05 delivers a UFB-containing liquid produced by the UFB generating unit selected by the switching valve Sin05 (first UFB generating unit 2051 or second UFB generating unit 2052) to the UFB-containing liquid delivery tank 207.

A switching valve Sin06 is capable of selecting which one of the first circulating pump 2061 and the second circulating pump 2062 is to be caused to operate. A switching valve Sout06 delivers a UFB-containing liquid from the circulating pump selected according to the switching of the switching valve Sin06 (first circulating pump 2061 or second circulating pump 2062) to the liquid introduction tank 202.

As described above, with the configuration illustrated in FIG. 14, the sets of two gas dissolving units, two UFB generating units, and two circulating pumps can each be caused to operate in a switching manner by using a single switching valve. Such a switching method has the advantage that the operation is stable since always one gas dissolving unit, one UFB generating unit, and one circulating pump are in a driven state. However, it is sometimes desirable to employ an operation method in which one of the sets of constituent elements, namely the gas dissolving units, the UFB generating units, and the circulating pumps, are caused to operate simultaneously. In this case, opening-closing valves as illustrated in FIG. 13 are used before and after (upstream and downstream of) the set of constituent elements to be caused to operate simultaneously among the gas dissolving units, the UFB generating units, and the circulating pumps, and switching valves are used for the remaining constituent elements. In sum, switching valves and opening-closing valves are used in combination as appropriate.

With the above configurations, in a case where one of two constituent elements having the same function malfunctions and this constituent element is to be replaced or repaired, it is possible to continue producing a UFB-containing liquid with the other constituent element. For example, in a case where the first UFB generating unit 2051 malfunctions, it is possible to perform work of replacing the first UFB generating unit 2051 while continuing producing a liquid with the second UFB generating unit 2052. Similarly, in a case where one of the first and second gas dissolving units 2031 and 2032 or one of the first and second circulating pumps 2061 and 2062 malfunctions, it is possible to continue producing a UFB-containing liquid by using the other gas dissolving unit or the other circulating pump. Note that in the case where one of constituent elements malfunctions and only the other normal constituent element is caused to operate, the UFB-containing liquid production performance will be lower if the other constituent element is caused to operate as in the state where the one constituent element operates normally. Specifically, a decrease in the concentration of the UFB-containing liquid, a decrease in the amount to be produced, an increase in the production time, and the like will occur.

Thus, in the present embodiment, control is performed by which, even in a case where one of constituent elements malfunctions, replacement of the constituent element can be performed in parallel without lowering the production performance of the UFB-containing liquid producing apparatus.

Figure 15:
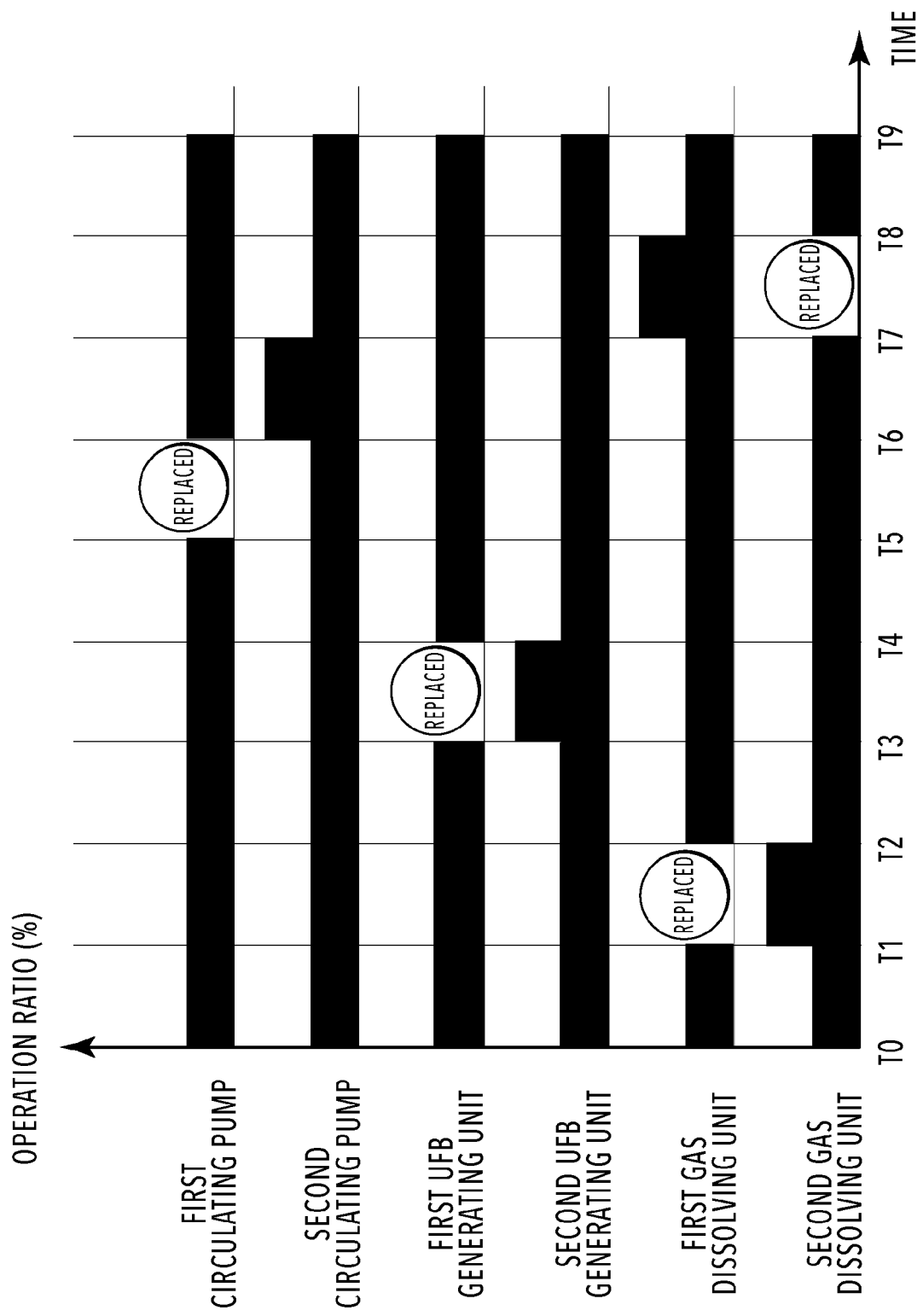
FIG. 15 is a timing chart illustrating control executed in the first embodiment.

FIG. 15 is a timing chart illustrating a control operation in the present embodiment, and illustrates driving timings in which to drive the constituent elements. The vertical axis in FIG. 15 represents the operation ratios of the first and second gas dissolving units 2031 and 2032, the first and second UFB generating units 2051 and 2052, and the first and second circulating pumps 2061 and 2062. The horizontal axis in FIG. 15 represents the elapse of time. Also, T1 to T9 each represent a timing serving as a time reference for the driving of the UFB generating units, and the time between two adjacent timings, e.g., the time between timings T1 and T2, is defined as one unit time.

In the present embodiment, in a time period in which a constituent element is replaced, the operation ratio of the replacement-target constituent element is 0% on the assumption that the operation ratio of each constituent element in time periods in which no constituent element is replaced (T0 to T1, T2 to T3, T4 to T5, T6 to T7, and T8 to T9) is 100%. Also, the operation ratio of the constituent element having the same function as the replacement-target constituent element is 200%. For example, in the time period from T1 to T2, the first gas dissolving unit 2031 is replaced, and therefore the operation ratio of the first gas dissolving unit 2031 is 0% and the operation ratio of the second gas dissolving unit 2032 is 200%. In the time period from T7 to T8, on the other hand, the second gas dissolving unit 2032 is replaced, and therefore the operation ratio of the first gas dissolving unit 2031 is 200% and the operation ratio of the second gas dissolving unit 2032 is 0%.

Similarly, in the time period from T3 to T4, the first UFB generating unit 2051 is replaced, and therefore the operation ratio of the first UFB generating unit 2051 is 0% and the operation ratio of the second UFB generating unit 2052 is 200%. In the time period from T5 to T6, the first circulating pump 2061 is replaced, and therefore the operation ratio of the first circulating pump 2061 is 0% and the operation ratio of the second circulating pump 2062 is 200%.

As described above, in a case where one of constituent elements is a replacement target, the other constituent element having the same function as the one constituent element is caused to operate at an operation ratio of 200%. In this way, it is possible to perform production of a UFB-containing liquid and replacement of the constituent element in parallel without lowering the UFB concentration of the UFB-containing liquid to be produced.

Figure 16:
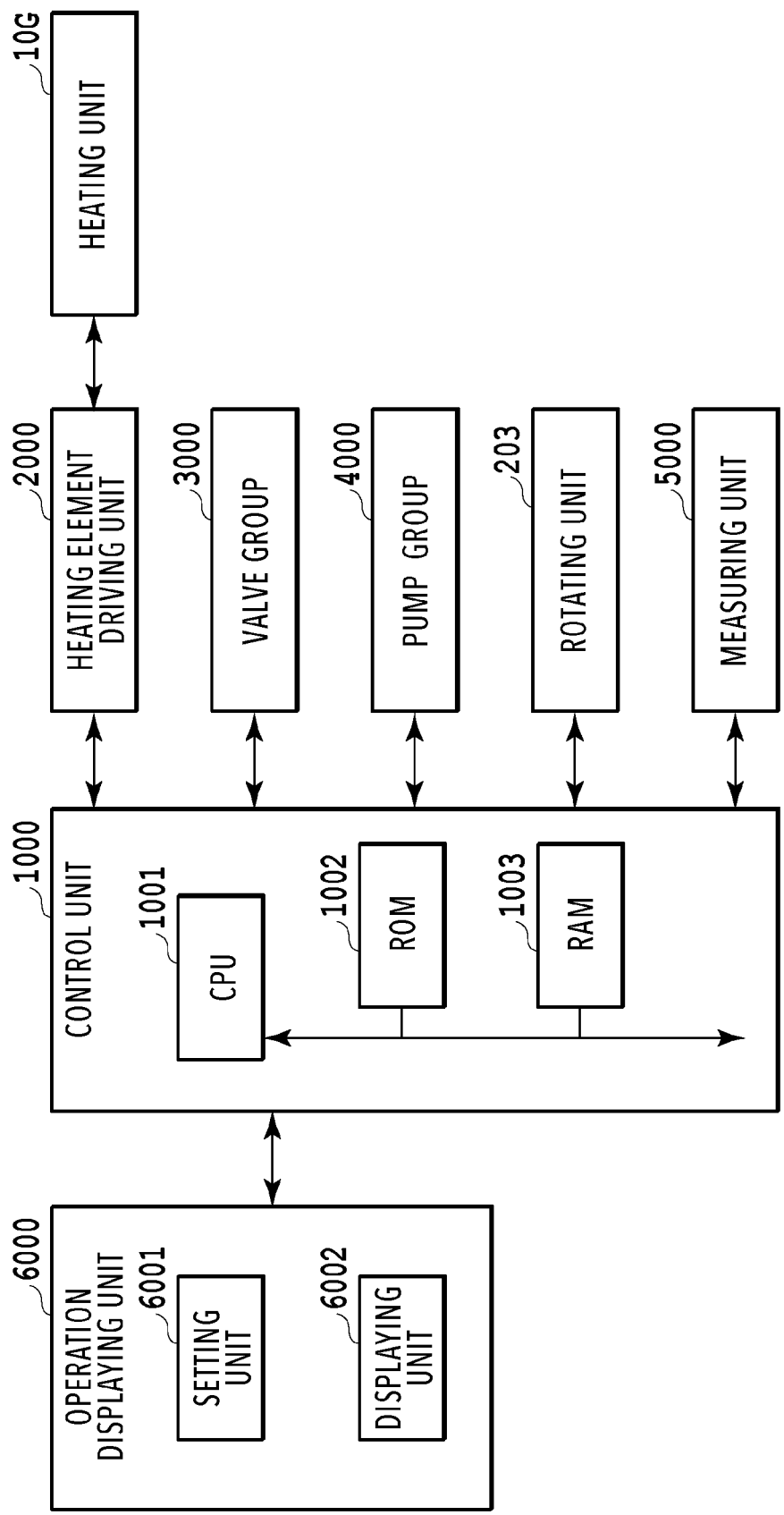
FIG. 16 is a block diagram illustrating a schematic configuration of a control system in the first embodiment.

A schematic configuration of a control system for implementing control as described above will now be described with reference to a block diagram in FIG. 16. In FIG. 16, the control unit 1000 is configured of, for example, a CPU 1001, a ROM 1002, a RAM 1003, and the like. The CPU 1001 functions as a controller that takes overall control of the entire UFB-containing liquid producing apparatus 1A. The ROM 1002 stores a control program to be executed by the CPU 1001, predetermined tables, and other pieces of fixed data. The RAM 1003 has an area to temporarily store various pieces of input data, a work area to be used by the CPU 1001 to execute processes, and the like. An operation displaying unit 6000 includes a setting unit 6001 for the user to configure various settings including the UFB concentration of the UFB-containing liquid, the UFB production time, and the like, and a displaying unit 6002 as a display unit that displays the time required to produce the UFB-containing liquid and the state of the apparatus and performs other similar operations.

The control unit 1000 has a heating element driving unit (driver) 2000 that controls the driving of a plurality of heating elements 10 of a heating unit 10G provided in an element substrate 12. The heating element driving unit 2000 applies a driving pulse corresponding to a control signal from the CPU 1001 to each of the plurality of heating elements 10 included in the heating unit 10G. Each heating element 10 generates heat corresponding to the voltage, frequency, pulse width, or the like of the applied driving pulse.

The control unit 1000 controls a valve group 3000 including the opening-closing valves, the switching valves, or the like provided in the UFB-containing liquid producing apparatus 1A. The control unit 1000 further controls a pump group 4000 including the various pumps provided in the UFB-containing liquid producing apparatus 1A and motors (not illustrated) and the like provided in the apparatus 1A. The UFB-containing liquid producing apparatus 1A is also provided with a measuring unit 5000 that performs various types of measurement. This measuring unit 5000 includes, for example, a measuring instrument that measures the UFB concentration and flow rate of a UFB-containing liquid that is being produced, a measuring instrument that measures the amount of a UFB-containing liquid stored in a buffer tank 1039, and the like. The measured values outputted from this measuring unit 5000 are inputted into the control unit 1000.

Figure 17B:
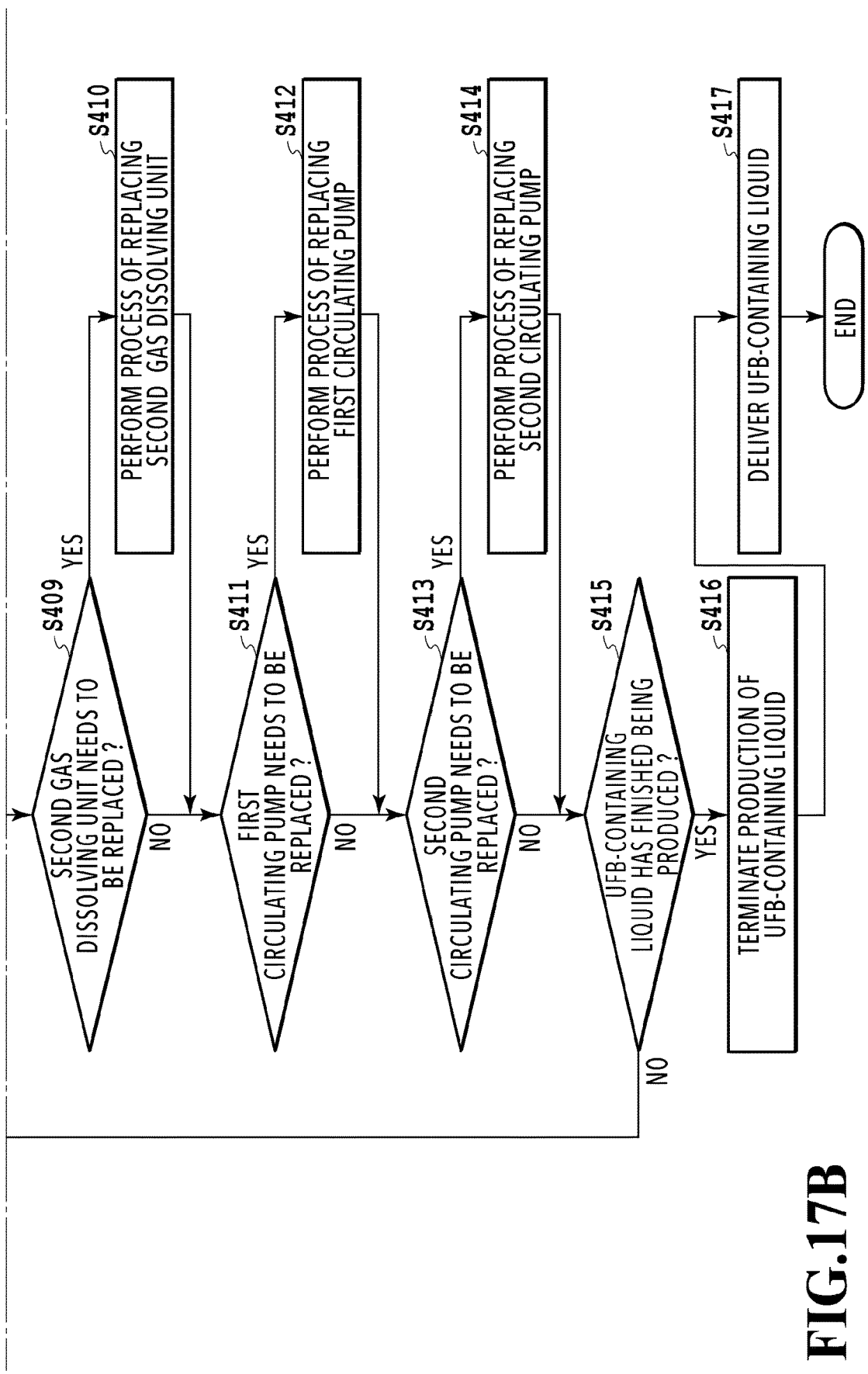
Figure 18A:
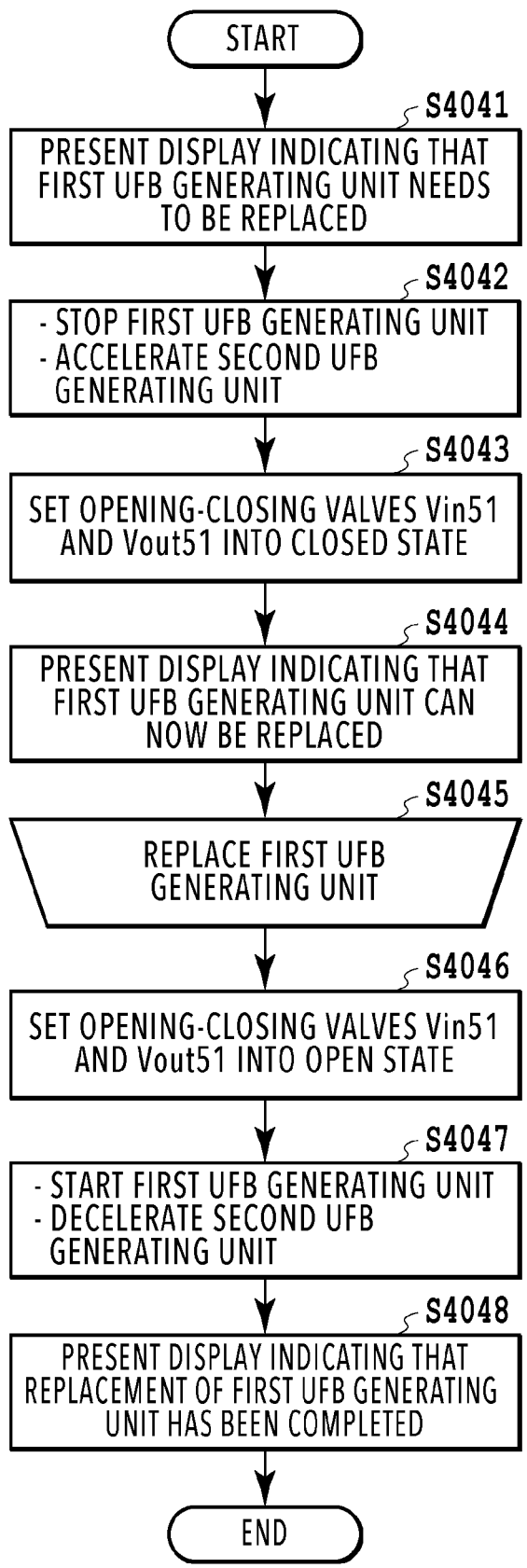
FIGS. 18A and 18B are flowcharts illustrating the control operation in the first embodiment, and illustrate sub flows.
Figure 18B:
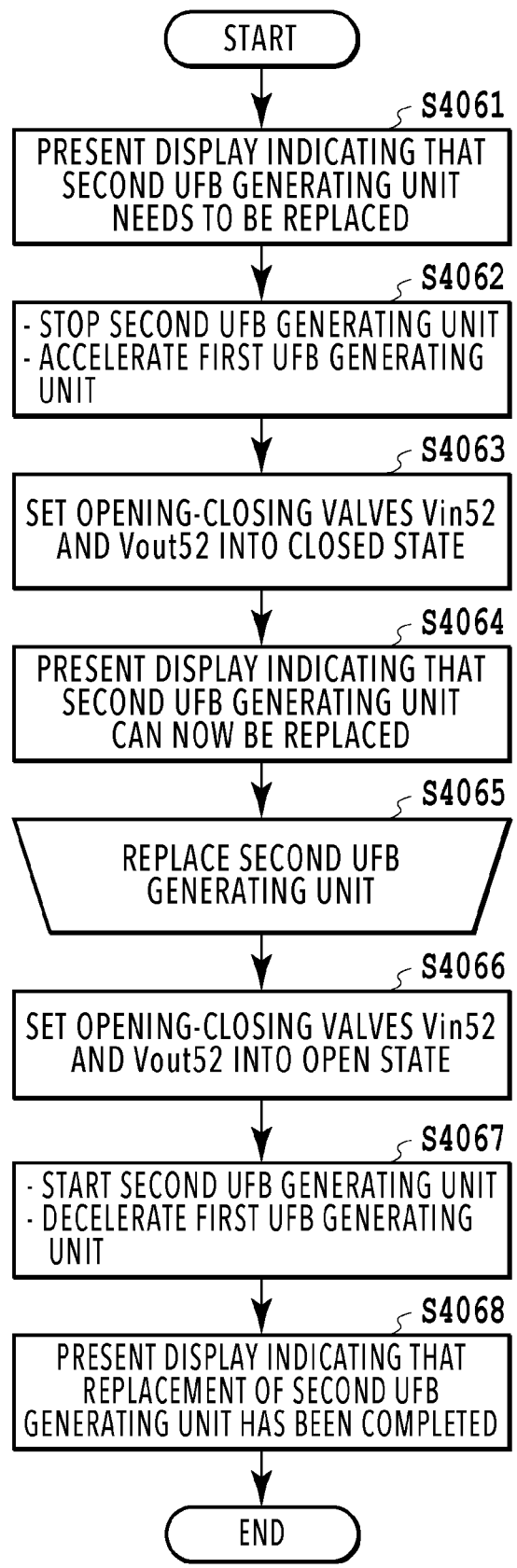

FIGS. 17A and 17B and FIGS. 18A and 18B are flowcharts illustrating a control operation executed by the control unit 1000 during production of a UFB-containing liquid. FIGS. 17A and 17B illustrate a main flow, and FIGS. 18A and 18B illustrate sub flows. FIG. 17 illustrates a relationship between the FIG. 17A and FIG. 17B. As mentioned earlier, in the present embodiment, control is performed such that in a case where one of the constituent elements of the UFB-containing liquid producing apparatus malfunctions, replacement of the constituent element and production of a UFB-containing liquid are performed in parallel without lowering the UFB concentration. Note that the symbol S attached to each step number in the flowcharts in FIGS. 17A and 17B, FIGS. 18A and 18B, FIGS. 22A and 22B, FIGS. 24A and 24B, FIGS. 25A and 25B, FIGS. 30A and 30B, and FIG. 31 to be referred to in this description means a step.

In FIGS. 17A and 17B, a liquid is filled in S401. In this step, of the opening-closing valves illustrated in FIG. 13, the opening-closing valve V10 and the 12 opening-closing valves connected to the entrances and exits of the respective constituent elements are set into an open state, and only the opening-closing valve V50 is set into a closed state. After the liquid completes being filled into each constituent element, the filling of the liquid is finished with the opening-closing valve V50 set in an open state. Then in S402, production of a UFB-containing liquid is started. In this step, all of the first and second gas dissolving units 2031 and 2032, the first and second UFB generating units 2051 and 2052, and the first and second circulating pumps 2061 and 2062 are caused to operate.

Then in S403 to S414, it is determined whether the constituent elements need a replacement process, and based on the determination result, a process of replacing a malfunctioning constituent element is performed. Specifically, the following processes are executed.

First, in S403, it is determined whether the first UFB generating unit 2051 needs to be replaced. If the determination result is YES (replacement is needed), the operation proceeds to S404. On the other hand, if the determination result is NO (replacement is not needed), the operation proceeds to S405. Note that in the present embodiment, the T-UFB method mentioned in the description of the basic configuration is employed as the UFB generating method for the first and second UFB generating units 2051 and 2052. For this reason, methods of determining whether or not the first or second UFB generating unit 2051 or 2052 needs to be replaced include:

- a method that detects a state in which a predetermined proportion of the heaters provided in the UFB generating unit can no longer heat due to aged deterioration;
- a method that detects a state in which the actual accumulated number of times the generating unit has heated has reached a preset number of times;
- a method that obtains the deterioration in the UFB generation performance of the UFB generating unit by obtaining the UFB concentration of the UFB-containing liquid produced by the UFB generating unit with a UFB concentration meter;

and so on.

If it is determined in S403 by a method as above that the first UFB generating unit 2051 needs to be replaced, a process of replacing the first UFB generating unit 2051 is performed in S404. Details of this replacement process is illustrated in FIG. 18A. Note that FIGS. 18A and 18B illustrate processes assuming the configuration illustrated in FIG. 13.

In FIG. 18A, in S4041, a display indicating that the first UFB generating unit 2051 needs to be replaced is presented to notify the user of the fact. Then in S4042, the driving of the heaters provided in the first UFB generating unit 2051, which is the replacement target, is stopped, and the driving frequency for the heaters provided in the second UFB generating unit 20522, which is not the replacement target, is increased. In the present embodiment, the driving frequency for the heaters of the second UFB generating unit 2052 is increased to be twice higher.

Then in S4043, the opening-closing valves Vin51 and Vout51 provided at the entrance and exit of the first UFB generating unit 2051 are set into a closed state. As a result, the first UFB generating unit 2051 is brought into a state of being isolated from the UFB-containing liquid production route. Then, the liquid present in the route from the opening-closing valve Vin51 to the opening-closing valve Vout51 is discharged to the outside through a discharge opening-closing valve (not illustrated). This can reduce the risk of the operator getting wet by the liquid during the replacement work. Note that in the discharging of the liquid, the liquid can be discharged quickly by opening an air release opening-closing valve (not illustrated) provided upstream of the first UFB generating unit 2051. Alternatively, the risk of the operator getting wet by the liquid can also be reduced by closing the opening-closing valve Vin51 first, causing the liquid to flow into the UFB-containing liquid delivery tank 207 through the opening-closing valve Vout52, and then closing the opening-closing valve Vout52.

Then, in S4044, a display indicating that the isolated first UFB generating unit 2051 is now in a replaceable state is presented on the displaying unit 6002 to notify the user of that fact. At this point, a lock mechanism of a cover (not illustrated) covering the UFB-containing liquid production route is unlocked. Then, the operator opens the cover and performs the work of replacing the first UFB generating unit 2051 isolated from the UFB-containing liquid production route (S4045).

After the replacement of the first UFB generating unit 2051 is finished, the operation proceeds to S4046, in which the opening-closing valves Vin51 and Vout51 connected to the entrance and exit of the first UFB generating unit 2051 are set into an open state. As a result, the first UFB generating unit 2051 is connected to the UFB-containing liquid producing route. Here, entry of unnecessary air into the UFB-containing liquid production route can be reduced by firstly setting the opening-closing valve Vin51 into an open state to introduce the liquid sufficiently and then setting the opening-closing valve Vout51 into an open state. In this operation, the liquid can be introduced quickly by setting the above-mentioned air release opening-closing valve (not illustrated) into an open state. After the replacement, the above-mentioned cover for covering the UFB-containing liquid production route is closed, and then the lock mechanism of the cover is actuated to keep the cover closed.

Then in S4047, the driving of the heaters provided in the new first UFB generating unit 2051 is started, and the driving frequency for the heaters provided in the second UFB generating unit 2052, which is not the replacement target, is lowered. In the present embodiment, the driving frequency for the first UFB generating unit 2051 and for the second UFB generating unit 2052 is set at the same driving frequency as that before the replacement. Lastly, in S4048, the user is notified via the displaying unit 6002 that the replacement of the first UFB generating unit 2051 has been completed and that the first UFB generating unit 2051 has resumed generating UFBs. Then, the operation proceeds to S405 in FIG. 17A.

In FIG. 17A, in S405, it is determined whether the second UFB generating unit 2052 needs to be replaced. If the determination result is YES (replacement is needed), the operation proceeds to S406. On the other hand, if the determination result is NO (replacement is not needed), the operation proceeds to S407. In S406, a process of replacing the second UFB generating unit 2052 is performed. Details of this replacement process is illustrated in FIG. 18B.

In FIG. 18B, S4061 to S4068 correspond to S4041 to S4048 in FIG. 18A. The replacement-target constituent element is the second UFB generating unit 2052, and the non-replacement-target constituent element is the first UFB generating unit 2051. The target constituent element is switched from that in the example illustrated in FIG. 18A, but the content of the process itself is similar and description thereof is therefore omitted.

After the processes up to S4068 are completed, the operation proceeds to S407 in FIG. 17A. In S407, it is determined whether the first gas dissolving unit 2031 needs to be replaced. If the determination result is YES (replacement is needed), the operation proceeds to S408. On the other hand, if the determination result is NO (replacement is not needed), the operation proceeds to S409. In S408, a process of replacing the first gas dissolving unit 2031 is performed. The content of the process of replacing the first gas dissolving unit 2031 is similar to FIG. 18A, and detailed description thereof is therefore omitted. However, a method in which it is determined whether the operation time of the first gas dissolving unit 2031 has reached a preset operation life time is used as the method of determining whether the first gas dissolving unit 2031 needs to be replaced.

Also, during the work of replacing the first gas dissolving unit 2031, control is performed for the second gas dissolving unit 2031, which is not the replacement target, such as control to increase the amount of inflow of the gas into the second gas dissolving unit 2031 or control to raise the pressure inside the second gas dissolving unit 2031. After the replacement process is completed, the operation proceeds to S409.

In S409, it is determined whether the second gas dissolving unit 2032 needs to be replaced. If the determination result is YES (replacement is needed), the operation proceeds to S410. If the determination result is NO (replacement is not needed), the operation proceeds to S411. In S410, a process of replacing the second gas dissolving unit 2032 is performed. The content of the replacement process is similar to S408, and description thereof is therefore omitted. However, the method of determining whether replacement is needed is different from that for the UFB generating units, and includes a method in which it is detected whether the operation time of the gas dissolving unit has reached a preset operation life time, and so on.

In S411, it is determined whether the first circulating pump 2061 needs to be replaced. If the determination result is YES (replacement is needed), the operation proceeds to S412. If the determination result is NO (replacement is not needed), the operation proceeds to S413.

In S412, a process of replacing the first circulating pump 2061 is performed. The content of the replacement process is similar to FIG. 18A, and description thereof is therefore omitted. However, the method of determining whether replacement is needed includes a method in which the state of deterioration in the performance of the circulating pump is obtained with a flow meter (not illustrated), a method in which it is determined whether the actual operation time of the circulating pump has reached a preset operation life time, and so on.

Also, during the work of replacing the first circulating pump 2061, control is performed for the second circulating pump 2062, which is not the replacement target, so as to increase the rotational speed of the pump to raise the flow rate. After the process is completed, the operation proceeds to S413.

In S413, it is determined whether the second circulating pump 2062 needs to be replaced. If the determination result is YES, the operation proceeds to S414. If the determination result is NO, the operation proceeds to S415. In S414, a process of replacing the second circulating pump 2062 is performed. The content is similar to S412, and description thereof is therefore omitted. After the process is completed, the operation proceeds to S415.

Then in S415, it is determined whether a desired amount of a UFB-containing liquid having a desired UFB concentration has been produced. If the determination result is NO, the operation proceeds to S403, and the production of a UFB-containing liquid is continued. If the determination result is YES, the operation proceeds to S416.

In S416, the production of a UFB-containing liquid is terminated. In this step, the opening-closing valve V10 is set into a closed state, and then the operation of the first and second gas dissolving units 2031 and 2032, the first and second UFB generating units 2051 and 2052, and the first and second circulating pumps 2061 and 2062 is stopped. Also, all opening-closing valves except the opening-closing valve V10 are set into an open state.

Then in S416, the produced UFB-containing liquid is transferred into the UFB-containing liquid delivering unit 1040. After the entire UFB-containing liquid is transferred into the UFB-containing liquid delivering unit 1040, the opening-closing valve V50 is set into a closed state. By the above, the process of producing a UFB-containing liquid is completed. At this point, all opening-closing valves are set into a closed state. Meanwhile, an air release opening-closing valve (not illustrated) provided in the UFB-containing liquid delivering unit 1040 can be set into an open state to smoothly deliver the UFB-containing liquid from the UFB-containing liquid delivering unit 1040 to the UFB-containing liquid using apparatus connected thereto.

As described above, in the present embodiment, the three types of constituent elements are provided as a set of two gas dissolving units, a set of two UFB generating units, and a set of two circulating pumps, and a replacement-target constituent element can be isolated from the UFB-containing liquid production route. Further, the configuration is such that, in a case where one of the constituent elements malfunctions, the normal constituent element having the same function is controlled in a suitable manner. Thus, it is possible to replace the malfunctioning constituent element while continuing producing a UFB-containing liquid without lowering the production performance such as the concentration of the UFB-containing liquid, the amount to be produced, and the production time. The above description has been given of the process by the UFB-containing liquid producing apparatus having the configuration illustrated in FIG. 13. However, in the modification illustrated in FIG. 14 too, it is possible to execute a process substantially the same as the process illustrated in the flowchart in FIGS. 17A and 17B. Specifically, with the configuration illustrated in FIG. 14, a process of producing a UFB-containing liquid can be performed in a continuous and suitable manner as with the configuration illustration in FIG. 13 by controlling the opening and closing of the switching valves connected to the entrances and exits of the respective constituent elements.

Second Embodiment

In the first embodiment, an example has been described in which in a case where a constituent element in one of the first and second UFB-containing liquid producing units 1020 and 1030 malfunctions, the constituent element in the other UFB-containing liquid producing unit is controlled so as to continue producing a UFB-containing liquid while suppressing the decrease in the UFB-containing liquid production performance. However, during replacement of one replacement-target constituent element, the other non-replacement-target constituent element may also malfunction and need to be replaced. The production of a UFB-containing liquid will be stopped in the case where two constituent elements having the same function malfunction simultaneously. To address this, in the second embodiment, control is performed which prevents constituent elements having the same function from malfunctioning simultaneously.

The control executed in the present embodiment and a problem solved by this control will be specifically described below with reference to FIGS. 19A and 19B. Note that the present embodiment also includes the configuration illustrated in FIG. 13.

FIG. 19A is a timing chart illustrating the problem to be solved by the present embodiment, and FIG. 19B is a timing chart illustrating the control executed in the present embodiment. In FIGS. 19A and 19B, the horizontal axis represents time, and the vertical axis represents the driving ratios of the first and second UFB generating units 2051 and 2052. Also, T1 to T9 each represent a timing serving as a time reference for the driving of the UFB generating units, and the time between two adjacent timings, e.g., the time between timings T1 and T2, is defined as one unit time.

The example illustrated in FIG. 19A represents a case where the first UFB generating unit 2051 and the second UFB generating unit 2052 installed at the time of arrival of the product are caused to start operating at the same time. In this case, in the timing T6, by which six unit times have elapsed from the operation start timing T0, the first UFB generating unit 2051 and the second UFB generating unit 2052 both reach the ends of their lives and both UFB generating units need to be replaced. Thus, the production of a UFB-containing liquid is stopped during the time in which the replacement work is performed (in FIG. 19A, the time period from T6 to T7).

FIG. 19B, on the other hand, illustrates an example of the control executed in the present embodiment. In this example, after the initial installation after the arrival, the first UFB generating unit 2051 and the second UFB generating unit 2052 are caused to start operating in different timings. Specifically, the second UFB generating unit 2051 is caused to start operating in the timing T0 whereas the first UFB generating unit 2051 is caused to start operating in the timing T1, which is one unit time later than from the timing T0. Control to make the operation start timings different from each other can be performed in a state where both UFB generating units are installed in the main body part of the UFB-containing liquid producing apparatus 1A, but can also be performed by causing the UFB generating units to start operating in the order in which they complete being installed into the main body part. For example, in a case where the second UFB generating unit 2052 is installed into the main body part before the first UFB generating unit 2051, the second UFB generating unit 2052 is caused to start operating and generate UFBs when the installation of the second UFB generating unit 2052 is completed. Then, when the installation of the first UFB generating unit 2051 is completed, the first UFB generating unit 2051 is caused to start operating, so that a UFB-containing liquid is produced by both UFB generating units. By performing such control, the operation start timings for the first and second UFB generating units 2051 and 2052 can be made different from each other.

In the case where the operation start timings for the first UFB generating unit 2051 and the second UFB generating unit 2052 are made different from each other as described above, simply causing one UFB generating unit to operate before the other may lead to a state where the concentration and amount of the UFB-containing liquid to be produced by the UFB generating unit caused to operate first is insufficient. Thus, in the present embodiment, during the time in which only the second UFB generating unit 2052 is in operation (e.g., T0 to T1), the second UFB generating unit 2052 is caused to operate at an operation ratio twice higher (an operation ratio of 200%) than the operation ratio in the state where both UFB generating units are in operation, in order to compensate for the amount of operation of the first UFB generating unit 2051. Also, during the time from the timing T1 to the timing T3, both of the first and second UFB generating units 2051 and 2052 are caused to operate. Thus, the operation ratios of both UFB generating units are set at 100%.

During the time from the timing T3 to the timing T4, the second UFB generating unit 2052 is replaced. The operation record of the first UFB generating unit 2051 up to this point (the operation record from the timing T0 to the timing T4) is one unit time at an operation ratio of 200% and two unit times at an operation ratio of 100%, which make a total of four unit times. As described with reference to FIG. 19A, the first and second UFB generating units 2051 and 2052 have a life of six unit times. However, in the present embodiment, each UFB generating unit is replaced when a time less than the life time (four unit times) elapses. While the second UFB generating unit 2052 is replaced from the timing T3 to the timing T4, the first UFB generating unit 2051 operates at an operation ratio of 200%.

In the time period from the timing T4 to the timing T6, the first and second UFB generating units 2051 and 2052 are each caused to operate at an operation ratio of 100%, as in the time period from the timing T1 to the timing T3. Then, in the time period from the timing T6 to the timing T7, the first UFB generating unit 2051 is replaced. Up to this point, the operation record of the first UFB generating unit 2051 is one unit time at an operation ratio of 200% (T3 to T4) and four unit times at an operation ratio of 100% (T1 to T3 and T4 to T6), which makes six unit times of operation in total. Thus, the first UFB generating unit 2051 is replaced in such a timing that its exact life time has elapsed. During the work of replacing this first UFB generating unit 2051, the second UFB generating unit 2052 is caused to operate at an operation ratio of 200%. Then, in the time period from the timing T7 to the timing T9, the first and second UFB generating units 2051 and 2052 are each caused to operate at 100%.

Though not illustrated, the operation from the timing T9 is such that the second UFB generating unit 2052 is replaced when the timing T9 is reached.

As described above, in the present embodiment, the operation start timings for the first UFB generating unit 2051 and the second UFB generating unit 2052 are made different from each other, and also the first replacement timing for the second UFB generating unit 2052 is set at T3 and the first replacement timing for the first UFB generating unit 2051 is set at T6.

Accordingly, the second and subsequent replacement timings are set as described in table 1.

TABLE 1

|  | First replacement | Second replacement | Third replacement |
| --- | --- | --- | --- |
| First UFB generating unit | T6 to T7 | T12 to T13 | T18 to T19 |
| Second UFB generating unit | T3 to T4 | T9 to T10 | T15 to T16 |

As described in table 1 and illustrated in FIG. 19, in the present embodiment, the replacement timings for the first and second UFB generating units 2051 and 2052 appear at equal intervals. This eliminates the fear of the first and second UFB generating units 2051 and 2052 being required to be replaced simultaneously. It is therefore possible to perform work of replacing a UFB generating unit having reached the end of its life without lowering the concentration of the UFB-containing liquid, the amount to be produced, and the production time.

Meanwhile, in the present embodiment, the second UFB generating unit 2051 is replaced in a shorter time than its life time (four unit times from the timing T0 to the timing T3). Accordingly, the second UFB generating unit 2052 replaced here still has a life of two unit times remaining. Thus, it is possible to store the second UFB generating unit 2052 and use the stored second UFB generating unit 2052 in the replacement timing immediately before the end of the production of a UFB-containing liquid. For example, in a case where it is known in advance that the production of a UFB-containing liquid will end in the timing T18, the second UFB generating unit 2052 removed in the replacement in the timing T3 is installed again in the replacement of a second UFB generating unit 2052 in the replacement timing T15. In this way, the first and second UFB generating units 2051 and 2052 both reach the ends of their lives in the timing T18, in which the production of a UFB-containing liquid ends. Accordingly, the UFB generating units are used effectively without being wasted.

Meanwhile, there can also be a case where not only the first and second UFB generating units 2051 and 2052 but also the first and second gas dissolving units 2031 and 2032 and/or the first and second circulating pumps 2061 and 2062 need to be replaced simultaneously. Such a case may lead to a situation where the production of a UFB-containing liquid has to be intermitted. For this reason, in the present embodiment, control as illustrated in FIG. 19B to make the operation start timings and replacement timings different from each other is performed also on the first and second gas dissolving units 2031 and 2032 and the first and second circulating pumps 2061 and 2062.

Figure 20:
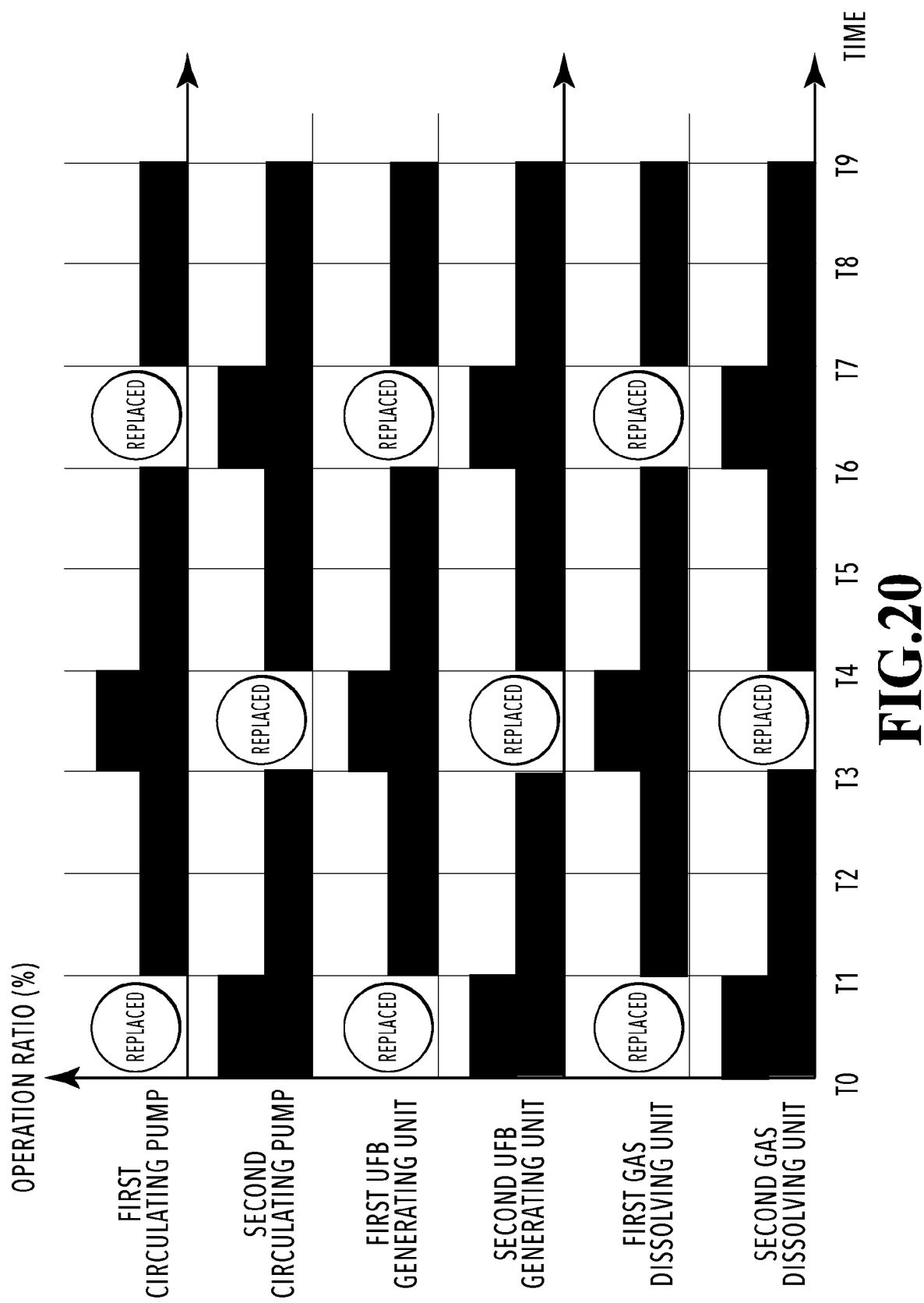
FIG. 20 is a timing chart illustrating control executed in the second embodiment.

FIG. 20 illustrates a timing chart in a case where control similar to the control illustrated in FIG. 19B is performed on constituent elements such as the first and second UFB generating units 2051 and 2052, the first and second gas dissolving units 2031 and 2032, and the first and second circulating pumps 2061 and 2062.

In the example illustrated in FIG. 20, the constituent elements are replaced in the following timings.
From T0 to T1, the first UFB generating unit, the first gas dissolving unit, and the first circulating pump are replaced.
From T3 to T4, the second UFB generating unit, the second gas dissolving unit, and the second circulating pump are replaced.
From T6 to T7, the first UFB generating unit, the first gas dissolving unit, and the first circulating pump are replaced.
From T9 to T10, the second UFB generating unit, the second gas dissolving unit, and the second circulating pump are replaced.

In the example illustrated in FIG. 20, control is performed on the assumption that the three types of constituent elements are replaced in each of the timings T0, T3, T6, and T9. Specifically, the control enables continuous production of a UFB-containing liquid without intermission as long as all three types of constituent elements can be replaced within one unit time.

Figure 21:
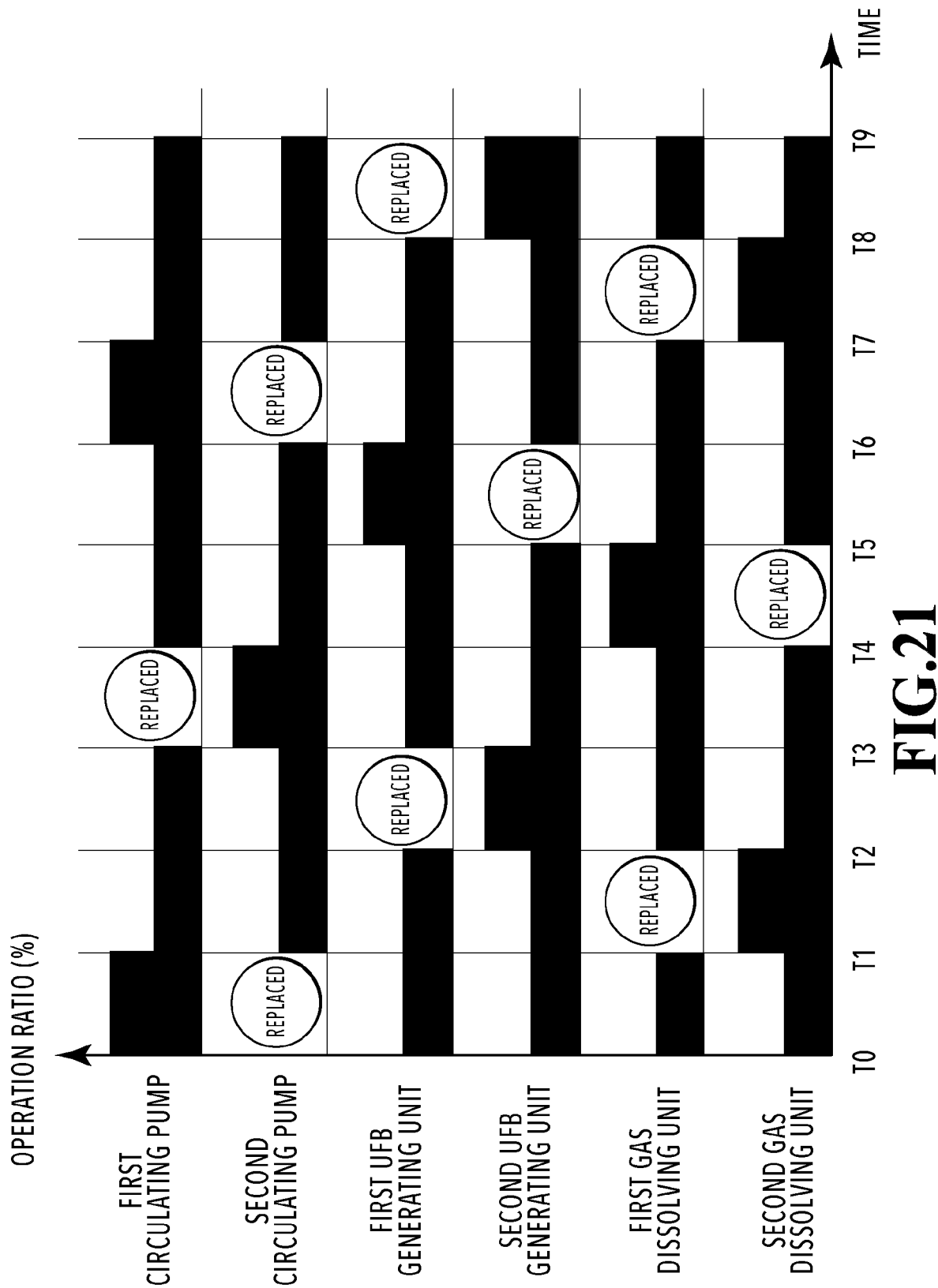
FIG. 21 is a timing chart of control executed in a modification of the second embodiment.

However, in a case where not all of them can be replaced within one unit time, such as a case where there is only one operator, it is predictable that the production of a UFB-containing liquid has to be intermitted. A timing chart in FIG. 21 illustrates a modification of the second embodiment in which, in consideration of such a situation, control is performed so as to prevent each of the first and second UFB generating units 2051 and 2052, the first and second gas dissolving units 2031 and 2032, and the first and second circulating pumps 2061 and 2062 from being replaced along with another simultaneously.
From T0 to T1, the second circulating pump is replaced and the first circulating pump is caused to operate at an operation ratio or 200%.
From T1 to T2, the first gas dissolving unit is replaced and the second gas dissolving unit is caused to operate at an operation ratio of 200%.
From T2 to T3, the first UFB generating unit is replaced and the second UFB generating unit is caused to operate at an operation ratio of 200%.
From T3 to T4, the first circulating pump is replaced and the second circulating pump is caused to operate at an operation ratio or 200%.
From T4 to T5, the second gas dissolving unit is replaced and the first gas dissolving unit is caused to operate at an operation ratio of 200%.
From T5 to T6, the second UFB generating unit is replaced and the first UFB generating unit is caused to operate at an operation ratio of 200%.
From T6 to T7, the second circulating pump is replaced and the first circulating pump is caused to operate at an operation ratio or 200%.
From T7 to T8, the first gas dissolving unit is replaced and the second gas dissolving unit is caused to operate at an operation ratio of 200%.
From T8 to T9, the first UFB generating unit is replaced and the second UFB generating unit is caused to operate at an operation ratio of 200%.

With the replacement timings for each constituent element controlled to be different from those for the others as described above, it is possible to suppress the decrease in the rate of production of a UFB-containing liquid, the concentration of UFBs to be produced, and the like.

Figure 22B:
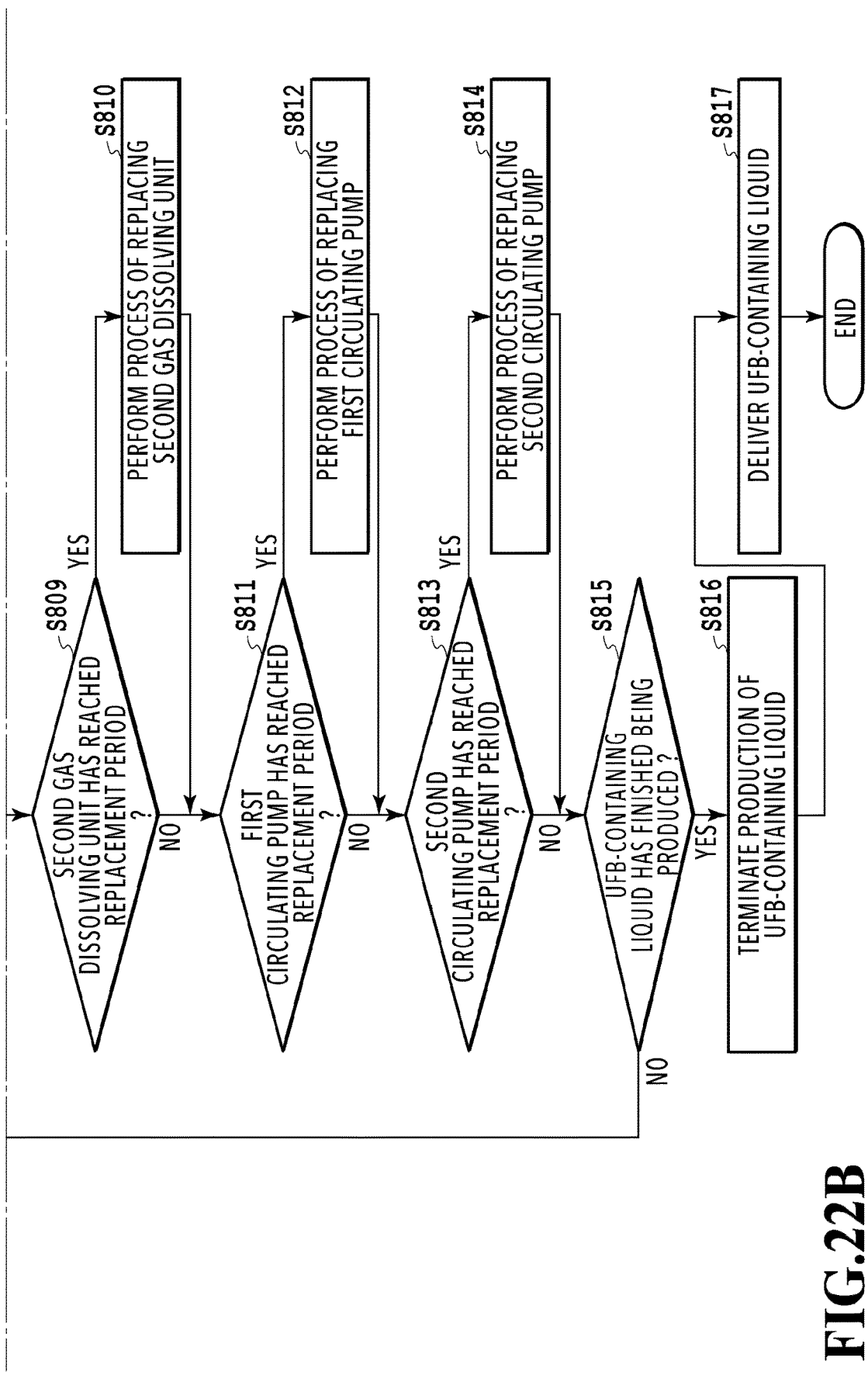

FIGS. 22A and 22B illustrates a flowchart of a control operation executed in the present embodiment. Upon start of the control operation, replacement periods are set first in S600. In a case of performing the control illustrated in FIG. 21, the first replacement period and the interval for the second and subsequent replacement are as described in table 2 below.

TABLE 2

| | First replacement period | Interval for second and subsequent replacement |
|---|---|---|
| First gas dissolving unit | T0 to T1 | Six unit times |
| Second gas dissolving unit | T0 to T4 | Six unit times |
| First UFB generating unit | T0 to T2 | Six unit times |
| Second UFB generating unit | T0 to T5 | Six unit times |
| First circulating pump | T0 to T3 | Six unit times |
| Second circulating pump | T0 | Six unit times |

The first replacement period and the interval for the second and subsequent replacement set here will be used in the processes of S803, S805, S807, S809, S811, and S813. S801 and S802 are similar to the processes of S401 and S402 in FIG. 17A, and description thereof is therefore omitted. In S803 to S814 are performed processes of determining whether the constituent elements are in their replacement periods, and replacement processes for performing work of replacing the constituent elements based on the determination results of the determination processes. The processes of determining whether the constituent elements are in their replacement periods are performed based on the set values set in S800 and an elapsed time counted by a timer (not illustrated). The processes of S803 to S814 will be described below in more detail.

In S803, it is determined whether the first UFB generating unit 2051 has reached its replacement period. Here, a determination is made differently depending on whether the first UFB generating unit 2051 is to be replaced for the first time after the arrival or is to be replaced for the second or subsequent time. Specifically, until the first replacement after the arrival is performed, if
    the first replacement period≤the current elapsed time,
the result of the determination in S803 is YES. That is, it is determined that the first UFB generating unit 2051 has reached its replacement period. In this case, the operation proceeds to S804, in which the first process of replacing of the first UFB generating unit is performed. Then, the second replacement period is set as
    the second replacement period=the first replacement period+the interval for the second and subsequent replacement.
By setting the second replacement period as above, it is possible to perform the process of producing a UFB-containing liquid and the replacement process in parallel as illustrated in FIG. 21. After finishing the replacement process and the setting of the next replacement period in S804, the operation proceeds to S805.

Until the first replacement, if
    the first replacement period>the current elapsed time,
the result of the determination in S803 is NO. That is, it is determined that the first UFB generating unit 2051 has not reached its replacement period. In this case, the operation proceeds to S805.

On the other hand, if it is determined in S803 for the N-th (N is an integer of 2 or more) or subsequent replacement period that
    the N-th replacement period≤the current elapsed time,
the determination result is YES. That is, it is determined that the first UFB generating unit 2051 has reached the N-th replacement period. In this case, the operation proceeds to S804, in which the N-th process of replacing of the first UFB generating unit 2051 is performed. Then, the (N+1)-th replacement period is set as
    the (N+1)-th replacement period=the N-th replacement period+the interval for the second and subsequent replacement.
By setting the (N+1)-th replacement period as above, it is possible to perform the process of producing a UFB-containing liquid and the replacement process in parallel as illustrated in FIG. 21. After finishing the replacement process and the setting of the next replacement period in S804, the process proceeds to S805.

If it is determined in S803 for the N-th (N is an integer of 2 or more) or subsequent replacement period that
    the N-th replacement period>the current elapsed time,
the determination result is NO. That is, it is determined that the first UFB generating unit 2051 has not reached the N-th replacement period. In this case, the operation proceeds to S805.

In S805 and S806, similar replacement period determination, replacement process, and replacement period update are performed on the second UFB generating unit 2052. The content of the processes is similar to S803 and S804, and description thereof is therefore omitted.

In S807 to S810, similar replacement period determination, replacement process, and replacement period update are performed on the first and second gas dissolving units 2031 and 2032. The content of the processes is similar to S803 to S806, and description thereof is therefore omitted.

In S811 to S814, similar replacement period determination, replacement process, and replacement period update are performed on the first and second circulating pumps 2061 and 2062. The content of the processes is similar to S803 to S806, and description thereof is therefore omitted.

Also, the processes of S815 to S817 are similar to S415 to S417 in FIG. 17B, and description thereof is therefore omitted.

As described above, in the control illustrated in FIG. 21 and FIGS. 22A and 22B, each constituent element's initial replacement period and replacement period update interval are set, and the next update period is set at the time of replacement. This prevents a plurality of replacement processes from occurring simultaneously. It is therefore possible to perform a process of producing a UFB-containing liquid and a replacement process in parallel and continue producing the UFB-containing liquid even with one operator.

Third Embodiment

Next, a third embodiment of the present invention will be described. Note that the present embodiment also includes the configuration illustrated in FIG. 13 or 14.

In the second embodiment, an example has been described in which the initial replacement period and the replacement period update interval are set in order to prevent intermission of the production of a UFB-containing liquid due to overlap of the replacement periods for a plurality of constituent elements. However, in a case where, for example, the first UFB generating unit 2051 is replaced first and the second UFB generating unit 2052 is replaced thereafter, the first UFB generating unit 2051 to be replaced first needs to be replaced before reaching the end of its life. For this reason, in a case where the replaced first UFB generating unit 2051 is simply discarded, the component cost increases, which results in an increase in the cost of the UFB-containing liquid to be produced. Also, the first UFB generating unit 2051 replaced before reaching the end of its life may be stored and used again in the last period in the production of the UFB-containing liquid, but a cost is required for storage to maintain the quality of the constituent element.

To address this, in the present embodiment, control is performed so as to replace all constituent elements when they reach substantially the ends of their lives, thereby reducing waste, and also prevent overlap of the replacement timings.

Figure 23:
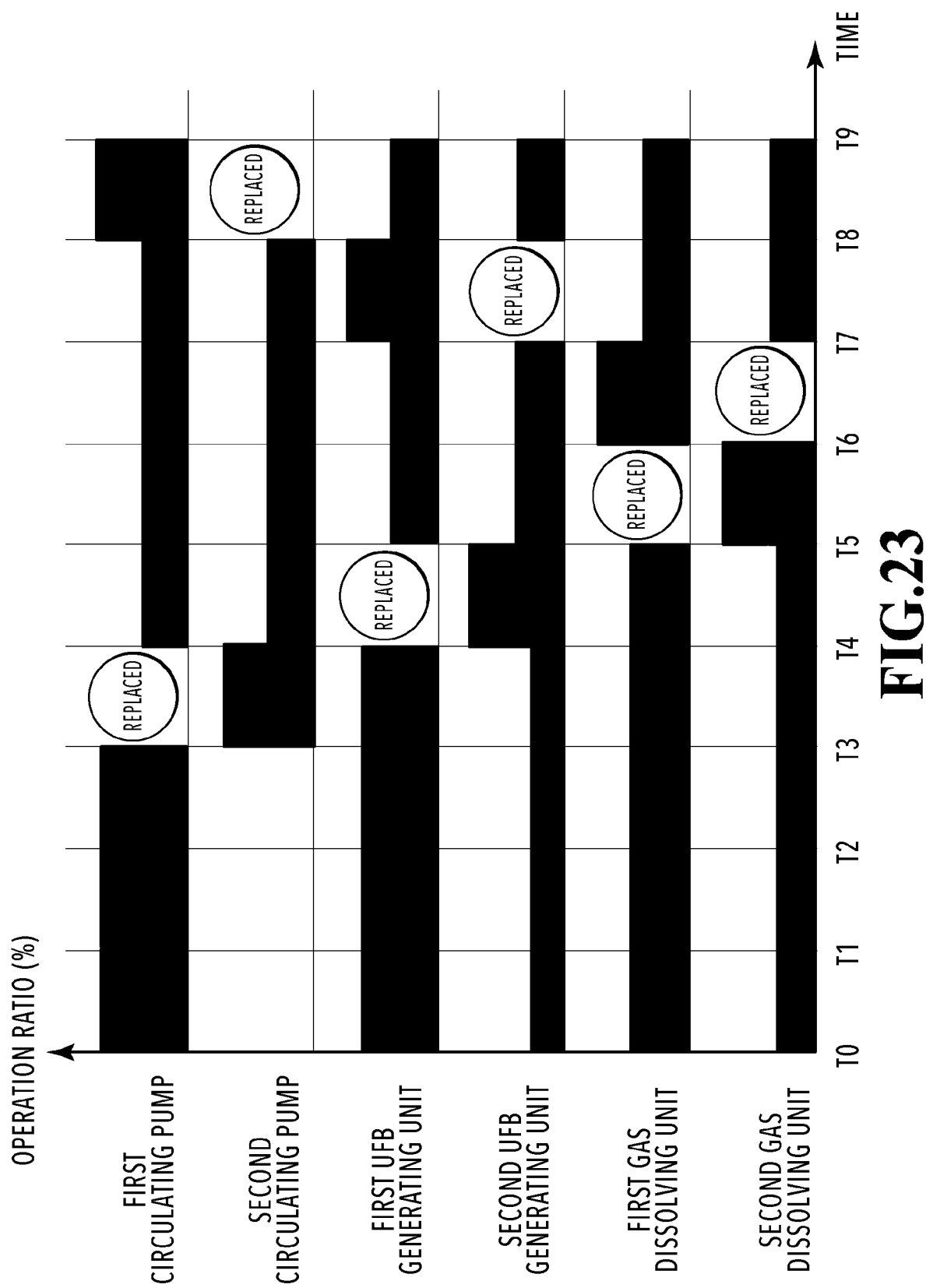
FIG. 23 is a timing chart illustrating control executed in a third embodiment.

FIG. 23 illustrates a timing chart of the control executed in the present embodiment.

In the present embodiment, the installation of the first and second gas dissolving units 2031 and 2032, the first and second UFB generating units 2051 and 2052, and the first and second circulating pumps 2061 and 2062 has been completed at a stage before T0.

In the present embodiment, the operation ratio of each element in the timing T0 is set as below.

| | |
|---|---:|
| First gas dissolving unit | 120% |
| Second gas dissolving unit | 80% |
| First UFB generating unit | 150% |
| Second UFB generating unit | 50% |
| First circulating pump | 200% |
| Second circulating pump | 0% |

By setting the operation ratios in this manner, the replacement periods for the constituent elements of the three types at an operation ratio above 100% can be set as below.

| | |
|---|---|
| First gas dissolving unit | T5 to T6 |
| First UFB generating unit | T4 to T5 |
| First circulating pump | T3 to T4 |

In the present embodiment, the replacement period for each constituent element is the period following six unit times of operation. The first circulating pump 2061, whose replacement timing comes first, is replaced in the period from T3 to T4. During this period, the operation ratio of the second circulating pump 2061, which is not the replacement target, is set at 200%.

After the replacement is finished, the operation ratios of the first and second circulating pumps 2061 and 2062 are both set at 100%. Consequently, the replacement period for the second circulating pump is T8 to T9, as described in table 3.

TABLE 3

| Circulating pumps | | T0 to T1 | T1 to T2 | T2 to T3 | T3 to T4 | T4 to T5 | T5 to T6 | T6 to T7 | T7 to T8 | T8 to T9 |
|---|---|---|---|---|---|---|---|---|---|---|
| First | Operation ratio | 200% | 200% | 200% | Replaced | 100% | 100% | 100% | 100% | 200% |
| | Accumulation | 200% | 400% | 600% | | 100% | 200% | 300% | 400% | 600% |
| Second | Operation ratio | 0% | 0% | 0% | 200% | 100% | 100% | 100% | 100% | Replaced |
| | Accumulation | 0% | 0% | 0% | 200% | 300% | 400% | 500% | 600% | |

Thereafter, the first and second UFB generating units 2051 and 2052 both operate at an operation ratio of 100% on average, so that each UFB generating unit is replaced every six unit times. Thus, the replacement periods are as follows.

First UFB generating unit: T4 to T5, T10 to T11, T16 to T17, ..., T(4+6N) to T(5+6N), (N=0, 1, 2, ...)

Second UFB generating unit: T7 to T8, T13 to T14, T19 to T20, ..., T(7+6N) to T(8+6N), (N=0, 1, 2, ...)

The constituent element whose replacement timing comes after the first UFB generating unit 2051 is the first gas dissolving unit 2031, and is replaced from T5 to T6. During this period, the operation ratio of the second gas dissolving unit 2032, which is not the replacement target, is set at 200%. After the replacement is finished, the first and second gas dissolving units 2031 and 2032 both operate at an operation ratio of 100%. Consequently, the replacement period for the second gas dissolving unit is T6 to T7, as described in table 4.

Thereafter, both gas dissolving units operate at an operation ratio of 100% on average and thus are replaced every six unit times. Accordingly, the replacement periods for the gas dissolving units are as follows.

First gas dissolving unit: T5 to T6, T11 to T12, T17 to T18, ..., T(5+6N) to T(6+6N). (N=0, 1, 2, ...)

Second gas dissolving unit: T6 to T7, T12 to T13, T18 to T19, ..., T(6+6N) to T(7+6N). (N=0, 1, 2, ...)

The replacement timings described above can be listed as below.

First circulating pump: T3 to T4, T9 to T10, T15 to T16, ..., T(3+6N) to T(4+6N), (N=0, 1, 2, ...)

Second circulating pump: T8 to T9, T14 to T15, T20 to T21, ..., T(8+6N) to T(9+6N), (N=0, 1, 2, ...)

First UFB generating unit: T4 to T5, T10 to T11, T16 to T17, ..., T(4+6N) to T(5+6N), (N=0, 1, 2, ...)

Second UFB generating unit: T7 to T8, T13 to T14, T19 to T20, ..., T(7+6N) to T(8+6N), (N=0, 1, 2, ...)

First gas dissolving unit: T5 to T6, T11 to T12, T17 to T18, ..., T(5+6N) to T(6+6N), (N=0, 1, 2, ...)

Second gas dissolving unit: T6 to T7, T12 to T13, T18 to T19, ..., T(6+6N) to T(7+6N), (N=0, 1, 2, ...)

It can be understood that each replacement period is controlled not to overlap the others.

Figure 24A:
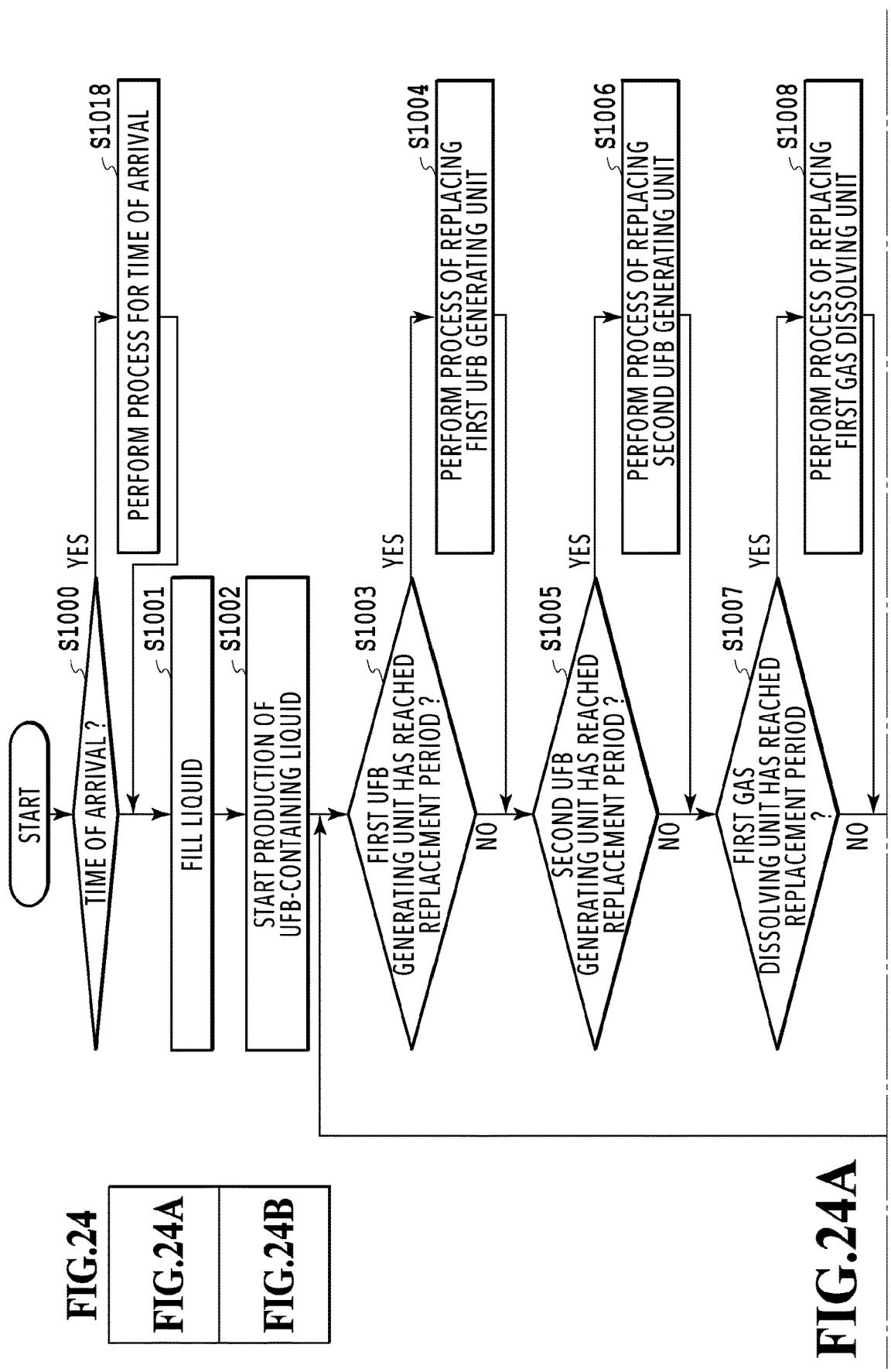
FIGS. 24A and 24B are flowcharts illustrating a control operation in the third embodiment.
Figure 24B:
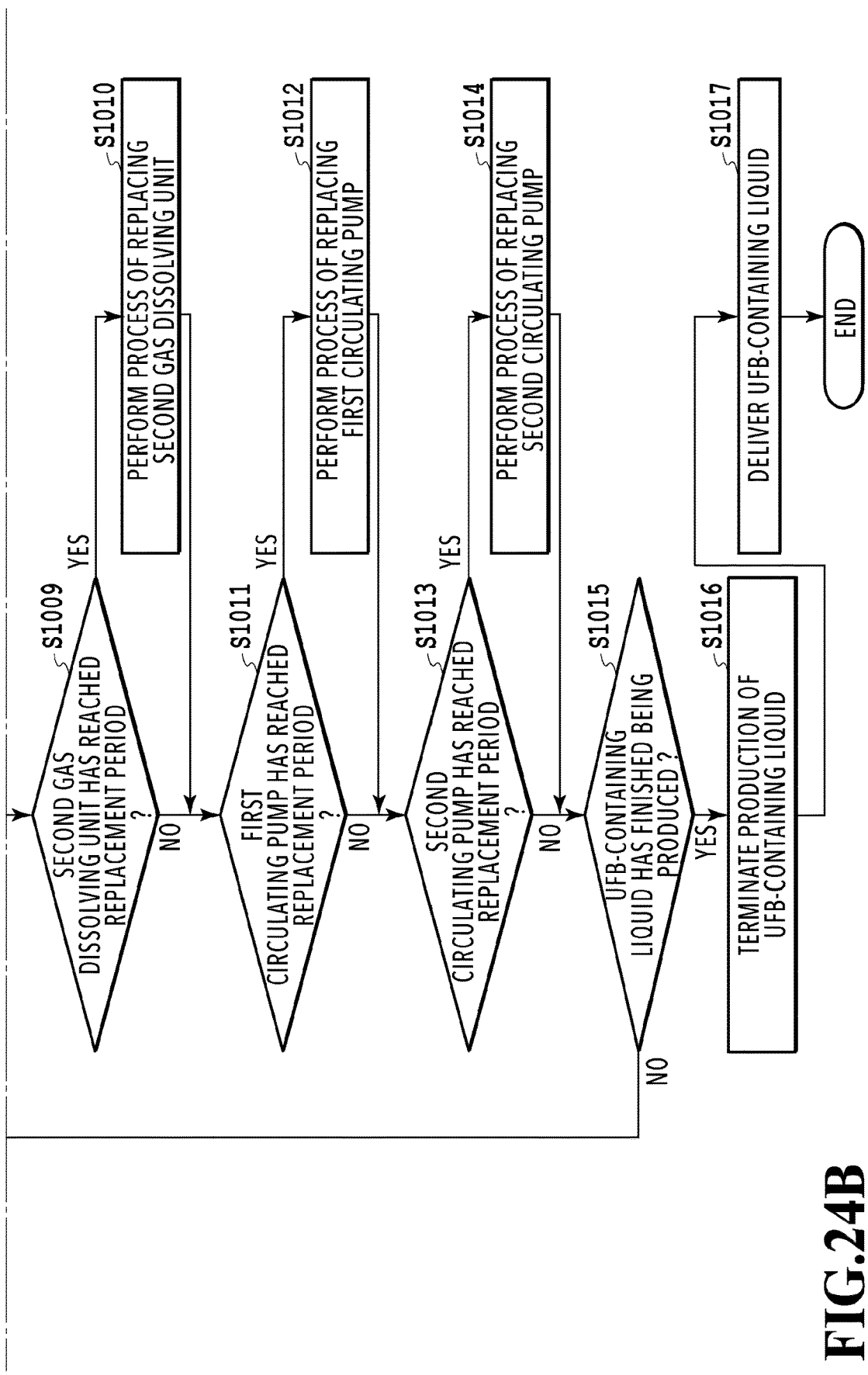

FIGS. 24A and 24B and FIGS. 25A and 25B are flowcharts illustrating a control operation in the present embodiment. In FIG. 24A, in S1000, it is determined whether the UFB-containing liquid producing apparatus is in a state at the time of arrival, i.e., a state before operation. If the determination result is YES, that is, if the UFB-containing liquid producing apparatus is in the state before operation, the operation proceeds to S1018. If the determination result is NO, that is, if the UFB-containing liquid producing apparatus is already in an operating state, the operation proceeds to S1001.

Figure 25A:
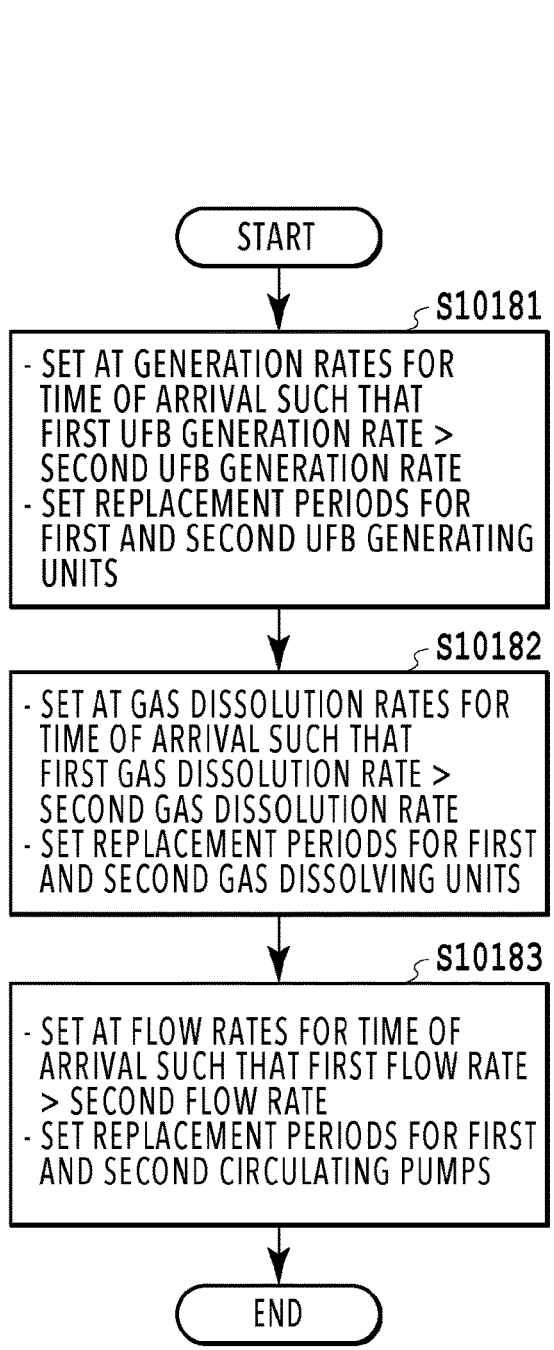
FIGS. 25A and 25B are flowcharts illustrating details of the processes of S1018 and S1004.
Figure 25B:
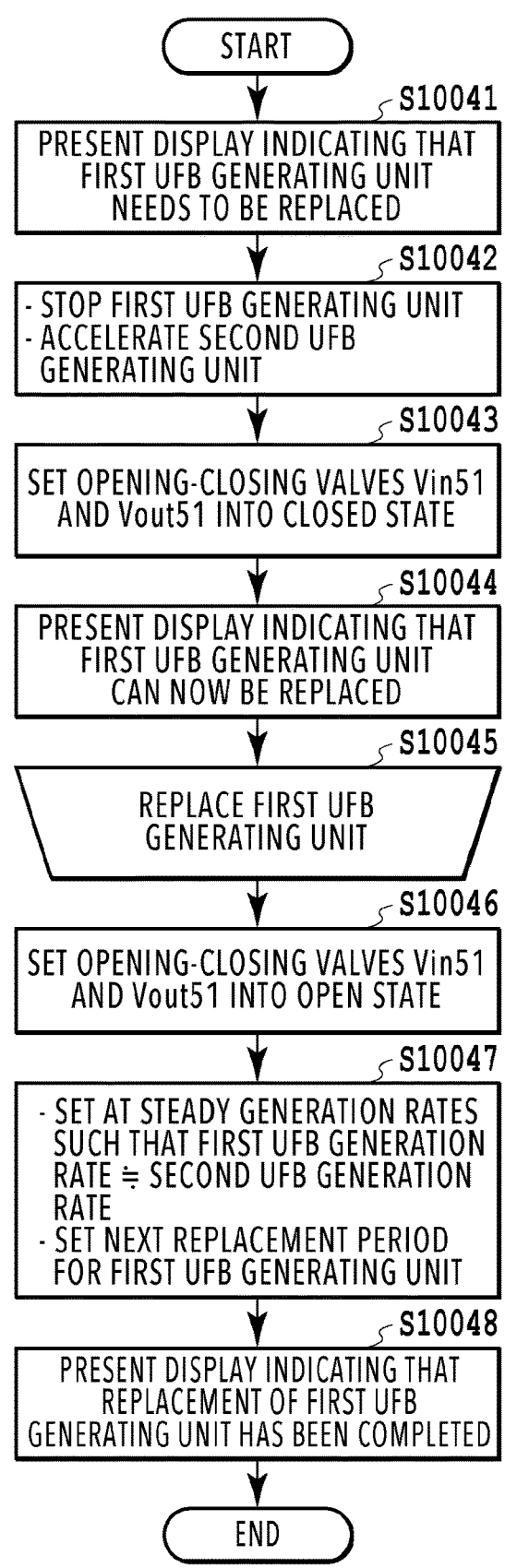

In S1018, a process specific to the time of arrival is performed. FIG. 25A illustrates details of the process of S1018. In FIG. 25A, in S10181, the UFB generation rate of each UFB generating unit for the time of arrival is set such that the relationship between the UFB generation rate of the first UFB generating unit 2051 (first UFB generation rate) and the UFB generation rate of the second UFB generating unit 2052 (second UFB generation rate) is the first UFB generation ratio>the second UFB generation ratio. Moreover, the replacement periods for the first and second UFB generating units 2051 and 2052 are set.

TABLE 4

| Circulating pumps | | T0 to T1 | T1 to T2 | T2 to T3 | T3 to T4 | T4 to T5 | T5 to T6 | T6 to T7 | T7 To T8 | T8 to T9 |
|---|---|---|---|---|---|---|---|---|---|---|
| First | Operation ratio | 150% | 150% | 150% | 150% | Replaced | 100% | 100% | 100% | 100% |
| | Accumulation | 150% | 300% | 450% | 600% | | 100% | 200% | 300% | 400% |
| Second | Operation ratio | 50% | 50% | 50% | 50% | 200% | 100% | 100% | Replaced | 100% |
| | Accumulation | 50% | 100% | 150% | 200% | 400% | 500% | 600% | | 100% |

In S10182, the gas dissolution rate of each gas dissolving unit for the time of arrival is set such that the relationship between the gas dissolution rate of the first gas dissolving unit 2031 (first gas dissolution rate) and the gas dissolution rate of the second gas dissolving unit 2032 (second gas dissolution rate) is the first gas dissolution rate>the second gas dissolution rate. Moreover, the replacement periods for the first and second gas dissolving unit 2031 and 2032 are set.

In S10183, the flow rate of a liquid from each circulating pump for the time of arrival is set such that the relationship between the flow rate of the liquid from the first circulating pump 2061 (first flow rate) and the flow rate of the liquid from the second circulating pump 2062 (second flow rate) is the first flow rate>the second flow rate.

Moreover, the replacement periods for the first and second circulating pumps 2061 and 2062 are set.

With settings as above,
the replacement timings for the first and second UFB generating units 2051 and 2052,
the replacement timings for the first and second gas dissolving units 2031 and 2032, and
the replacement timings for the first and second circulating pumps 2061 and 2062
are controlled to be mutually different timings as illustrated in FIG. 23.

Here, by performing the control such that
the difference between the replacement timings for the first and second UFB generating units>the time required to replace a UFB generating unit,
the difference between the replacement timings for the first and second gas dissolving units>the time required to replace a gas dissolving unit, and
the difference between the replacement timings for the first and second circulating pumps>the time required to replace a circulating pump,
it is possible to perform replacement of any one of the constituent elements and production of a UFB-containing liquid in parallel.

After the above process is performed, the operation proceeds to step S1001 in FIG. 24A. The processes of S1001 to S1003 are similar to the processes of S801 to S803 in FIG. 22A, and description thereof is therefore omitted. If it is determined in S1003 that the first UFB generating unit 2051 has reached its replacement period (the determination result is YES), a process of replacing the first UFB generating unit 2051 is performed in S1004. Details of the content of this replacement process are illustrated in S10041 to S10048 in FIG. 25B. The processes of S10041 to S10046 are similar to the processes of S4041 to S4046 in FIG. 18A, and description thereof is therefore omitted.

In S10047, the generation rate of each UFB generating unit is set at such a steady generation rate that
the generation rate of the first UFB generating unit≈the generation rate of the second UFB generating unit.
Then, the next replacement period for the new first UFB generating unit 2051 is set, and the operation proceeds to the process of S10048. Note that the process of S10048 is similar to S4048 in FIG. 18A, and description thereof is omitted.

After the above process is completed, the operation proceeds to S1005 in FIG. 24A. In S1005, a process similar to S405 in FIG. 17A is performed.

Then in S1006, a process of replacing the second UFB generating unit 2052 is performed. This process of replacing the second UFB generating unit 2052 is performed in a similar manner to the process of replacing the first UFB generating unit 2051 illustrated in FIG. 25B.

Then, the processes of S1007 and S1009 are performed. The processes of S1007 and S1009 are similar to the processes of S407 in FIG. 17A and S409 in FIG. 17B, and description thereof is therefore omitted. Also, in S1008 and S1010, processes of replacing the first and second gas dissolving units 2031 and 2032 are performed. These processes of replacing the first and second gas dissolving units 2031 and 2032 are performed in a similar manner to the processes of replacing the first and second UFB generating units 2051 and 2052 in S1004 and S1006.

Then, the processes of S1011 and S1013 are performed, which are similar to the processes of S411 and S413 in FIG. 17B. Thus, the first and second circulating pumps 2061 and 2062 are replaced. These processes of replacing the first and second circulating pumps 2061 and 2062 are performed in a similar manner to the processes of replacing the UFB generating units 2051 and 2052 in S1004 and S1006. Further, in S1015 to S1017, processes similar to S415 to S417 in FIG. 17B are performed.

As described above, in this third embodiment, each two constituent elements having the same function are controlled to operate at mutually different operation ratios. Accordingly, the timings in which the constituent elements having the same function reach the ends of their lives can be staggered. This makes it possible to prevent two constituent elements having the same function from being required to be replaced simultaneously, and also to replace both constituent elements at the same accumulated operation ratio. Moreover, the constituent elements of the different types are controlled to be at different operation ratios. This makes it possible to prevent constituent elements of different types from being required to be replaced simultaneously, and also to replace each element at the same accumulated operation ratio.

Fourth Embodiment

Next, a fourth embodiment of the present invention will be described. In the above embodiments, configurations have been described in which sets of two constituent elements having the same function are each caused to operate in parallel. However, even with a configuration in which sets of three or more constituent elements having the same function are each caused to operate in parallel, it is also possible to prevent the occurrence of a state in which constituent elements having the same function need to be replaced simultaneously. The present embodiment represents an example in which six constituent elements having the same function are used to reduce the rise in the operation ratio of non-replacement-target constituent elements to 20%.

Figure 26:
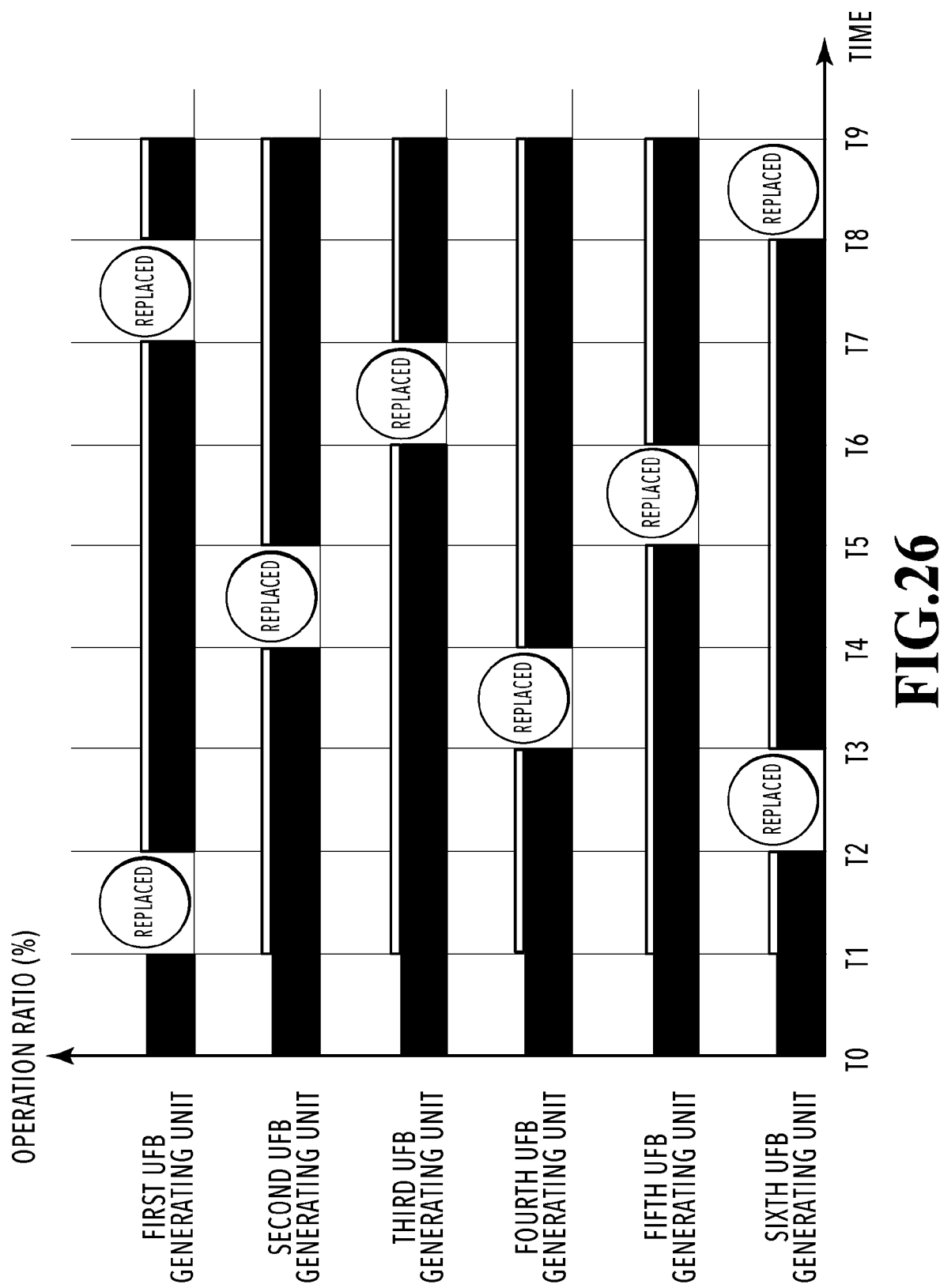
FIG. 26 is a timing chart illustrating control executed in a fourth embodiment.

In FIG. 26, in which six UFB generating units (first to sixth UFB generating units) are caused to operate in parallel, control as below is performed so as to bring each UFB generating unit into a state where it needs to be replaced in turn.

From T0 to T1, all UFB generating units are caused to operate at an operation ratio of 100%. In this example, the first UFB generating unit reaches a state where it needs to be replaced in the timing T1, and the first UFB generating unit is replaced from T1 to T2. In this period from T1 to T2, the first UFB generating unit stops producing a UFB-containing liquid, so that its operation ratio is 0%. Thus, the decrease in UFB generation performance caused by the stoppage of the first UFB generating unit is shared by the remaining five UFB generating units. As a result, from T1 to T2, the operation ratios of the second to sixth UFB generating units are set at 120%.

Similarly,
from T2 to T3, the sixth UFB generating unit is replaced, and the operation ratios of the other UFB generating units are set at 120%;
from T3 to T4, the fourth UFB generating unit is replaced, and the operation ratios of the other UFB generating units are set at 120%;

from T4 to T5, the second UFB generating unit is replaced, and the operation ratios of the other UFB generating units are set at 120%;

from T5 to T6, the fifth UFB generating unit is replaced, and the operation ratios of the other UFB generating units are set at 120%;

from T6 to T7, the third UFB generating unit is replaced, and the operation ratios of the other UFB generating units are set at 120%; and from T7 to T8, the first UFB generating unit is replaced, and the operation ratios of the other UFB generating units are set at 120%.

As described above, by increasing the number of constituent elements of the same type to be caused to operate in parallel, it is possible to reduce the increase in the operation ratios of non-replacement-target constituent elements. In the example illustrated in FIG. 26, the operation ratios of the non-replacement-target constituent elements only need to be raised by 20% from the normal operation ratio (100%) in the state where the six constituent elements are caused to operate simultaneously. This makes it possible to perform a stable continuous operation with UFB generating units at a generation rate near their performance limits in parallel with replacement.

Fifth Embodiment

In the above embodiments, configurations have been described in which circulating pumps are provided to circulate a UFB-containing liquid. However, the present invention is applicable also to a configuration in which gas dissolving units and UFB generating units are used but no circulating pump is provided and a UFB-containing liquid is not circulated. An example will be described below as a fifth embodiment in which a UFB-containing liquid is produced without using a circulating pump. In order to clarify the characteristic configuration of the present embodiment, a basic configuration of a conventional UFB-containing liquid producing apparatus provided with no circulation route will be described prior to the description of the present embodiment, and then a configuration and operation of the present embodiment will be described.

Figure 35:
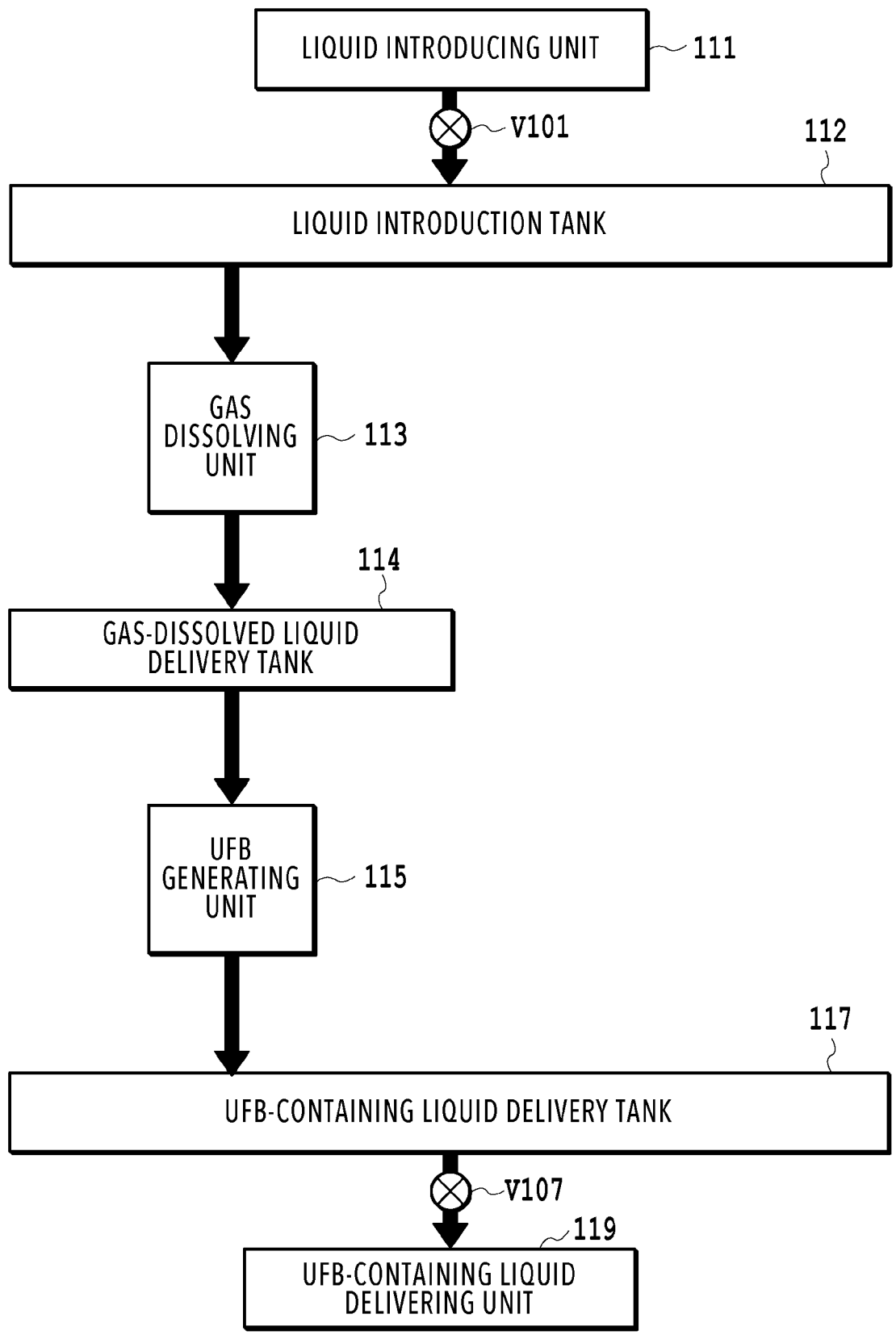
FIG. 35 is a block diagram illustrating a configuration of a conventional UFB-containing liquid producing apparatus.

FIG. 35 illustrates the configuration of the conventional UFB-containing liquid producing apparatus. The apparatus illustrated in FIG. 35 has a configuration obtained by removing the circulating pump 106 from the configuration illustrated in FIG. 34 mentioned earlier. In FIG. 35, the same parts are denoted by the same reference numerals, and detailed description thereof is omitted.

In the conventional UFB-containing liquid producing apparatus illustrated in FIG. 35, a single UFB-containing liquid producing unit is formed between the liquid introducing unit 101 and the UFB-containing liquid delivering unit 109. Thus, if a constituent element provided in the UFB-containing liquid producing unit, such as the gas dissolving unit 103 or the UFB generating unit 105, malfunctions, it will be necessary to stop the production of a UFB-containing liquid for the replacement of that constituent element, and also to stop the operation of the UFB using apparatus (not illustrated). This is a major problem for application to apparatuses that require continuous operation such as medical apparatuses and plants.

Figure 27:
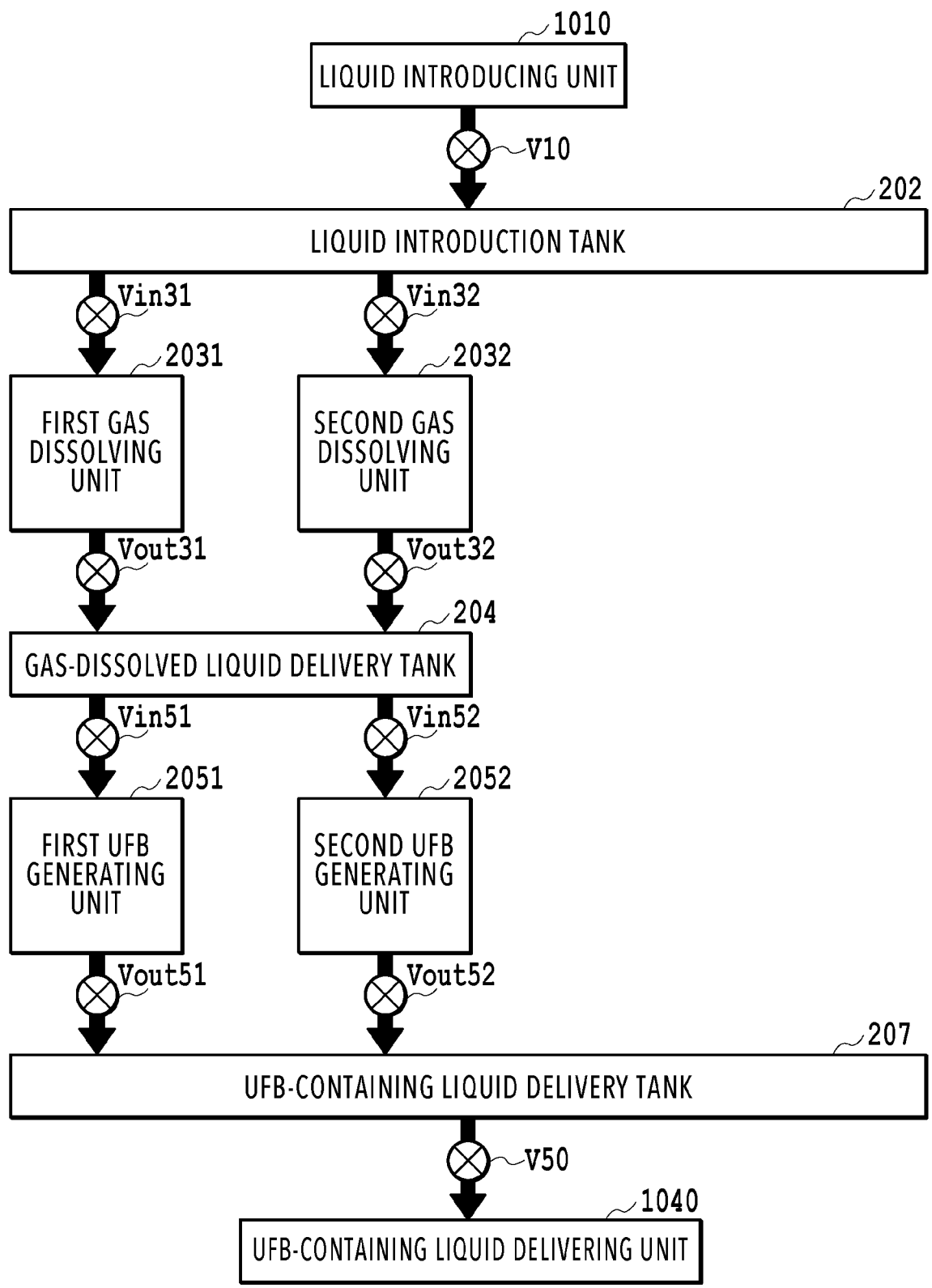
FIG. 27 is a block diagram illustrating a configuration in a fifth embodiment.

To address this, a UFB-containing liquid producing apparatus in the present embodiment has a configuration as illustrated in FIG. 27. The UFB-containing liquid producing apparatus illustrated in FIG. 27 has a configuration obtained by removing the first and second circulating pumps 2061 and 2062 from the UFB-containing liquid producing apparatus illustrated in FIG. 13, and the other features are similar to those of the configuration illustrated in FIG. 13. In FIG. 27, the same parts as those in the configuration illustrated in FIG. 13 are denoted by the same reference numerals, and detailed description thereof is omitted.

As illustrated in FIG. 27, in the present embodiment, two UFB-containing liquid producing units are provided between the liquid introducing unit 1010 and the UFB-containing liquid delivering unit 1040. Thus, even in a case where the gas dissolving unit or the UFB generating unit in one of the UFB-containing liquid producing units malfunctions, it is possible to perform production of a UFB-containing liquid with the gas dissolving unit or the UFB generating unit in the other UFB-containing liquid producing unit, in parallel with replacement of the malfunctioning gas dissolving unit or UFB generating unit.

Sixth Embodiment

Next, a sixth embodiment of the present invention will be described. In the present embodiment, a buffer tank is additionally provided before the UFB-containing liquid delivering unit in any one of the configurations in the above embodiments so that work of replacing a constituent element provided in the UFB-containing liquid producing apparatus and work of producing a UFB-containing liquid can be performed more efficiently.

Figure 28:
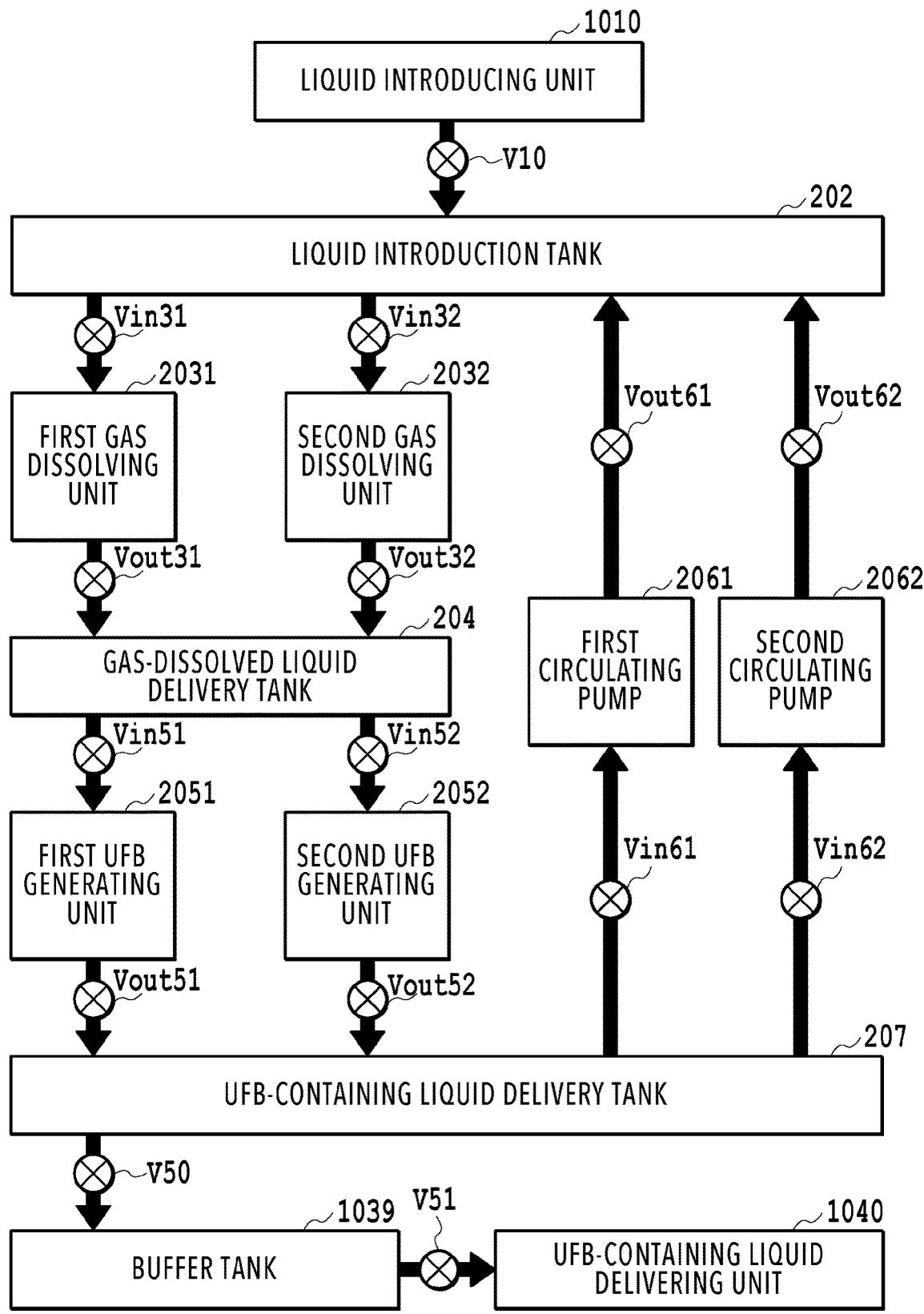
FIG. 28 is a block diagram illustrating a configuration of a UFB-containing liquid producing apparatus in a sixth embodiment.

FIG. 28 illustrates a configuration of the UFB-containing liquid producing apparatus in the sixth embodiment. The UFB-containing liquid producing apparatus in the present embodiment has a configuration which is similar to the configuration illustrated in FIG. 13 and in which a buffer tank 1039 and a valve V51 are also added between the valve V50 and the UFB-containing liquid delivering unit 1040. Note that the same parts as those in the configuration illustrated in FIG. 13 are denoted by the same reference numerals, and detailed description thereof is omitted.

The UFB-containing liquid delivery tank 207 serves to receive UFB-containing liquids supplied from the first and second UFB generating units 2051 and 2052, and supply the received UFB-containing liquids to the first circulating pump 2061, the second circulating pump 2062, and the buffer tank 1039.

The buffer tank 1039 serves to temporarily store the UFB-containing liquid supplied from the UFB-containing liquid delivery tank 207, and supply the stored UFB-containing liquid to the UFB-containing liquid delivering unit 1040 as appropriate. Specifically, in a case where the amount of the UFB-containing liquid supplied from the UFB-containing liquid delivery tank 207 is greater than the amount delivered to the UFB-containing liquid delivering unit 1040, the buffer tank 1039 stores that excess amount. Also, in a case where the amount supplied from the UFB-containing liquid delivery tank 207 is less than the amount delivered to the UFB-containing liquid delivering unit 1040, the buffer tank 1039 provides the UFB-containing liquid stored therein to the UFB-containing liquid delivering unit 1040. The buffer tank 1039 thus serves to keep the amount to be delivered to the UFB-containing liquid delivering unit 1040 constant.

Note that during production of a UFB-containing liquid, the opening-closing valve V50 provided between the UFB-containing liquid delivery tank 207 and the buffer tank 1039 and the opening-closing valve V51 provided between the buffer tank 1039 and the UFB-containing liquid delivering unit 1040 are set in an open state. Also, in a case of installing constituent elements such as the first and second gas dissolving units 2031 and 2032, the first and second UFB generating units 2051 and 2052, and the circulating pumps 2061 and 2062 at the time of arrival or the like, the opening-closing valves V10, V50, and V51 are set in a closed state. Then, after the installation process is completed, the opening-closing valves V10, V50, and V51 are set into an open state, and production of a UFB-containing liquid is started.

In the UFB-containing liquid producing apparatus in the present embodiment having the above configuration, the amount of a UFB-containing liquid to be produced is set to be greater than the amount to be delivered before a constituent element in the apparatus reaches a state where it needs to be replaced. In this way, a UFB-containing liquid can be stored in the buffer tank 1039. Thus, by providing the stored UFB-containing liquid during a replacement period, it is possible to perform production of a UFB-containing liquid and work of replacing a constituent element in parallel.

Figure 29:
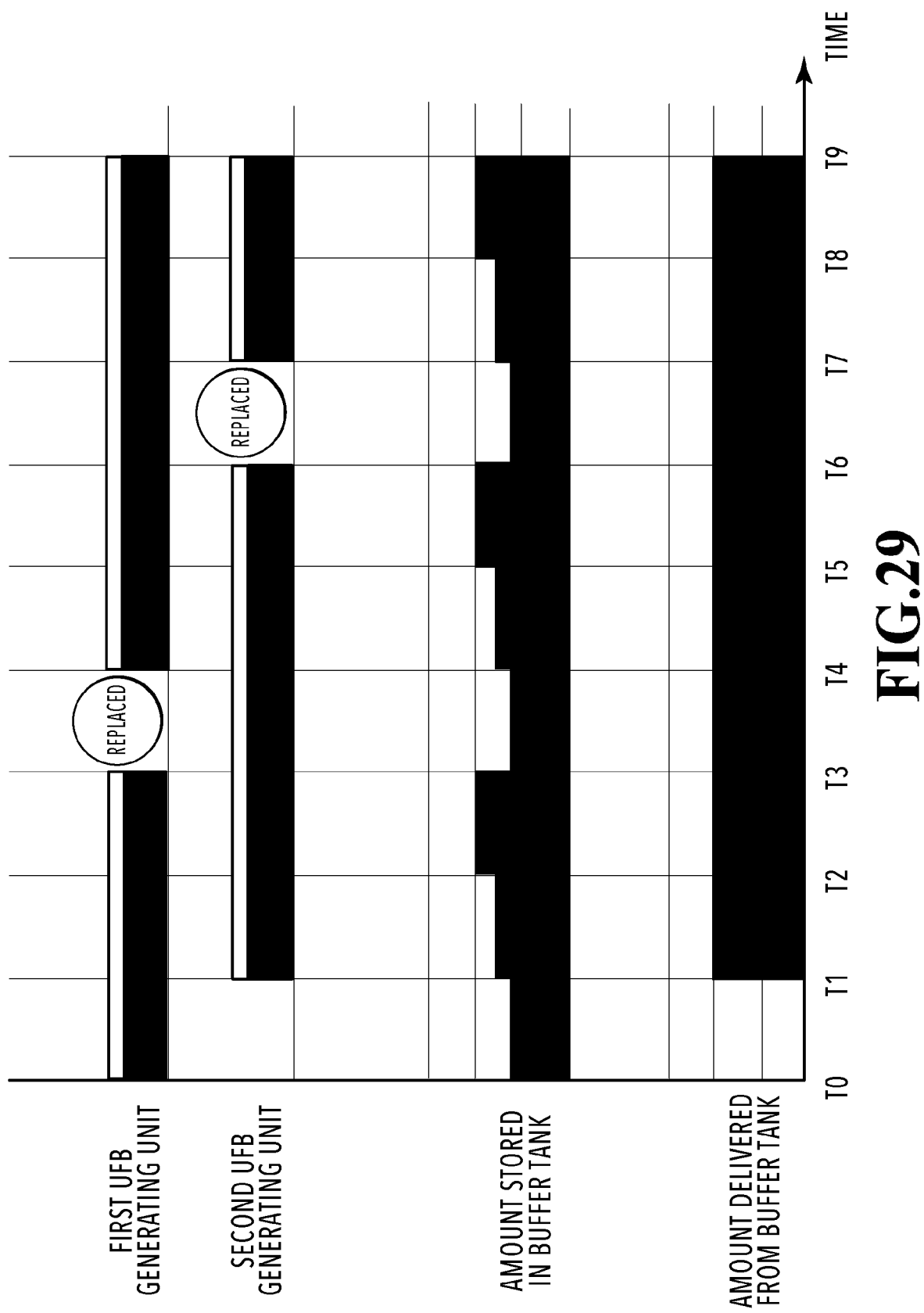
FIG. 29 illustrates a timing chart illustrating control executed in the sixth embodiment.

FIG. 29 illustrates a timing chart of the control executed in the present embodiment. In FIG. 29, the two rows from the top represent driving and replacement timings for the first UFB generating unit 2051 and the second UFB generating unit 2052, and the two rows from the bottom represent the amount of the UFB-containing liquid stored in the buffer tank 1039 and the amount of the UFB-containing liquid delivered from the buffer tank 1039.

As illustrated in FIG. 29, in this example, the first UFB generating unit 2051 and the second UFB generating unit 2052 are controlled such that each of them reaches a state where it need to be replaced in a different timing. Also, the production of a UFB-containing liquid is started from T0, and the delivery of the UFB-containing liquid from the buffer tank is started from T1.

In the time period from T0 to T1, the first UFB generating unit 2051 is caused to operate at an operation ratio of 120%, and the second UFB generating unit 2052 is caused to operate at an operation ratio of 0%. Also, in this time period from T0 to T1, the buffer tank 1039 delivers no UFB-containing liquid but stores the entire UFB-containing liquid supplied thereto. As a result, at T, an amount of a UFB-containing liquid corresponding to 120% is stored in the buffer tank.

Then, in the time period from T1 to T2, the first UFB generating unit 2051 and the second UFB generating unit 2052 are both caused to operate at an operation ratio of 120%. Also, in this period, an amount of a UFB-containing liquid corresponding to 200% is delivered from the buffer tank 1039. As a result, at T2, an amount of a UFB-containing liquid corresponding to 160% is stored in the buffer tank. In the time period from T2 to T3 too, a UFB-containing liquid is stored as in the time period from T1 to T2, and the accumulated stored amount reaches 200% at T3.

In the timing T3, the first UFB generating unit 2051 reaches its replacement timing, and the first UFB generating unit 2051 is replaced in the time period from T3 to T4. During this period, the second UFB generating unit 2052 is caused to operate at an operation ratio of 120%. As a result, the accumulated stored amount in the buffer tank 1039 at T4 is 120%.

In the time periods from T4 to T5 and from T5 to T6, control similar to that in the time periods from T1 to T2 and from T2 to T3 is performed. As a result, the accumulated stored amount at T5 is 160%, and the accumulated stored amount at T6 is 200%.

In the timing T6, the second UFB generating unit 2052 reaches its replacement timing, and the second UFB generating unit 2052 is replaced in the time period from T6 to T7. During this period, the first UFB generating unit 2051 is caused to operate at an operation ratio of 120%. As a result, the accumulated stored amount at T7 is 120%.

By using the buffer tank 1039 as above, it is possible to perform replacement of a UFB generating unit and production of a UFB-containing liquid in parallel and to lower the highest operation ratio of each UFB generating unit. Specifically, in the first embodiment, the highest operation ratio of each UFB generating unit is 200%, as illustrated in FIG. 15. In contrast, in the present embodiment, the highest operation ratio of each UFB generating unit can be lowered to 120%. This means that the longer the life of a UFB generating unit is, the closer to 100% its highest operation ratio can be. In other words, this means that it is possible to perform a stable continuous operation with a UFB generating unit at a generation rate near its performance limit in parallel with replacement work, as in the above-described fourth embodiment.

Figure 30B:
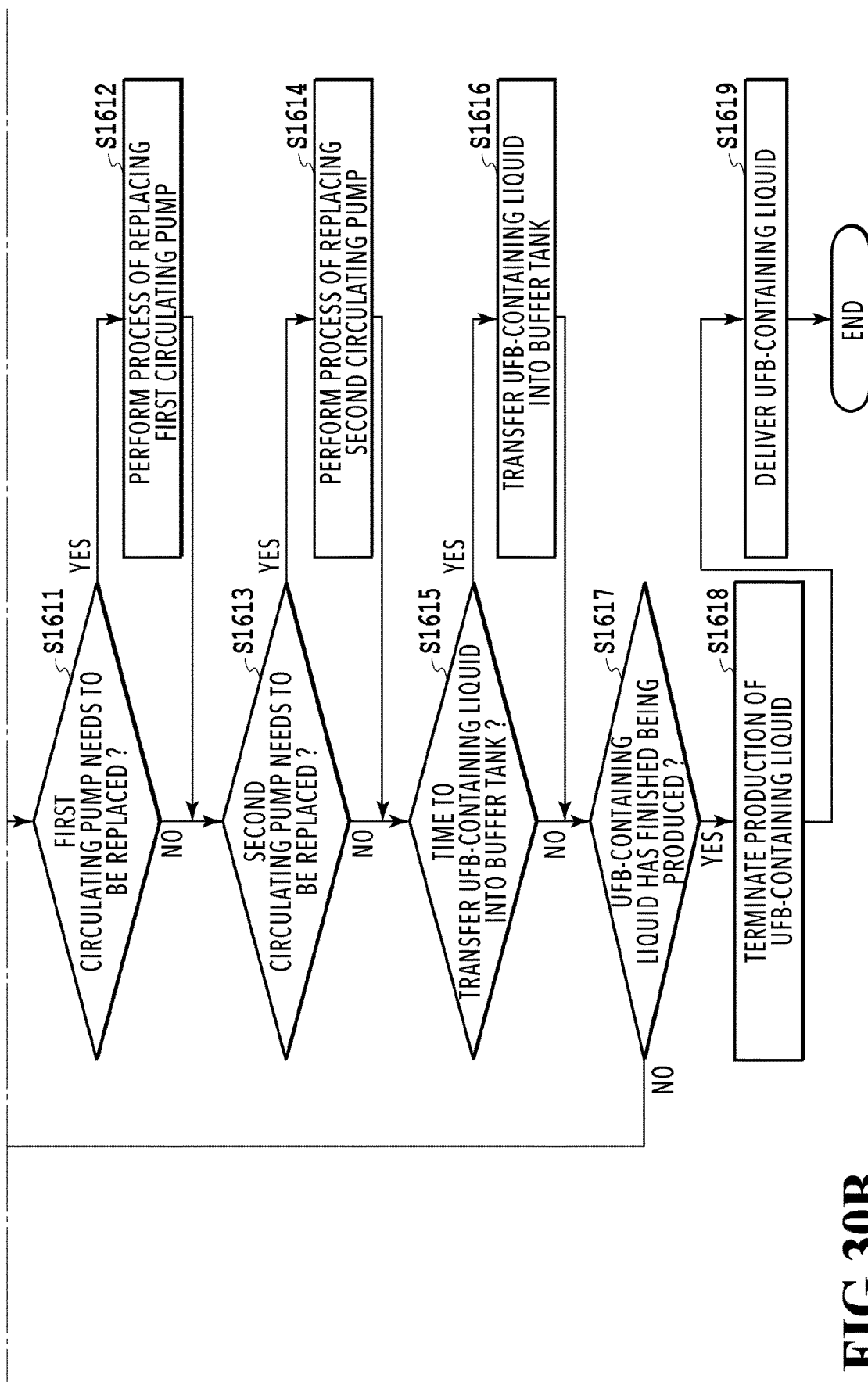
Figure 31:
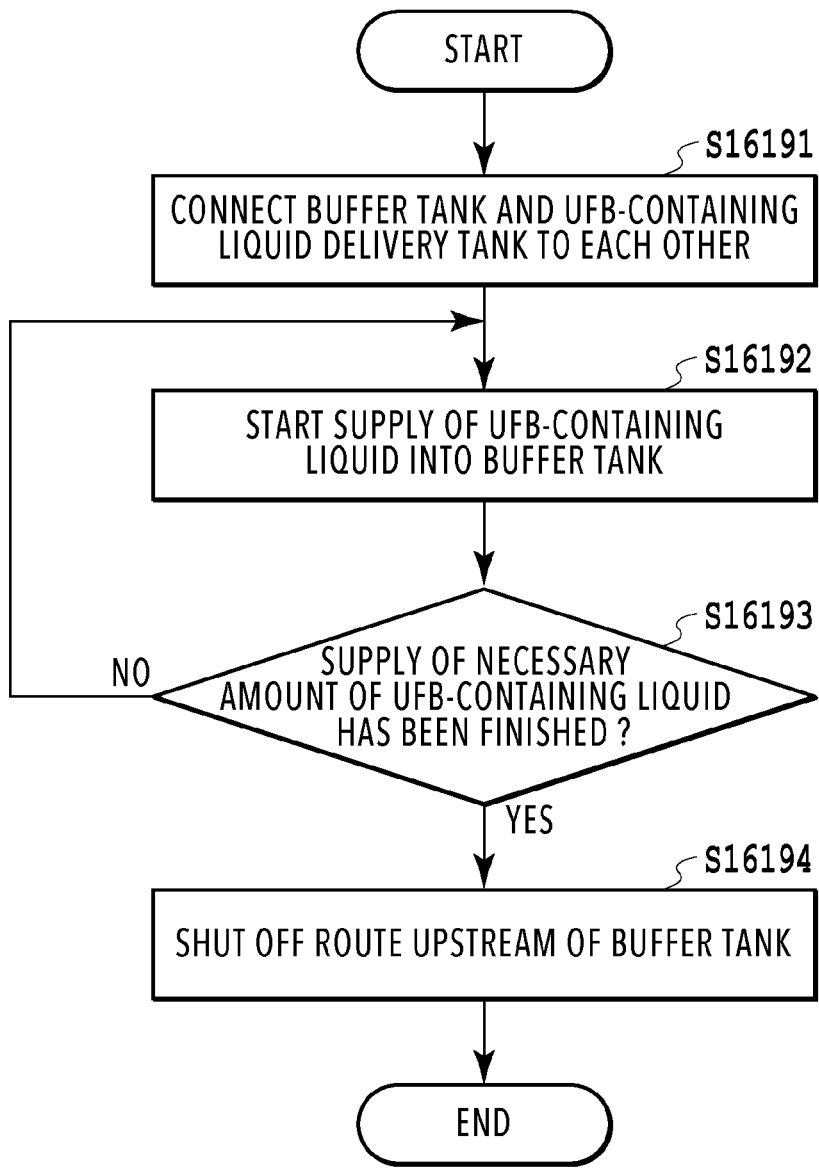
FIG. 31 is a flowchart illustrating details of the process performed in S1616.

FIGS. 30A and 30B and FIG. 31 are flowcharts illustrating a control operation during production of a UFB-containing liquid executed in the present embodiment. In FIGS. 30A and 30B, the processes of S1601 to S1612 are similar to the processes of S401 to S412 in FIGS. 17A and 17B, and description thereof is therefore omitted.

In S1613, it is determined whether the second circulating pump 2062 needs to be replaced. If the determination result is YES (replacement is needed), the operation proceeds to S1614. If the determination result is NO (replacement is not needed), the operation proceeds to S1615. In S1614, a process of replacing the second circulating pump 2602 is performed. The content of this replacement process is similar to the process of S414 in FIG. 17B, and description thereof is therefore omitted. After the process is completed, the operation proceeds to S1615.

In S1615, it is determined whether it is necessary to deliver a UFB-containing liquid into the buffer tank 1039. In the example illustrated in FIG. 29, the relationship between the rate of production of a UFB-containing liquid (the rate of supply of a UFB-containing liquid for the buffer tank) and the rate of delivery of a UFB-containing liquid (the rate of delivery of a UFB-containing liquid into the buffer tank) is the rate of production of a UFB-containing liquid=the rate of delivery of a UFB-containing liquid.

Thus, a UFB-containing liquid needs to be delivered continuously from T1.

On the other hand, in a case where the rate of production of a UFB-containing liquid>the rate of delivery of a UFB-containing liquid, the valve V50 is opened and closed at a constant temporal rate as appropriate to control the delivery of a UFB-containing liquid into the buffer tank 1039. Alternatively, the opening degree of the valve V50 is controlled to control the rate of delivery of a UFB-containing liquid into the buffer tank 1039.

If the result of the determination in S1615 is YES (a UFB-containing liquid needs to be delivered), the operation proceeds to S1616. If the result of the determination is NO (a UFB-containing liquid does not need to be delivered), the operation proceeds to S1617. In S1616, a UFB-containing liquid is delivered into the buffer tank 1039. Details of the process performed in S1616 is illustrated in the flowchart of FIG. 31.

In S16191, the opening-closing valve V50 is set into an open state, thereby bringing the UFB-containing liquid delivery tank 207 and the buffer tank 1039 into a communicating state. Then in S16192, supply of a UFB-containing liquid from the UFB-containing liquid delivery tank 207 into the buffer tank 1039 is started. Then in S16193, it is determined whether the necessary amount of a UFB-containing liquid has been supplied into the buffer tank 1039. If the determination result is YES (the supply has been finished), the operation proceeds to S16194. On the other hand, if the determination result is NO (the supply has not been finished), the operation returns to S16192, and the supply of a UFB-containing liquid is continued.

In S16194, the opening-closing valve V50 is set into a closed state, thereby disconnecting the UFB-containing liquid delivery tank 207 and the buffer tank 1039 from each other. Then, the operation proceeds to S1617 in FIG. 30B. The processes of S1617 to S1619 are similar to the processes of S415 to S417 in FIG. 17B, and description thereof is therefore omitted.

In the present embodiment, in S1616, the opening-closing valve V50 is set into an open state to make the UFB-containing liquid delivery tank 207 and the buffer tank 1039 communicate with each other. However, if the result of the determination in S1615 is NO, the UFB-containing liquid delivery tank 207 and the buffer tank 1039 may be disconnected from each other.

As described above, in the present embodiment, the liquid delivering buffer tank 1039 is provided, and the control illustrated in the flowchart of FIGS. 30A and 30B is performed. In this way, it is possible to perform production of a UFB-containing liquid and replacement of a constituent element in parallel.

Seventh Embodiment

Next, a seventh embodiment of the present invention will be described. In the present embodiment, an example will be described in which a circulation flow passage is formed between a gas dissolving unit and a UFB-containing liquid delivery tank, and a circulation flow passage is formed between UFB generating units and the UFB-containing liquid delivery tank.

Figure 32:
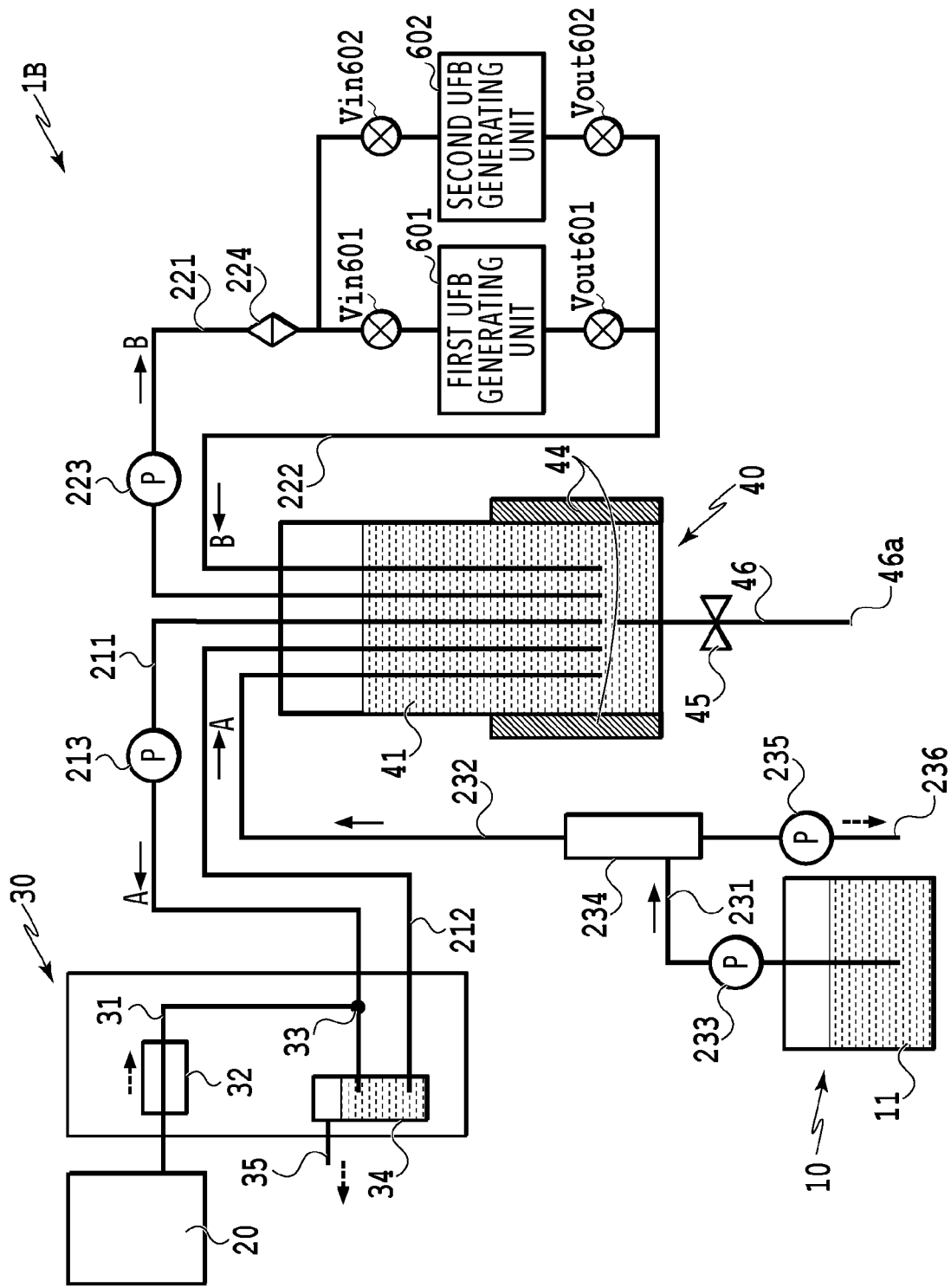
FIG. 32 is a block diagram illustrating a configuration in a seventh embodiment.

As illustrated in FIG. 32, a UFB-containing liquid producing apparatus 1B is configured of constituent elements such as a liquid supplying unit 10, a gas supplying unit 20, a dissolving unit 30, a first storing chamber 40, a first UFB generating unit 601, and a second UFB generating unit 602. These constituent elements are connected by pipes such that a liquid and a gas can move through them. In FIG. 32, each solid arrow represents a liquid flow, and each dotted arrow represents a gas flow. The liquid supplying unit 10 corresponds to the liquid introducing unit in the present invention, and the first storing chamber 40 corresponds to the UFB-containing liquid delivering unit in the present invention. Also, the first UFB generating unit 601, the second UFB generating unit 602, and the dissolving unit 30 constitute the producing unit in the present invention.

A liquid 11 is stored in the liquid supplying unit 10. This liquid is supplied by a pump 233 to the first storing chamber 40 through a route formed of a pipe 231 and a pipe 232. Also, a degassing unit 204 is disposed at an intermediate portion of the pipe 232 to remove gases dissolved in the liquid 11. The degassing unit 234 incorporates therein a film (not illustrated) which only gases can pass through, and the gases pass through the film to be separated from the liquid. The dissolved gases are sucked by a pump 235 and discharged from a gas discharging unit 236. By removing the gases dissolved in the liquid 11 to be supplied in this manner, the later-described desired gas can be dissolved to the maximum extent.

The gas supplying unit 20 has a function of supplying the desired gas to be dissolved into the liquid 11. The gas supplying unit 20 may be a gas cylinder containing the desired gas. Alternatively, the gas supplying unit 20 may be an apparatus capable of continuously generating the desired gas or the like. For example, in a case where the desired gas is oxygen, it is possible to take in the atmospheric air and remove nitrogen, which will be unnecessary, to continuously generate oxygen, and feed the oxygen with an incorporated pump.

The dissolving unit 30 has a function of dissolving the gas supplied from the gas supplying unit 20 into a liquid 41 supplied from the first storing chamber 40. Note that this dissolving unit 30 incorporates a dissolution degree sensor (not illustrated). The gas supplied from the gas supplying unit 20 is subjected to a process such as electrical discharging at a pre-processing unit 32 and then sent to a dissolving part 33 through a supply pipe 31. The liquid 41 in the first storing chamber 40 is also supplied to the dissolving part 33 through a pipe 211. This liquid is supplied by a pump 213. At the dissolving part 33, the gas is dissolved into the supplied liquid 41. A gas-liquid separating chamber 34 is arranged after the dissolving part 33, and the portion of the gas having failed to be dissolved at the dissolving section 33 is discharged from a gas discharging part 35. The gas-dissolved liquid is collected into the first storing chamber 40 through a pipe 212.

The first storing chamber 40 serves to store the liquid 41 and link a first circulation route A and second circulation route B to be described later. Here, the liquid 41 is more specifically a mixed liquid of the gas-dissolved liquid in which the gas has been dissolved at the dissolving unit 30 and UFB-containing liquids produced at the first UFB generating unit 601 and second UFB generating unit 602 to be described later.

A cooling unit 44 is disposed on the entirety or part of the outer periphery of the first storing chamber 40. This cooling unit 44 cools the liquid 41 in the first storing chamber 40. The lower the temperature of the liquid, the higher the solubility of the gas. A lower liquid temperature is therefore preferred, and the liquid temperature is controlled to be about 10° C. or lower by using a temperature sensor (not illustrated).

The cooling unit 44 may have any configuration as long as it can cool the liquid 41 to the desired temperature. For example, a cooling apparatus such as a Peltier device can be employed. Alternatively, a method in which a cooling liquid cooled to low temperature by a chiller (not illustrated) is circulated can be employed. In this case, the configuration may be such that a tube through which the cooling liquid can circulate is attached around the outer periphery or such that the entire first storing chamber 40 has a two-layer structure and the cooling liquid flows through the gap between the layers. Alternatively, the configuration may be such that a cooling tube extends through the liquid 41. With the liquid 41 controlled as above to be at low temperature and thus be in a state where the gas easily dissolves into it, the gas can be efficiently dissolved at the dissolving part 33.

Also, a valve 45 is connected to the first storing chamber 40, and a delivery pipe 46 in which an outlet port 46a is formed for taking out the UFB-containing liquid is connected to the valve 45. The UFB concentration of the liquid 41 is managed with a concentration sensor or the like (not illustrated). In a case where the UFB concentration reaches a predetermined value, the UFB-containing liquid can be taken out through the outlet port 46a by opening the valve 45. Note that the outlet port for the UFB-containing liquid may be disposed at any suitable position other than the first storing chamber 40. Meanwhile, the first storing chamber 40 may be provided with an agitator or the like for reducing unevenness in the temperature of the liquid 41 and the solubility.

The first UFB generating unit 601 and the second UFB generating unit 602 have a function of generating UFBs from the gas dissolved in the liquid 41 supplied from the first storing chamber 40 (gas-phase precipitation). The means for generating UFBs may be any means, such as a Venturi method, as long as it can generate UFBs. The present embodiment employs the method that utilizes a film boiling phenomenon to generate UFBs (T-UFB method), in order to efficiently generate highly fine UFBs. As for a specific configuration, it is preferable to employ a configuration as mentioned in the above description of the basic configuration.

The first UFB generating unit 601 is supplied with the liquid 41 by a pump 223 from the first storing chamber 40 through a pipe 221 and an opening-closing valve Vin601. Also, the second UFB generating unit 602 is supplied with the liquid 41 by the pump 223 from the first storing chamber 40 through the pipe 221 and an opening-closing valve Vin602.

A filter 224 that collects impurities, dust, and the like is arranged upstream of the first UFB generating unit 601 and the second UFB generating unit 602 to prevent the impurities, dust, and the like from impairing the UFB generation by the UFB generating units.

A UFB-containing liquid produced by the first UFB generating unit 601 is collected into the first storing chamber 40 through an opening-closing valve Vout601 and a pipe 222. Also, a UFB-containing liquid including the UFBs generated by the second UFB generating unit 602 is collected into the first storing chamber 40 through an opening-closing valve Vout602 and the pipe 222.

Note that although the pump 223 is disposed upstream of the first UFB generating unit 601 and the second UFB generating unit 602, the arrangement of the pump is not limited to the above. The pump can be provided at a different position as long as it is such a position that UFB-containing liquids can be efficiently produced. For example, the pump may be disposed downstream of the UFB generating units 601 and 602. Further, pumps may be disposed both upstream and downstream of the UFB generating units 601 and 602.

In the apparatus configuration described above, the types of the gas and the liquid are not particularly limited, and can be freely selected. Also, portions that contact the gas or the gas-dissolved liquid (such as the gas/liquid contact portions of the pipes 31, 211, 212, 221, and 222, the pump 213 and 223, the filter 224, the first storing chamber 40, the first UFB generating unit 601, and the second UFB generating unit 602) are preferably made of a material with high corrosion resistance. For example, for the gas/liquid contact portions, it is preferable to use a fluorine-based resin such as polytetrafluoroethylene (PTFE) or perfluoroalkoxy alkane (PFA), a metal such as SUS316L, or another inorganic material. In this way, it is possible to generate UFBs in a suitable manner even with a highly corrosive gas and liquid.

Also, a pump whose pulsation and flow rate variation are small is desirably employed as the pump 223, which causes the UFB-containing liquids in the first and second UFB generating units 601 and 602 to flow, to avoid impairing the UFB generation efficiency. In this way, it is possible to efficiently produce UFB-containing liquids with a small UFB concentration variation.

As described above, the UFB-containing liquid producing apparatus in the present embodiment has two circulation routes, namely, the first circulation route A (first storing chamber 40→dissolving unit 30→first storing chamber 40) for dissolving the gas, and the second circulation route B (first storing chamber 40→UFB generating units 601 and 602→first storing chamber 40) for generating UFBs. In these circulation routes, the pumps 213 and 223 are disposed respectively and enable circulations under different conditions as desired. Here, the "conditions" refer to the flow rate of the circulation, the pressure inside the circulation route, the circulation timing, and the like. For example, immediately after the start of operation of the UFB-containing liquid producing apparatus, the liquid 41 can be cooled to a predetermined temperature and then circulated only through the first circulation route A until reaching a predetermined degree of dissolution. In the present embodiment, the conditions for the circulation through the first circulation route A are set such that the flow rate is approximately 500 to 3000 mL/min and the pressure is about 0.2 to 0.6 MPa, in order to achieve efficient pressurized dissolution of the gas.

Then, the liquid 41 is circulated through the second circulation route B, and the UFB generating units 601 and 602 are caused to operate to generate UFBs. In the present embodiment, the conditions for the circulation through the second circulation route B are set such that the flow rate is approximately 30 to 150 mL/min and the pressure is about 0.1 to 0.2 MPa. In the T-UFB method, UFBs are generated by utilizing the pressure difference and heat generated in the process from the generation of a bubble by film boiling to the disappearance of the bubble. Accordingly, the circulation conditions only need to be a relatively low flow rate and a relatively low pressure (atmospheric pressure).

Meanwhile, during the generation of UFBs, i.e., during the circulation through the second circulation route B, the circulation through the first circulation route A can be performed as well. The advantage of this is as follows. As the gas dissolved in the liquid 41 precipitates as UFBs at the UFB generating units 601 and 602, a portion of the liquid corresponding the volume of the UFBs turns into a portion into which the gas can be newly dissolved. Then, by supplying that liquid to the dissolving unit 30 to dissolve the gas into the liquid, and generating UFBs in the resultant liquid again at the UFB generating units 601 and 602, it is possible to produce a UFB-containing liquid with a higher concentration. The circulation through the circulation route B in this case does not necessarily have to be continuous. In a case where the gas dissolution rate is high, the liquid may be circulated intermittently.

With the configuration in which a liquid can be circulated through the first circulation route A and the second circulation route B under different conditions respectively as described above, the circulation for dissolving the gas and the circulation for generating UFBs can be performed simultaneously under respective optimum conditions. Hence, a high-concentration UFB-containing liquid can be produced efficiently.

The above-described circulation method is a mere example. The circulation method is not limited to this method, and can be set as desired.

Further, in the UFB-containing liquid producing apparatus in the present embodiment, the pressure at the UFB generating units only needs to be about the atmospheric pressure since the T-UFB method is employed, as mentioned earlier. Thus, only the portion of the pipe 211, which communicates with the dissolving unit 30, from the downstream side of the pump 213 to the gas-liquid separating chamber 34 needs to be the region in the apparatus where the pressure is relatively high. This brings about an advantage that a less costly and smaller UFB-containing liquid producing apparatus can be obtained and also that maintenance is easy.

Also, a pump whose pulsation and flow rate variation are small is desirably employed as the pump 223, which causes the UFB-containing liquids in the first and second UFB generating units 601 and 602 to flow, to avoid impairing the UFB generation efficiency. In this way, it is possible to efficiently produce UFB-containing liquids with a small UFB concentration variation.

Also, the present embodiment has a configuration in which the gas-dissolved liquid obtained by dissolving the gas into the liquid supplied from the liquid supplying unit is supplied to the first and second UFB generating units 601 and 602 to produce a UFB-containing liquid, and the produced liquid is delivered from the first storing chamber 40 serving a liquid delivering unit. In this way, in a case where one of the first and second UFB generating units malfunctions, the production of a UFB-containing liquid can be continued using the other UFB generating unit and the malfunctioning UFB generating unit can be replaced in parallel.

Specifically, the opening and closing of the above-mentioned opening-closing valves Vin601, Vout601, Vin602, and Vout602 are controlled so as to isolate the first UFB generating unit 601 or the second UFB generating unit 602 from the malfunctioning UFB-containing liquid production route. Moreover, the non-malfunctioning UFB generating unit is kept connected to its UFB-containing liquid production route. Thus, it is possible to continue producing a UFB-containing liquid with this UFB generating unit and at the same time perform a process of replacing the other UFB generating unit.

Meanwhile, a plurality of constituent elements other than the UFB generating units may be provided. For example, a plurality of the dissolving units 30, a plurality of the pumps 213, and a plurality of the pumps 223 may be provided, and opening-closing valves, switching valves, or the like may be disposed upstream and downstream of each of these constituent elements. In this way, in a case where one of the plurality of dissolving units or one of the plurality of pumps malfunctions, it is possible to continue producing a UFB-containing liquid by using the other normal dissolving unit or pump.

Moreover, by controlling the dissolving unit and the pump functioning as a gas dissolving unit so as to maintain the rate of production of a UFB-containing liquid, it is possible to continue producing a UFB-containing liquid without greatly lowering the production performance such as the UFB concentration and the rate of production of a UFB-containing liquid.

Other Embodiments

Figure 33:
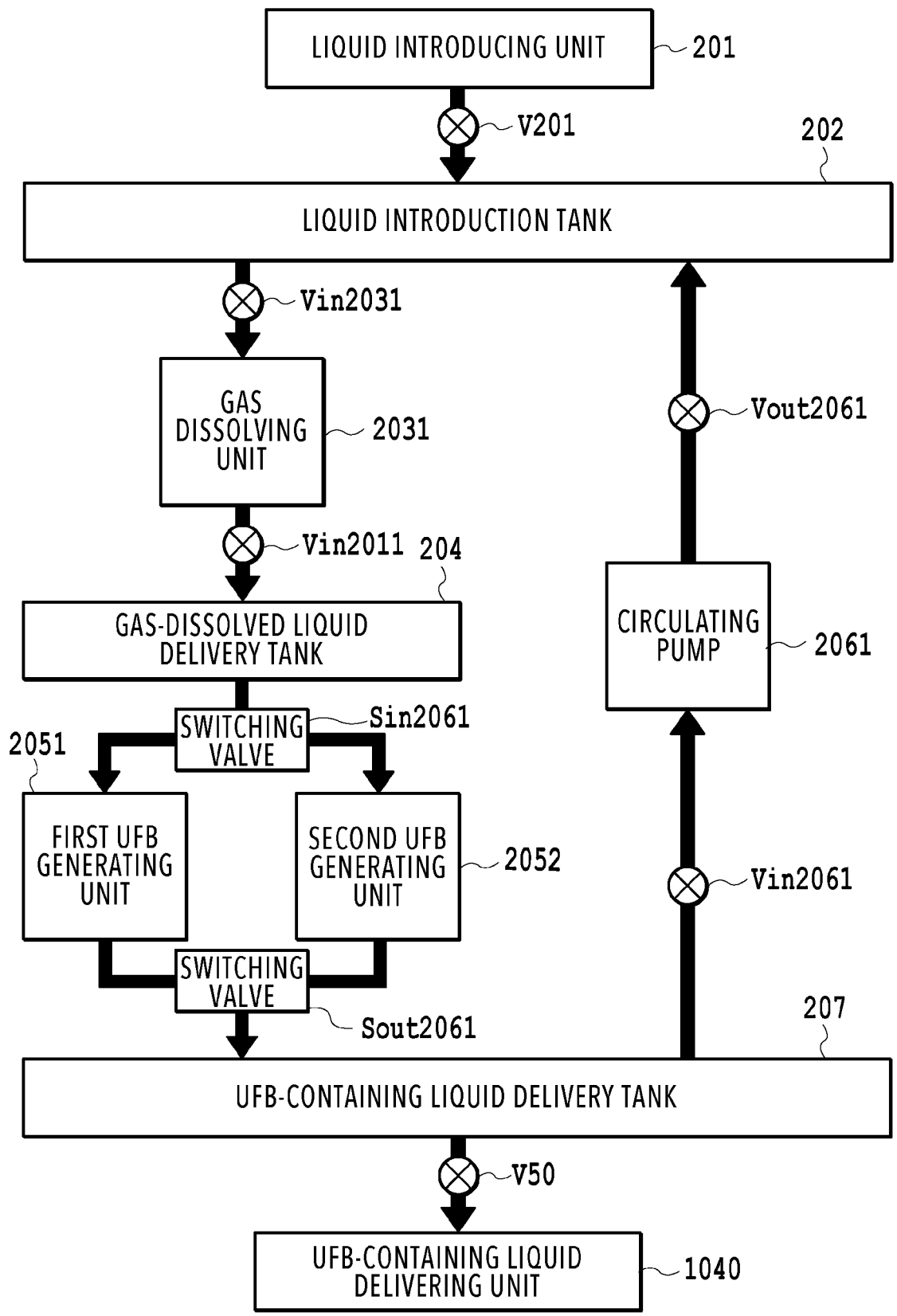
FIG. 33 is a block diagram illustrating a configuration in another embodiment.

In the above-described first embodiment, an example has been described in which sets of two constituent elements, namely two gas dissolving units, two UFB generating units, and two circulating pumps, are provided. However, one or two of these three types of constituent elements may be a single constituent element. For example, as illustrated in FIG. 33, it is possible to employ a configuration including a single gas dissolving unit 2031 and a single circulating pump 2061. However, in this case too, the UFB generating units, namely the first and second UFB generating units 2051 and 2052, are provided. Note that although FIG. 33 illustrates an example in which the first UFB generating unit 2051 or the second UFB generating unit 2052 is selectively used with switching valves Sin2061 and Sout2061, opening-closing valves can be used as in the example illustrated in FIG. 13.

Also, the above-described first embodiment has a configuration in which the first UFB-containing liquid producing unit 1020 and the second UFB-containing liquid producing unit 1030 provided between the liquid introducing unit 1010 and the UFB-containing liquid delivering unit 1040 communicate with each other. Specifically, the first gas dissolving unit 2031 and the second gas dissolving unit 2032 communicate with each other through the liquid introduction tank and the gas-dissolved liquid delivery tank, and the first UFB generating unit 2051 and the second UFB generating unit 2052 communicate with each other through the gas-dissolved liquid delivery tank and the UFB-containing liquid delivery tank. Further, the first circulating pump and the second circulating pump communicate with each other through the UFB-containing liquid delivery tank and the liquid introduction tank. However, the present invention is not limited to the above configuration, and can employ a configuration in which the first UFB-containing liquid producing unit and the second UFB-containing liquid producing unit are independent of each other and do not communicate with each other. In this case, a UFB-containing liquid produced by each UFB-containing liquid producing unit is collected into a single liquid delivering unit. In this way, in a case where one of the constituent elements provided in one of the UFB-containing liquid producing units malfunctions, the producing operation can be continued with the other UFB-containing liquid producing unit, and therefore the production of a UFB-containing liquid and a replacement process can be executed in parallel.

Also, three or more UFB-containing liquid producing units can be provided between the liquid introducing unit 1010 and the UFB-containing liquid delivering unit 1040. In the above-described third embodiment, an example in which six UFB generating units are provided has been described. As for the constituent elements such as the gas dissolving units and the circulating pumps, three or more gas dissolving units and circulating pumps can be provided as well.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-199116 filed Oct. 31, 2019, which is hereby incorporated by reference wherein in its entirety.

What is claimed is:

1. An ultrafine bubble-containing liquid producing apparatus comprising a producing unit that produces an ultrafine bubble-containing liquid containing ultrafine bubbles by using a liquid supplied from a liquid introducing unit and delivers the ultrafine bubble-containing liquid that is produced to a liquid delivering unit,
wherein:
the producing unit includes a plurality of ultrafine bubble generating units capable of operating independently;
each of the plurality of ultrafine bubble generating units is capable of independently switching between communicating with and being disconnected from the liquid introducing unit and the liquid delivering unit;
the producing unit further includes at least one gas dissolving unit that dissolves a gas into the liquid supplied from the liquid introducing unit to produce a resultant liquid and supplies the resultant liquid to the plurality of ultrafine bubble generating units; and
the at least one gas dissolving unit is capable of switching between communicating with and being disconnected from the liquid introducing unit and the liquid delivering unit.

2. The ultrafine bubble-containing liquid producing apparatus according to claim 1, further comprising a controller that controls operation of the producing unit.

3. The ultrafine bubble-containing liquid producing apparatus according to claim 2, wherein in a case where one of the plurality of ultrafine bubble generating units malfunctions, the controller increases an operation ratio of a non-malfunctioning ultrafine bubble generating unit.

4. The ultrafine bubble-containing liquid producing apparatus according to claim 2, wherein the controller sets a different operation start timing for each of the plurality of ultrafine bubble generating units.

5. The ultrafine bubble-containing liquid producing apparatus according to claim 1, wherein:
the producing unit includes a plurality of gas dissolving units capable of operating independently; and
each of the plurality of gas dissolving units is capable of independently switching between communicating with and being disconnected from the liquid introducing unit and the liquid delivering unit.

6. The ultrafine bubble-containing liquid producing apparatus according to claim 5, further comprising a controller that controls operation of the producing unit,
wherein in a case where one of the plurality of gas dissolving units malfunctions, the controller increases an operation ratio of a non-malfunctioning gas dissolving unit.

7. The ultrafine bubble-containing liquid producing apparatus according to claim 5, further comprising a controller that controls operation of the producing unit,
wherein the controller sets a different operation start timing for each of the plurality of gas dissolving units.

8. The ultrafine bubble-containing liquid producing apparatus according to claim 1, further comprising a buffer tank that stores ultrafine bubble-containing liquids delivered from the plurality of ultrafine bubble generating units and delivers the stored liquids to the liquid delivering unit.

9. An ultrafine bubble-containing liquid producing apparatus comprising a producing unit that produces an ultrafine bubble-containing liquid containing ultrafine bubbles by using a liquid supplied from a liquid introducing unit and delivers the ultrafine bubble-containing liquid that is produced to a liquid delivering unit,
wherein the producing unit includes:
a plurality of ultrafine bubble generating units capable of operating independently, each of the plurality of ultrafine bubble generating units being capable of independently switching between communicating with and being disconnected from the liquid introducing unit and the liquid delivering unit; and
at least one circulating pump that is capable of operating independently and returns ultrafine bubble-containing liquids produced by the plurality of ultrafine bubble generating units to a gas dissolving unit to circulate the ultrafine bubble-containing liquids, the at least one circulating pump being capable of switching between communicating with and being disconnected from the liquid introducing unit and the liquid delivering unit.

10. The ultrafine bubble-containing liquid producing apparatus according to claim 9, wherein:
the producing unit includes a plurality of circulating pumps capable of operating independently; and
each of the plurality of circulating pumps is capable of independently switching between communicating with and being disconnected from the liquid introducing unit and the liquid delivering unit.

11. The ultrafine bubble-containing liquid producing apparatus according to claim 10, further comprising a controller that controls operation of the producing unit,
wherein in a case where one of the plurality of circulating pumps malfunctions, the controller increases an operation ratio of a non-malfunctioning circulating pump.

12. The ultrafine bubble-containing liquid producing apparatus according to claim 10, further comprising a controller that controls operation of the producing unit,
wherein the controller sets a different operation start timing for each of the plurality of circulating pumps.

13. The ultrafine bubble-containing liquid producing apparatus according to claim 9, wherein the producing unit further includes:
a plurality of gas dissolving units that are capable of operating independently and dissolve a gas into the liquid supplied from the liquid introducing unit to produce a resultant liquid and supplies the resultant liquid to the plurality of ultrafine bubble generating units; and
a plurality of circulating pumps that are capable of operating independently and returning ultrafine bubble-containing liquids produced by the ultrafine bubble generating units to the gas dissolving unit to circulate the ultrafine bubble-containing liquids,
wherein each of the plurality of gas dissolving units and each of the plurality of circulating pumps are capable of independently switching between communicating with and being disconnected from the liquid introducing unit and the liquid delivering unit, and wherein the controller controls operation of the plurality of ultrafine bubble generating units, the plurality of gas dissolving units, and the plurality of circulating pumps such that replacement periods for the plurality of ultrafine bubble generating units, the plurality of gas dissolving units, and the plurality of circulating pumps based on lives thereof do not overlap one another.

14. An ultrafine bubble-containing liquid producing apparatus comprising a producing unit that produces an ultrafine bubble-containing liquid containing ultrafine bubbles by using a liquid supplied from a liquid introducing unit and delivers the ultrafine bubble-containing liquid that is produced to a liquid delivering unit,
wherein:
the producing unit includes a plurality of ultrafine bubble generating units capable of operating independently,
each of the plurality of ultrafine bubble generating units is capable of independently switching between communicating with and being disconnected from the liquid introducing unit and the liquid delivering unit; and
each of the plurality of ultrafine bubble generating units generates ultrafine bubbles in the liquid with a heating element that causes film boiling in the liquid.

15. An ultrafine bubble-containing liquid producing method comprising:

supplying a liquid to each of a plurality of ultrafine bubble generating units that are capable of independently switching between communicating with and being disconnected from a liquid introducing unit and a liquid delivering unit;

causing each of the plurality of ultrafine bubble generating units to independently produce an ultrafine bubble-containing liquid by using the liquid supplied from the liquid introducing unit; and delivering ultrafine bubble-containing liquids produced by the ultrafine bubble generating units to the liquid delivering unit, wherein the method further comprises dissolving a gas into the liquid to be supplied to each of a plurality of ultrafine bubble generating units, wherein the dissolving is performed switchably to one of a liquid supplied from the liquid introducing unit or a liquid delivered from at least one of the ultrafine bubble generating units.

* * * * *